(12) United States Patent  (10) Patent No.: US 7,950,811 B2
Nagahata et al.  (45) Date of Patent: May 31, 2011

(54) PROJECTION DISPLAY DEVICE

(75) Inventors: Takashi Nagahata, Chiba (JP); Nobuaki Higuchi, Kanagawa (JP); Yuuki Itou, Aichi (JP); Nobuyuki Hara, Kanagawa (JP)

(73) Assignee: Sony Corporation (JP)

( * ) Notice: Subject to any disclaimer, the term of this patent is extended or adjusted under 35 U.S.C. 154(b) by 477 days.

(21) Appl. No.: 12/082,072

(22) Filed: Apr. 7, 2008

(65) Prior Publication Data

US 2008/0252859 A1 Oct. 16, 2008

(30) Foreign Application Priority Data

Apr. 12, 2007 (JP) ................ P2007-105287

(51) Int. Cl.
*G03B 21/16* (2006.01)
*F04D 29/66* (2006.01)
(52) U.S. Cl. ............ 353/119; 415/119; 361/695
(58) Field of Classification Search ........... 353/57, 353/58, 60, 61, 119; 361/695, 687; 415/214.1, 415/119, 213.1
See application file for complete search history.

(56) References Cited

U.S. PATENT DOCUMENTS

| 5,186,605 | A  | * | 2/1993  | Tracy ............................ 601/2 |
| 5,208,730 | A  | * | 5/1993  | Tracy ...................... 361/679.48 |
| 6,351,380 | B1 | * | 2/2002  | Curlee et al. ................ 361/695 |
| 6,840,629 | B2 | * | 1/2005  | Suzuki et al. ................. 353/61 |
| 7,306,425 | B2 | * | 12/2007 | Park et al. .................... 415/119 |
| 7,312,991 | B2 | * | 12/2007 | Lee et al. ..................... 361/695 |
| 2008/0043430 | A1 | * | 2/2008 | Chen .......................... 361/687 |

FOREIGN PATENT DOCUMENTS

JP  2006-330300 A  12/2006

* cited by examiner

*Primary Examiner* — William C Dowling
(74) *Attorney, Agent, or Firm* — Lerner, David, Littenberg, Krumholz & Mentlik, LLP

(57) ABSTRACT

A projection display device includes: a housing; a fan disposed within the housing, the fan having a vane portion and a fan case accommodating the vane portion so as to be rotatable; and multiple vibration-proofing members having at least one of elasticity and viscosity, the vibration-proofing members being disposed at multiple positions in the circumferential direction of the perimeter face portion of the fan case surrounding the vane portion around the rotational axis of the vane portion, such that the vibration-proofing members are introduced between the housing and the fan case.

10 Claims, 25 Drawing Sheets

FIG. 23

[m/min]

|  | COMPARATIVE EXAMPLE | EMBODIMENT | INCREASE (IN %) |
|---|---|---|---|
| R | 520.3 | 525.9 | 1.0% |
| G-IN | 500.6 | 515.2 | 2.9% |
| G-OUT | 535.7 | 541.3 | 1.0% |
| B-IN | 562.2 | 571.9 | 1.0% |
| B-OUT | 387.8 | 406.0 | 1.0% |
| IRS-IN | 344.8 | 348.7 | 1.0% |
| IRS-OUT | 361.8 | 364.3 | 1.0% |

| VOLTAGE (V) | NOISE VALUE (dB) | | |
|---|---|---|---|
| | (HARDNESS 15) | (HARDNESS 10) | DIFFERENCE |
| 5 | 14.5 | 12.1 | 2.4 |
| 6 | 17.8 | 15.4 | 2.4 |

PROJECTION DISPLAY DEVICE

CROSS REFERENCES TO RELATED APPLICATIONS

The present invention contains subject matter related to Japanese Patent Application JP 2007-105287 filed in the Japanese Patent Office on Apr. 12, 2007, the entire contents of which are incorporated herein by reference.

BACKGROUND OF THE INVENTION

1. Field of the Invention

The present invention relates to a projection display device such as a liquid crystal project, CRT projector, or the like, and more particularly relates to a projection display device of which the interior of the housing is air-cooled.

2. Description of the Related Art

With projection display devices, various parts are air-cooled, such as a light source, optical parts receiving light from the light source, and so forth. Vibrations from fans used for air-cooling cause various inconveniences, such as noise, adverse effects on electronic parts, and so forth. Accordingly, various configurations have been proposed as art for absorbing fan vibrations therein.

Japanese Patent Application Publication No. 2006-330300 discloses an art wherein a vibration-proofing member formed of an elastic material is introduced between a fan storing blades in a fan case, and the housing storing the fan, thereby absorbing vibrations of the fan. The vibration-proofing member disclosed in this Publication is formed in a ring-shape surrounding the perimeter of the fan case. The fan to which the vibration-proofing member has been attached is inserted into a recessed portion of a holding portion provided to the housing, thereby fixing the fan to the housing.

SUMMARY OF THE INVENTION

The art disclosed in Japanese Patent Application Publication No. 2006-330300 is not without problems in various ways, due to the vibration-proofing member being formed in a ring-shape surrounding the perimeter of the fan case. For example, the vibration-proofing member needs to be large enough to surround the perimeter of the fan case. This leads to increase in material costs and working costs, while reducing ease of handling.

Also, fans of various sizes need to be used depending on the type of the projection display device, position where the fan is installed, and so forth, so multiple types of vibration-proofing members need to be provided in accordance with different sizes of fans, reducing versatility of the vibration-proofing members. This also leads to increased costs.

Also, reducing the tolerance such that the vibration-proofing member is in close contact with the entire perimeter of the fan case increases working costs. Conversely, increased tolerance means that the vibration-proofing member is not in close contact with the fan, and sufficient vibration-proofing effects may not be obtainable.

There has been realized the need to provide a projection display device in which the size of a configuration for vibration-proofing can be reduced.

A projection display device according to an embodiment of the present invention includes: a housing; a fan disposed within the housing, the fan having a vane portion and a fan case accommodating the vane portion so as to be rotatable; and multiple vibration-proofing members having at least one of elasticity and viscosity, the vibration-proofing members being disposed at multiple positions in the circumferential direction of the perimeter face portion of the fan case surrounding the vane portion around the rotational axis of the vane portion, such that the vibration-proofing members are introduced between the housing and the fan case.

The projection display device may further include: a supporting member fixed to the housing; and a pressing member fixed to the supporting member in the radial direction of the vane portion, so as to hole the fan case between the pressing member and the supporting member; with a part of the plurality of vibration-proofing members being held between the fan case and the supporting member; and the other part of the plurality of vibration-proofing members being held between the fan case and the pressing member.

The pressing member may further include an axial direction contact portion which comes into contact with the vibration-proofing members from the opposite side of an axial rotation direction as to the side to which the fan blows air, thereby restricting movement of the fan toward the opposite side in the axial rotation direction due to wind force.

The pressing member further may further include: an engaging portion configured to engage the housing or a member fixed to the housing in the axial rotation direction, so as to restrict movement of the pressing member in the opposite side in the axial rotation direction.

The pressing member may further include: a pair of holding orthogonal direction contact members which face each other across the fan case in a holding orthogonal direction orthogonal to a holding direction which is the radial direction of the vane portion; with the fan case having the plurality of vibration-proofing members situated between the fan case and the pair of holding orthogonal direction contact members respectively, with the fan case pressed in between the pair of holding orthogonal direction contact members.

The fan case may further have a first protrusion provided on the perimeter face portion, protruding in the radial direction; and at least one of the plurality of vibration-proofing members may have a second protrusion to be capped in the first protrusion; with at least one side of the supporting member and the pressing member coming into contact with the second protrusion.

The fan case may further have a first protrusion provided on the edge of the perimeter face portion at an exhaust direction side, protruding in the radial direction; and at least one of the plurality of vibration-proofing members may have a second protrusion to be capped in the first protrusion; with the axial direction contact portion coming into contact with the second protrusion from a suction direction side which is opposite direction to the exhaust direction side.

The pressing member may be disposed only further at the exhaust direction side from the edge of the suction direction side of the fan case.

The fan may be disposed with the suction direction side facing a side face of a lens barrel with a circular cross-section having a projection lens.

The vibration-proofing members may be configured of a styrene thermoplastic elastomer having a hardness of 10 or lower.

BRIEF DESCRIPTION OF THE DRAWINGS

FIG. 23 is a diagram illustrating simulation results of calculating air velocity;

DESCRIPTION OF THE PREFERRED EMBODIMENTS

Figure 1:
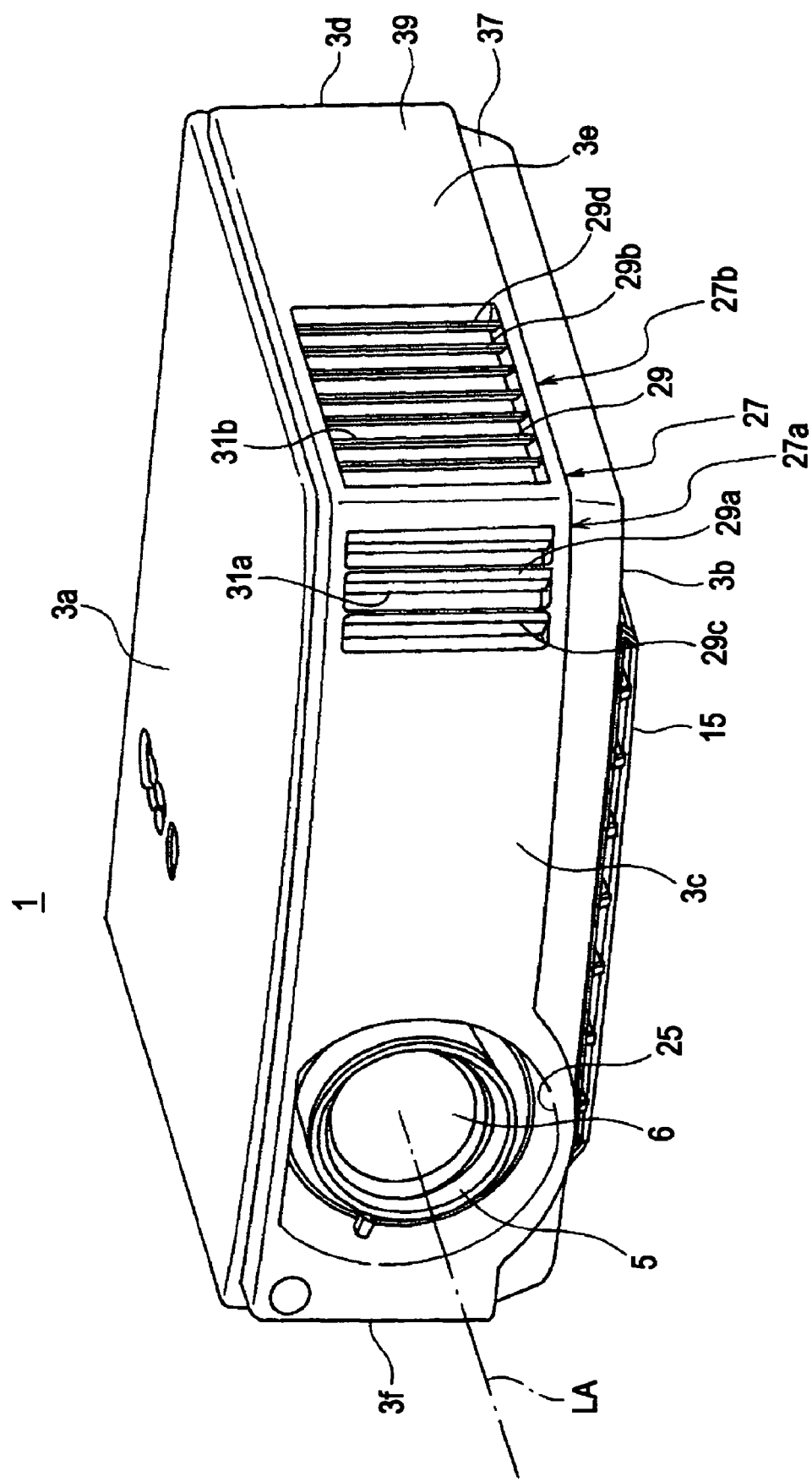
FIG. 1 is an external perspective view of a projection display device according to an embodiment of the present invention.
Figure 2:
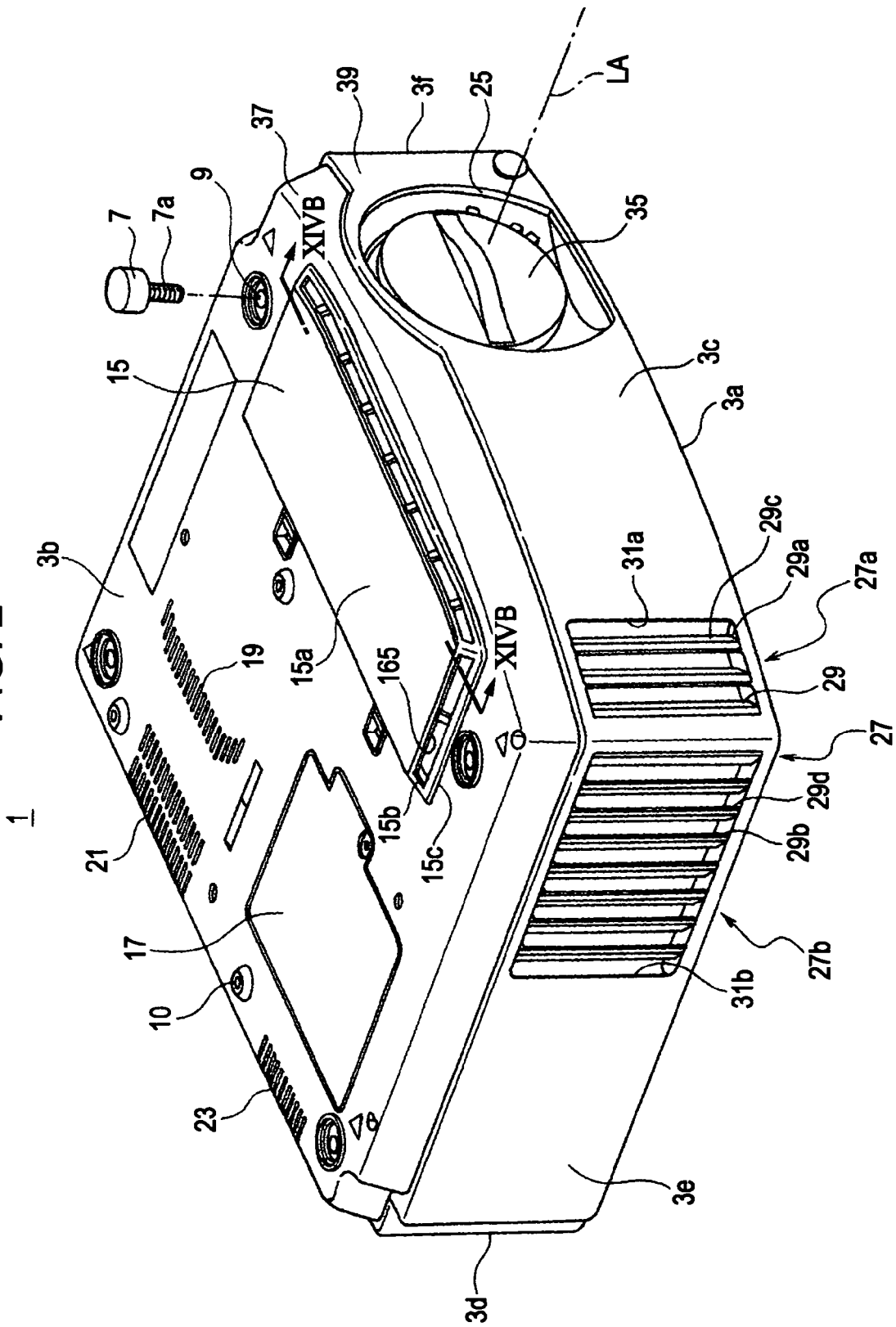
FIG. 2 is an external perspective view of the projection display device shown in FIG. 1, from another direction.
Figure 3:
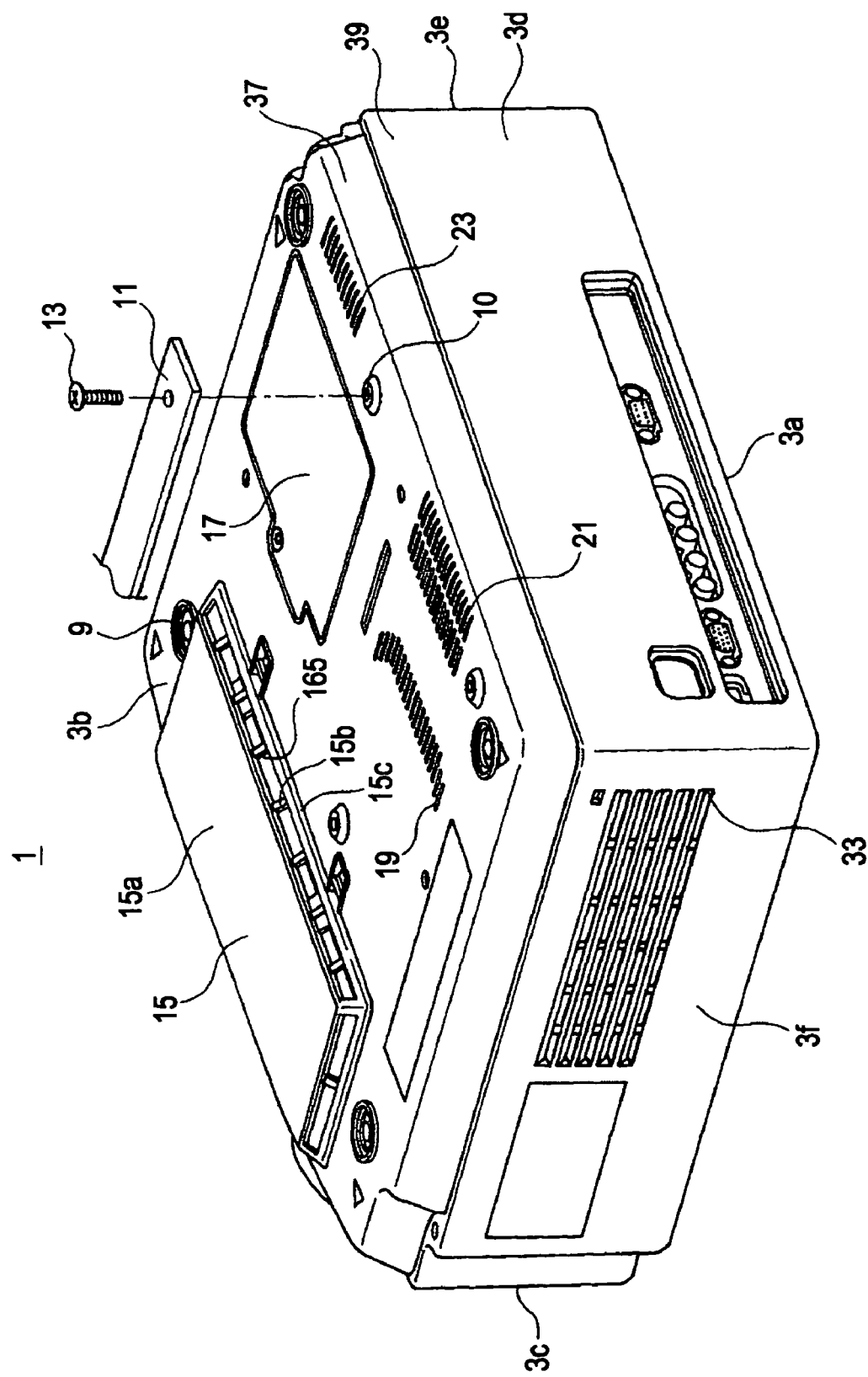
FIG. 3 is an external perspective view of the projection display device shown in FIG. 1, from yet another direction.

FIGS. 1 through 3 are perspective views illustrating the outside of a projector 11 serving as a projection display device according to an embodiment of the present invention. FIG. 1 is a perspective view of the projector 11 from the projection direction (screen side) and from above the projector 11, FIG. 2 is a perspective view of the projector 11 from the projection direction (screen side) and from below the projector 11, and FIG. 3 is a perspective view of the projector 11 from the rear (opposite to the screen side) and from below the projector 11.

Note that in the following description, configurations corresponding to light of each color, i.e., R light, G light, and B light may be denoted with symbols, R, G, and B, and these symbols may also be omitted as appropriate.

A projector 11 has a housing 3 and a lens barrel 5 attached to the housing 3 (FIG. 1). A projection lens 6 (FIG. 1) for projecting light onto a screen is disposed within the lens barrel 5. FIG. 2 exemplarily illustrates a case wherein the projection lens 6 is covered with a cap 35 for protection thereof. The projection direction is the direction along the light axis LA of the projection lens 6.

The projector 11 is capable of being used upside-down as well. That is to say, the projector 11 is capable of being used in two postures; one is a placed state wherein the projector 11 is placed on a placing surface with the actual vertical orientation as shown in FIG. 1, and the other is a suspended state wherein the projector 11 is vertically inverted from the state shown in FIG. 1 and is suspended from a suspending surface such as a ceiling.

Note that in the following, the upper side in FIG. 1 (the upper side in the placed state) will be described as the upper face of the projector 111, and the lower side in FIG. 1 (the lower side in the placed state) will be described as the lower face of the projector 11, to facilitate description.

A housing 3 is formed in the shape of a rectangular box which has smaller dimensions in the vertical direction as compared to the other directions, and which has an upper face portion 3a, a lower face portion 3b, a front face portion 3c, a back face portion 3d, a first side face portion 3e, and a second side face portion 3f. The upper face portion 3a makes of the face serving as the upper face of the projector 11 in the placed state. The lower face portion 3b makes of the face serving as the lower face of the projector 11 in the placed state. The front face portion 3c makes up the face in the projection direction. The rear face portion 3d makes up the face in the direction opposite the projection direction. The first face portion 3e and second face portion 3f make up the faces parallel to the projection direction, intersecting with the upper face portion 3a and lower face portion 3b.

As shown in FIG. 2, the lower face portion 3b has formed therein multiple female screw portions 9 to which supporting members 7 (only one shown in the drawing) can be attached for placing the projector 11 on a placing surface. The female screw portions 9 are formed at the four corners of the lower face portion 3b, for example. The supporting members 7 each have a make screw portion 7a, and are fixed to the lower face portion 3b by being screwed to the female screw portions 9. The height of the projector 11 from the placing surface and the angle thereto can be adjusted by adjusting the degree of screwing the male screw portions 7a into the female screw portions 9. The projector 11 is placed on the placing face with space between the lower face portion 3b and the placing face.

Also, the lower face portion 3b is provided with female screw portions 10 to which suspending members 11 (a part thereof shown in abstract) for suspending the projector 11 from a ceiling or the like. Three female screw portions 10 are formed on the lower face portion 3b, over a relatively wide range, for example. The suspending members 11 are fixed to the lower face portion 3b by screws 13 (only one shown) being passed through the suspending members 11 and screwed to the female screw portions 10. The suspending members 11 are then fixed to a ceiling or the like by unshown screws or the like, whereby the projector 11 is suspended from the ceiling in a state vertically inverted from that of the placed state.

As shown in FIGS. 2 and 3, the lower face portion 3b has a filter replacement access lid 15 for accessing a later-described vent filter so as to enable replacing of the filter, and a lamp replacement access lid 17 for replacing a later-described lamp serving as a light source. These can be understood as being a part of the housing 3. Also, the lower face portion 3b has multiple intake ducts 19 and multiple intake ducts 21 for intake of air into the housing 3, and multiple vents 23 for venting air from the housing 3.

The front face portion 3c has an opening 25 formed for exposing the projection lens 6, as shown in FIG. 1. The opening 25 is disposed toward one side in the horizontal direction of the front face portion 3c (in FIG. 1, the left side as viewed from the front, i.e., toward the second side face portion 3f).

At the corner portion where the front face portion 3c and the first side face portion 3e intersect is provided a vent portion 27 for venting air from the housing 3, as shown in FIGS. 1 and 2. The vent portion 27 is opened from the front face portion 3c to the first side face portion 3e, and is configured of a front face vent portion 27a opened in the front face portion 3c and a side face vent portion 27b opened in the first side face portion 3e.

The vent portion 27 has vent louvers 29. The vent louvers 29 are formed integrally with the housing 3, for example. The vent louvers 29 have multiple blades, and the gaps formed between the multiple blades are opened away from the projection direction side and away from the light axis LA of the projection lens 6. The following is a specific example.

The vent louvers 29 include a front face louver 29a disposed in the front face vent portion 27a and a side face louver 29b disposed in the side vent portion 27b. The front face louver 29a has multiple front face blades 29c, and the side face louver 29b has multiple side face blades 29d.

The multiple front face blades 29c are plate-shaped members which are long and slender in the vertical direction, for example. The multiple front face blades 29c are disposed generally in parallel one with another with spacing therebetween, so that multiple slits 31a (gaps) are formed between the multiple front face blades 29c such that the inside of the housing 3 communicates with the outside thereof. The multiple front face blades 29c are positioned inclined in a direction away from the light axis LA of the projection lens 6, with this inclination being greater the closer the distance is to the projection direction side.

The multiple side face blades 29d are plate-shaped members which are long and slender in the vertical direction, for example. The multiple side face blades 29d are disposed generally in parallel one with another with spacing therebetween, so that multiple slits 31b (gaps) are formed between the multiple side face blades 29d such that the inside of the housing 3 communicates with the outside thereof. The multiple side face blades 29d are positioned inclined in a direction toward the projection direction; with this inclination being greater the closer the distance is to the outer side of the housing, i.e., the side away from the light axis LA of the projection lens 6. Accordingly, the slits are opened so as to face in the projection direction side and face away from the light axis LA of the projection lens 6.

As shown in FIG. 3, multiple intake/vent openings 33 are formed in the second side face portion 3f so as to perform air intake to the housing 3 and/or vent air from the housing 3. Also, various types of connection terminals are arrayed on the back face portion 3d, for connecting the projector 11 with an electric power supply, other devices, and so forth.

The housing 3 is configured of a lower case 37 and an upper case 39 being assembled, for example. The lower case 37 is a member configured of the entire face of the lower face portion 3b, and the lower face portion 3b sides of the front face portion 3c, back face portion 3d, first side face portion 3e, and second side face portion 3f. The upper case 39 is a member configured of the entire face of the upper face portion 3a, and the upper face portion 3a sides of the front face portion 3c, back face portion 3d, first side face portion 3e, and second side face portion 3f. A great portion of the front face portion 3c, back face portion 3d, first side face portion 3e, and second side face portion 3f, is configured of the upper case 39. the upper case 39 is placed over the lower case 37, with the two being fixed one to another by an appropriate method. For example, the upper case 39 and the lower case 37 may be fixed one to another by engaging portions provided to one engaging receptacles provided to the other, or screws passed through one being screwed to screw boss portions provided to the other. The lower case 37 and the upper case 39 are formed of resin, for example.

Figure 4:
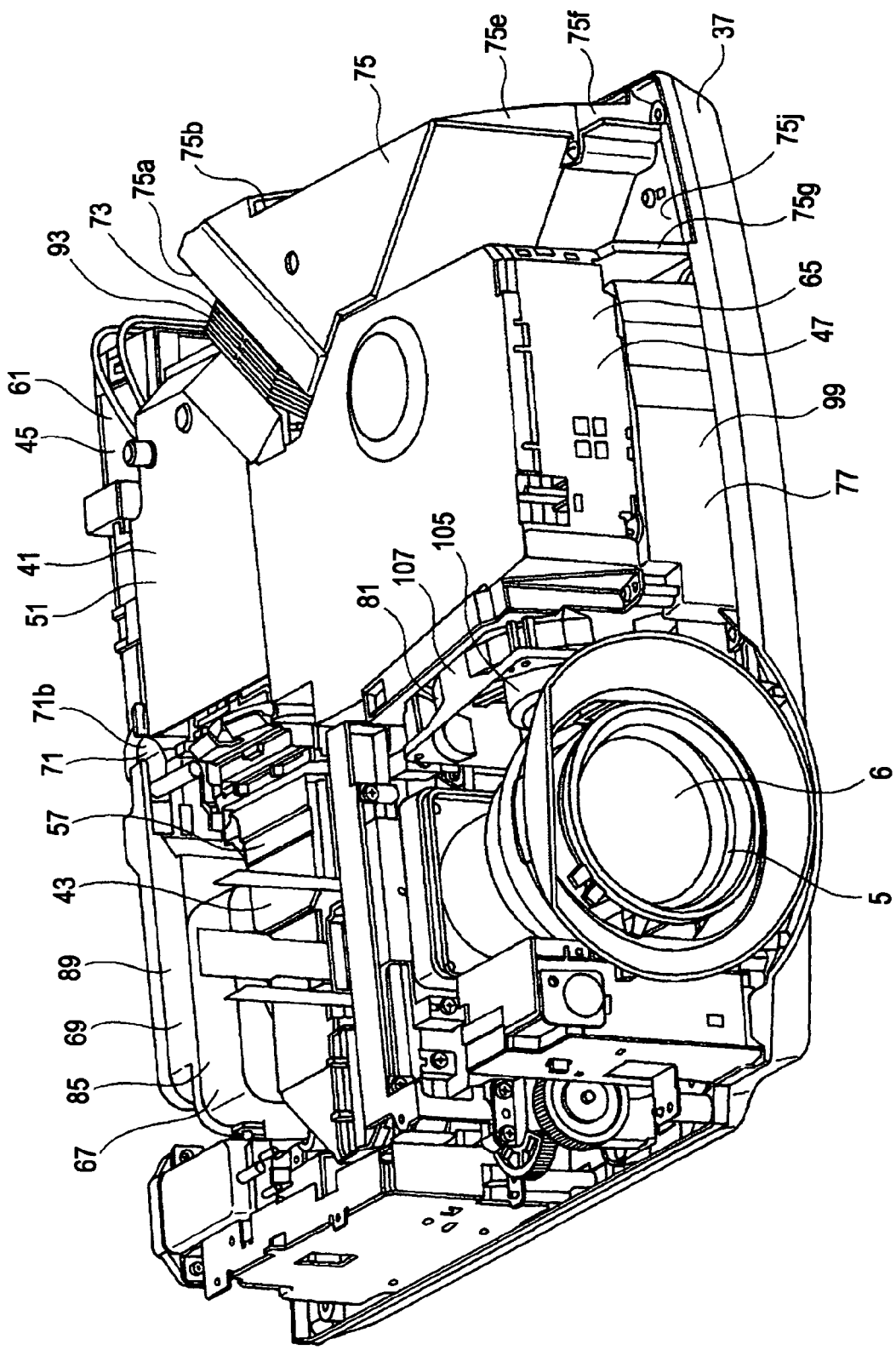
FIG. 4 is a perspective view illustrating the interior of the projection display device shown in FIG. 1.
Figure 5:
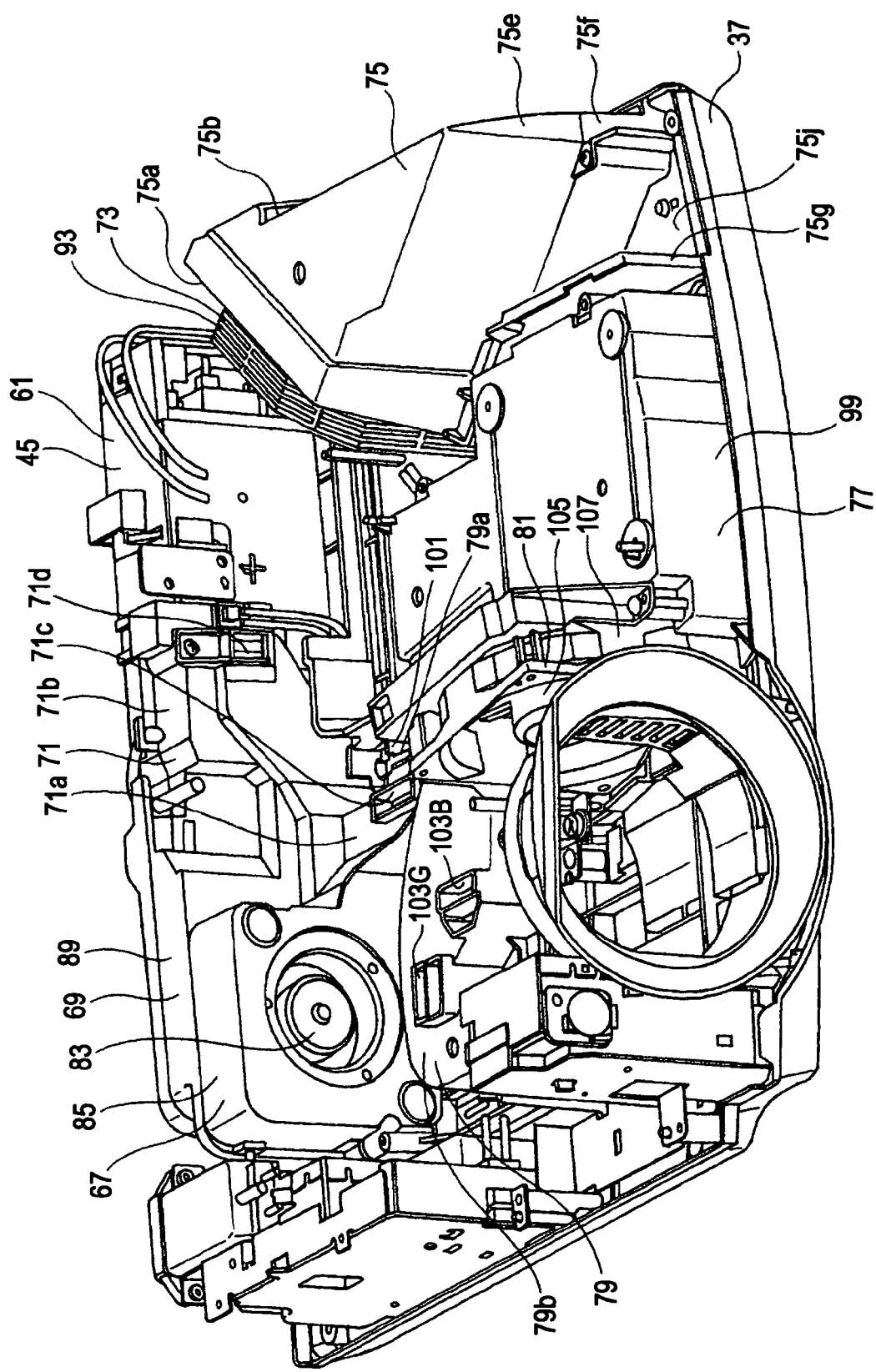
FIG. 5 is a perspective view illustrating the interior of the projection display device, in a state of multiple parts having been removed from the state shown in FIG. 4.
Figure 6:
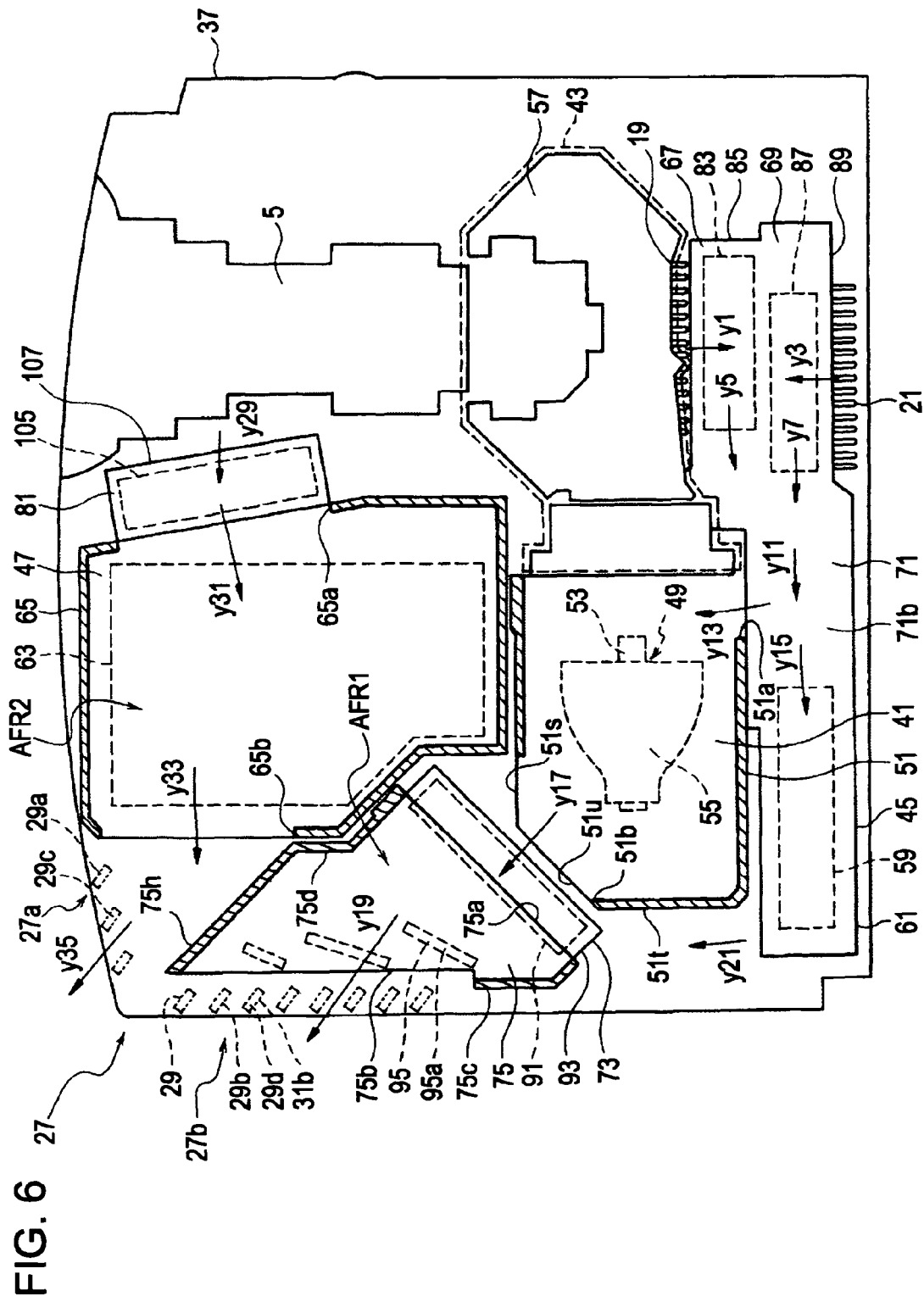
FIG. 6 is a plan view corresponding to FIG. 4.

FIG. 4 is a perspective view of the projector 11, where the upper case 39 has been removed therefrom so as to show the interior thereof, and FIG. 6 is perspective view of the projector 11, showing a state wherein some parts shown in FIG. 4 have been further removed. As shown in FIGS. 4 and 5, the projector 11 has multiple parts arrayed three-dimensionally within the housing 3.

Figure 7:
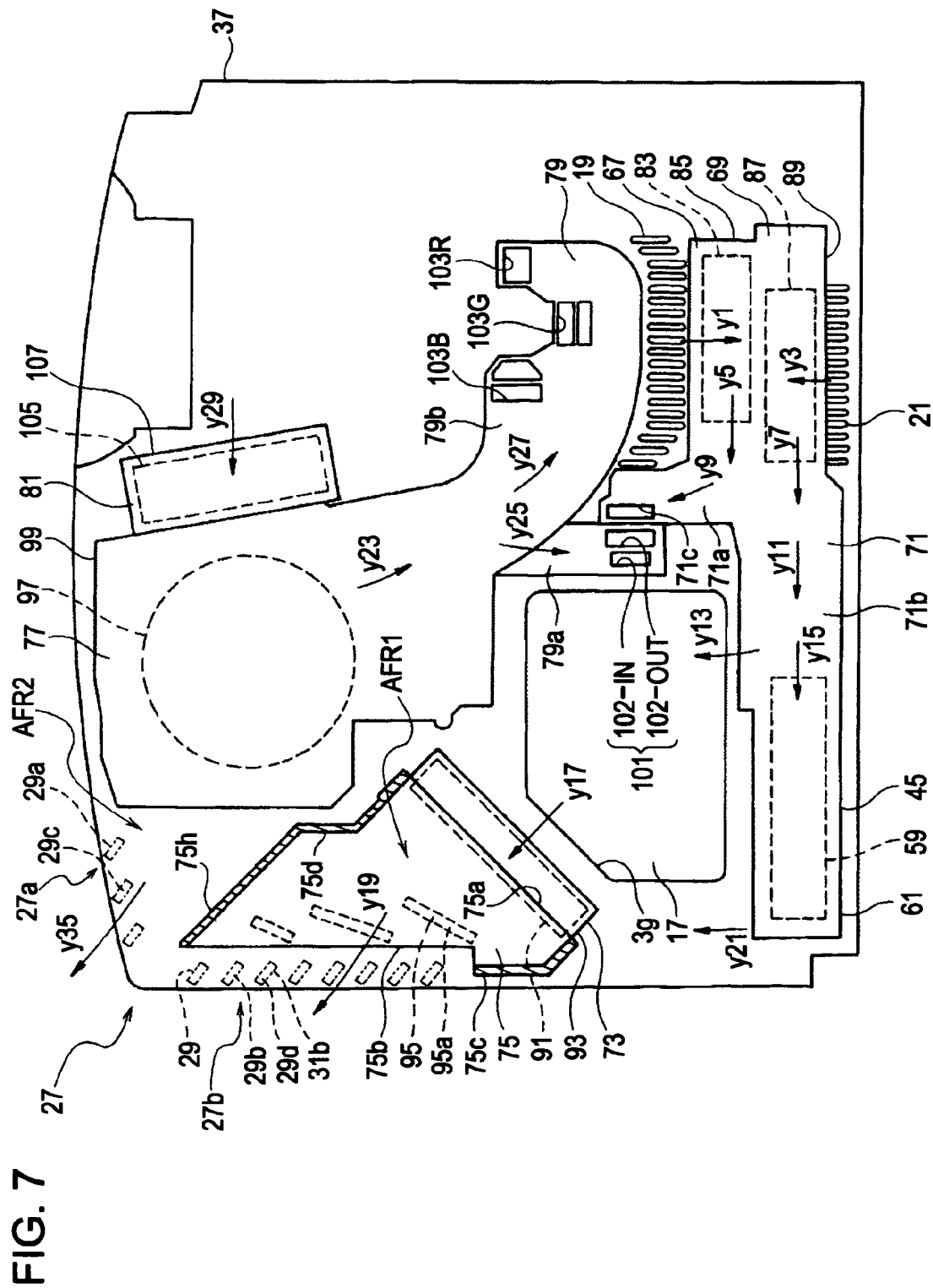
FIG. 7 is a plan view corresponding to FIG. 5.

FIG. 6 is a plan drawing illustrating the inside of the projector 11 in the state shown in FIG. 4, and FIG. 7 is a plan drawing illustrating the inside of the projector 11 in the state shown in FIG. 5. In FIGS. 6 and 7, some of the parts may be omitted, or the shape thereof simplified, or partially illustrated in cross-sectional form, to facilitate understanding of the drawings.

An overview of the configuration for projecting images with the projector 11 will be described with reference to FIGS. 4 through 7. As shown in FIGS. 4 and 6, the projector 11 includes a light source unit 41, an optical unit 43 for guiding light from the light source unit 41 to the lens barrel 5, a light source driving block 45 for driving and controlling the light source unit 41, and a control/driving block 47 for driving and controlling the entire projector 11 including the optical unit 43.

The lens barrel 5 and control/driving block 47 are disposed parallel to the projection direction, at the front face portion 3c side within the housing 3 (the lower side of the drawing in FIG. 4, the upper side of the drawing in FIG. 6). Note that the control/driving block 47 is disposed adjacent to the front face portion 3c of the housing 3. The optical unit 43 and the light source unit 41 are positioned in parallel as to the projection direction at the back face portion 3d side of the housing 3, such that the optical unit 43 is situated at the back face portion 3d side of the lens barrel 5 (the upper side of the drawing in FIG. 4, the lower side of the drawing in FIG. 6), and the light source unit 41 is positioned at the back face portion 3d side of the control/driving block 47. The light source driving block 45 is positioned at the back face portion 3d side of the light source unit 41. Note that the optical unit 43 is adjacent to the lens barrel 5, and the light source unit 41 is adjacent to the control/driving block 47. Also note that the light source driving block 45 is adjacent to the light source unit 41 and is also adjacent to the back face portion 3d of the housing 3.

The light source unit 41 has a lamp 49 (FIG. 6) and a lamp house 51 for storing the lamp 49. The lamp 49 has an arc tube 53 and a reflector 55 for reflecting light from the arc tube 53. Note that the arc tube 53 may be considered to be the light source, the lamp 49 may be considered to be the light source, or the light source unit 41 may be considered to be the light source.

The arc tube 53 is configured of, for example, a halogen lamp, metal-halide lamp, or xenon lamp. The reflector has a shape wherein the cross-sectional face is circular, and the longitudinal-section face is generally U-shaped, with a reflecting face on the inner side, for example. The greater portion of the arc tube 53 is disposed within the reflector 55. The reflector 55 is disposed with the opening thereof facing toward the optical unit 43 side (the right side of the drawing in FIG. 6).

The lamp house 51 has a trapezoid shape in the plan view as shown in FIG. 6. More specifically, in plan view, a corner portion, formed between the side of the lamp house 51 toward the front face portion 3c (the upper side of the drawing in FIG. 6) and generally parallel to the front face portion 3c (hereafter referred to as "first lamp side face portion 51s"), and the side of the lamp house 51 opposite the lens barrel 5 (the upper side of the drawing in FIG. 6) and generally parallel to the first side face portion 3e (hereafter referred to as "lamp back face portion 51t"), has been planed off to a relatively long size, forming an inclined side (inclined face portion 51u). As shown in FIG. 4, the height of the lamp house (the thickness in the vertical direction) is generally equal to the height of the interior space of the housing 3 (the height from the inner face of the lower face portion 3b to the inner face of the upper face portion 3a).

The optical unit 43 has multiple optical parts (most of which are omitted from FIGS. 4 and 6), and an optical unit case 57 for holding the multiple optical parts. As shown in FIGS. 4 and 6, the optical unit case extends form the lamp house 51 in a direction orthogonal to the projection direction (the horizontal direction of the drawings in FIGS. 4 and 6), reaching as far as the back side of the lens barrel 5 (the upper side of the drawing in FIG. 4, the lower side of the drawing in FIG. 6). The multiple optical parts are disposed within the optical unit case 57, between the optical unit case 57 and lamp house 51, and between the optical unit case 57 and the lens barrel 5.

The light source driving block 45 has one or multiple circuit boards 59 (FIG. 6), and a light source driving block case 61 storing the circuit board 59. Various types of ICs and the like are mounted onto the circuit board 59, configuring a power source circuit for controlling power to be supplied to the arc tube 53. The light source driving block case 61 is formed in the shape of a generally rectangular box which has smaller dimensions in the projection direction (the vertical direction in the drawing in FIG. 6). As shown in FIGS. 4 and 5, the height of the light source driving block case 61 (thickness in the vertical direction) is generally the same as the height of the interior space of the housing 3. The light source driving block case 61 is disposed so as to follow the back face portion 3d of the housing (orthogonal to the projection direction). The circuit board 59 is disposed within the light source driving block case 61 so as to following the back face portion 3d of the housing 3, and so as to be separated from the inner face of the light source driving block case 61.

As shown in FIGS. 4 and 6, the control/driving block 47 has one or multiple circuit boards 63 (FIG. 6), and a control/driving block case 65 storing the circuit board 63. Various types of ICs and the like are mounted onto the circuit board 63, configuring a control circuit for controlling operations of a later-described liquid crystal display panel and a power source circuit for controlling power to be supplied to a fan. The control/driving block case 65 is formed in the shape of a generally rectangular box which has smaller dimensions in the vertical direction. The height of the control/driving block case 65 (thickness in the vertical direction) is generally half that of the height of the interior space of the housing 3. The control/driving block case 65 is disposed upon a later-described fan case 99 within the housing 3, so as to be disposed at the upper face portion 3a side of the housing. The circuit board 63 is disposed within the control/driving block case 65 so as to following the upper face portion 3a of the housing 3, and so as to be separated from the inner face of the control/driving block case 65.

Next, a configuration for cooling the above-described various parts of the projector 11 will be described with reference to FIGS. 4 through 7.

As shown in FIGS. 5 and 7, the projector 11 has a first sirocco fan 67, a second sirocco fan 69, and a first duct 71 for guiding air from the first sirocco fan 67 and second sirocco fan 69 to the components to be cooled, the first sirocco fan 67, second sirocco fan 69, and first duct 71 being provided at the back face of the housing 3 (the upper side of the drawing in FIG. 5, the lower side of the drawing in FIG. 7); a first axial flow fan 73 and an exhaust duct 75 provided to guide air from the first axial flow fan 73 to the outside of the housing 3, the first axial flow fan 73 and exhaust duct 75 being provided at the first side face portion 3e side of the housing 3 (the right side of the drawing in FIG. 5, the left side of the drawing in FIG. 7); a third sirocco fan 77, a second duct 79 for guiding air from the third sirocco fan 77 to the components to be cooled, and a second axial flow fan 81 disposed on the lens barrel 5 side of the third sirocco fan 77, the third sirocco fan 77, second duct 79, and second axial flow fan 81 being provided at the front face side of the housing 3 (the lower side of the drawing in FIG. 5, the upper side of the drawing in FIG. 7).

As shown in FIGS. 4 through 7, the first sirocco fan 67 is disposed adjacent to the back face side of the optical unit 43. The first sirocco fan 67 has, as shown in FIGS. 5 and 7, a vane portion 83, and a fan case 85 for storing the vane portion 83. Note that the vanes of the vane portion 83 are omitted from the drawing in FIG. 5. The vane portion 83 is axially supported by the fan case with the projection direction as the direction of the rotational axis. The vane portion 83 intakes air from the rotational axis direction and discharges the air in the radial direction by rotating. The fan case 85 has the rotational axis direction side of the vane portion 83, more specifically, the side thereof toward the front face of the housing 3 (upper side of the drawing in FIG. 7, toward the optical unit 43) opened so as to be capable of air intake. The fan case 85 communicates with the first duct 71 at the perimeter portion thereof surrounding the rotational axis of the vane portion 83. The height of the first sirocco fan 67 (fan case 85) i.e., the thickness in the vertical direction, is generally the same as the height of the interior space of the housing 3.

The second sirocco fan 69 is disposed adjacent to the back face portion 3d side of the first sirocco fan 67 (lower side of the drawing in FIG. 7). Also, the second sirocco fan 69 is disposed adjacent to the back face portion 3d of the housing 3. The second sirocco fan 69 has generally the same configuration as that of the first sirocco fan 67. The second sirocco fan 69 has, as shown in FIG. 7, a vane portion 87, and a fan case 89 for storing the vane portion 87. The vane portion 87 is axially supported by the fan case with the projection direction as the direction of the rotational axis. The vane portion 87 intakes air from the rotational axis direction and discharges the air in the radial direction by rotating. The fan case 89 has the rotational axis direction side of the vane portion 87, more specifically, the side thereof toward the front face of the housing 3 opened so as to be capable of air intake. The fan case 89 communicates with the first duct 71 at the perimeter portion thereof surrounding the rotational axis of the vane portion 87. The height of the first sirocco fan 67 (fan case 89) i.e., the thickness in the vertical direction, is generally the same as the height of the interior space of the housing 3.

Note that as shown in FIG. 7, multiple intake ducts 19 formed at the lower face portion 3b of the housing 3 as described above are arrayed along the air intake side face of the first sirocco fan 67. Also, the multiple intake ducts 21 formed at the lower face portion 3b of the housing 3 as described above are arrayed along the air intake side face of the second sirocco fan 69.

The first duct 71 is for guiding air from the first sirocco fan 67 and the second sirocco fan 69 to the light source unit 41, a part of the optical members of the optical unit 43, and the light source driving block 45. This will now be described in detail.

One end of the first duct 71 is connected to the fan case 85 of the first sirocco fan 67 and the fan case 89 of the second sirocco fan 69. As shown in FIGS. 5 and 7, the first duct 71 branches into two from the one side thereof into a first branch duct 71a which extends from the one side thereof to the optical unit 43 side (toward the center of the housing 3) and a second branch duct 71b which extends toward the light source driving block 45 side.

The first branch duct 71a is disposed on the lower face side of the interior space of the housing 3, and as can be understood from FIGS. 6 and 7, extends to the lower side of the optical unit 43. As shown in FIGS. 5 and 7, provided to the end portion of the first branch duct 71a is an air outlet 71c opening upwards, i.e., towards the optical unit 43 side. As can be understood from FIGS. 6 and 7, the air outlet 71c is situated between the optical unit case 57 and lamp house 51. Air blown out from the air outlet 71c is blown against the optical members of the optical unit 43 that are disposed between the optical unit case 57 and the lamp house 51.

As shown in FIGS. 5 and 7, the second branch duct 71b follows the back face portion 3d of the housing and extends to the light source driving block 45. As shown in FIG. 5, the height of the second branch duct 71b (the thickness in the vertical direction) is generally the same as the height of the interior space of the housing 3. However, there are portions of this second branch duct 71b which are formed lower than the height of the interior space of the housing 3. For example, a portion extending upwards from the lower side of the first sirocco fan 67 toward the light source driving block 45, and a portion expanding upwards from the lower side of the second sirocco fan 69 toward the light source driving block 45, are formed.

As shown in FIG. 6, the second branch duct 71b extends to the back side of the light source unit 41, with an air outlet 71d formed on the face of the second branch duct 71b which faces the light source unit 41 (on the inner side of the housing, toward the front face portion 3c), as shown in FIG. 5. An inlet 51a (FIG. 6) is formed at the position of the air outlet 71d facing the lamp house 51. Air blown out from the air outlet 71d is let into the lamp house via the inlet 51a. A vent 51b (FIG. 6) is formed at the first axial flow fan 73 side of the lamp house 51. Air heated by the lamp 49 of the light source unit 41 is discharged from the inlet 51a, and flows toward the first axial flow fan 73 side.

As shown in FIGS. 5 and 7, the second branch duct 71b is connected to the light source driving block case 61 of the light source driving block 45, with the interior thereof communicating. Accordingly, air guided by the second branch duct 71b is guided into the light source driving block case 61. The light source driving block case 61 has a vent formed for venting air guided by the second branch duct 71b, at an appropriate position. For example, an unshown vent opening at the inside of the housing is formed at the opposite side of the light source driving block case 61 from the connection portion of the second branch duct 71b thereto (right side of the drawing in FIG. 5, left side of the drawing in FIG. 6). Also, a vent is formed at the face of the light source driving block case 61 facing the lower face portion 3b of the housing 3. Note that the aforementioned multiple vents 23 formed in the lower face portion 3b of the housing 3 are situated beneath the light source driving block 45.

Note that the fan case 85 of the first sirocco fan 67, the fan case 89 of the second sirocco fan 69, the first duct 71, and the light source driving block case 61, may all be formed integrally, or may be formed of multiple parts assembled together, or may be partially formed integrally with each other, i.e., the way in which these members are formed can be determined as appropriate.

Also, description has been made with regard to a configuration wherein, of the first duct 71, the part where the air outlet 71c is formed (first branch duct 71a), the part where the vent 71d is formed (part of the second branch duct 71b), and the part communicating with the fan case 89 of the second sirocco fan 69 (part of the second branch duct 71b), communicate with both the fan case 85 of the first sirocco fan 67 and the fan case 89 of the sirocco fan 69, and therefore all parts communicate one with another, but a configuration may be made wherein, of the first duct 71, a part of the parts communicate with only one of the sirocco fans, and the other parts communicate with only the other sirocco fan.

The first axial flow fan 73 is primarily for venting air heated by the light source unit 41 to the outside of the housing 3. As shown in FIGS. 4 and 6, the first axial flow fan 73 is disposed adjacent to the light source unit 41. Specifically, the first axial flow fan 73 is adjacent to the first side face portion 3e side of the light source unit 41 (right in the drawing in FIG. 4, left in the drawing in FIG. 6, opposite the projection lens 6), and also the front face portion 3c side of the light source unit 41 (lower side in the drawing in FIG. 4, upper side in the drawing in FIG. 6). The first axial flow fan 73 is disposed facing the inclined face portion 51u of the lamp house 51 of the light source unit 41 (FIG. 6).

The first axial flow fan 73 has a vane portion 91 (FIG. 6) and a fan case 93 for storing the vane portion 91. In a plan view, the vane portion 91 is axially supported by the fan case 93 with a direction inclined as to the projection direction as the direction of the rotational axis. Specifically, the vane portion 91 is axially supported such that the rotational axis thereof extends from the light source unit 41 side toward the projection direction side but away from the light axis LA of the projection lens 6. The rotational axis of the vane portion 91 is inclined as to the projection direction at an angle of around 45°, for example. By rotating, the vane portion 91 intakes air from one side of the rotational axis direction (the light source unit 41 side) and vents this to the other side in the rotational axis direction (toward the outside of the housing). The fan case 93 is opened in both of the rotational axis directions of the vane portion 91, and is formed in a cage-like manner, for example. The height of the first axial flow fan 73 (fan case 93) (the thickness in the vertical direction) is generally the same as the height of the interior space of the housing 3.

The exhaust duct 75 is for guiding the air, sent out from the first axial flow fan 73, on out to outside the housing 3. The exhaust duct 75 has an inlet 75a whereby air is guided in by the first axial flow fan 73, and an outlet 75b for venting the air guided thereto. The exhaust duct 75 extends from the inlet 75a to the outlet 75b, generally toward the projection direction side but away from the light axis LA of the projection lens 6, as a whole. However, the outlet 75b is shifted toward the front face portion 3c side (upper side in the drawing in FIG. 6) as compared with a position obtained by projecting the inlet 75a in the rotational axis direction of the first axial flow fan 73. That is to say, the exhaust duct 75 extends so as to guide the air sent from the first axial flow fan 73 toward the front face portion 3c side, as compared to an arrangement wherein the exhaust duct 75 is not provided. The height of the exhaust duct 75 (the thickness in the vertical direction) is generally the same as the height of the interior space of the housing 3.

The specific shape of the exhaust duct 75 in plan view is as exemplarily illustrated below. As shown in FIG. 6, at the base portion of the first axial flow fan 73, the exhaust duct 75 extends somewhat in the rotational axis direction of the first axial flow fan 73. That is to say, both an outer face portion 75c of the exhaust duct 75 toward the outer side of the housing 3 (first side face portion 3e, at the left side in the drawing in FIG. 6), and an inner face portion 75d thereof at the inner portion of the housing 3 (projection direction side, at the upper side in the drawing in FIG. 6) extend in the rotational axis direction of the first axial flow fan 73. The outer face portion 75c reaches the first side face portion 3e, and form that position, bends and extends toward the front face (projection direction side, at the upper side in the drawing in FIG. 6) following the first side face portion 3e. On the other hand, the inner face portion 75d bends partway, extends toward the front face side following the first side face portion 3e side of the control/driving block 47 (left side in the drawing in FIG. 6), and further bends to extend in the rotational axis direction of the first axial flow fan 73 (e.g., a 45° angle as to the projection direction).

The outer face portion 75c extends toward the projection direction, and the inner face portion 75d extends inclined to the projection direction, so the extension lines of these intersect. In other words, the portion of the outer face portion 75c which bends and extends toward the front face side makes up the end face of the outlet side of the exhaust duct 75. The outlet 75b is formed on the outer face portion 75c. More specifically, the outer face portion 75c of the exhaust duct 75 is notched at the first side face portion 3e side (left side in the drawing in FIG. 6) and the front face portion 3c side (upper side in the drawing in FIG. 6) thereof, with the outlet 75b having a L-shape in plan view being formed thereat. The outlet 75b faces the side vent portion 27b on the side face described above. Accordingly, air discharged from the outlet 75b is discharged externally from the housing 3 via the side vent portion 27b.

As shown in FIG. 6, an inner louver 95 is provided to the side face louver 29b of the vent louvers 29 disposed at the side vent portion 27b, toward the inner side of the housing 3. Specifically, the inner louver 95 is provided to the outlet 75b of the exhaust duct 75. The inner louver 95 has multiple inner side blades 95a arrayed along the outlet 75b within the exhaust duct 75, the inner side blades 95a being arranged so as to intersect the opening direction of the slits 31b formed by the side face blades 29d. That is to say, the inner side blades 95a are disposed such that the closer to the front face portion 3c side (upper side in the drawing in FIG. 6), the further inside the housing 3 (toward the right in the drawing in FIG. 6) the inner side blades 95a are. The inner side blades 95a have a height generally spanning the height of the exhaust duct 75 (the thickness in the vertical direction). The light from the light source 41 and so forth is arranged so as to not be directly cast into the slits 31b.

As shown in FIG. 5, the exhaust duct 75 is configured of, for example, an upper member 75e making up the upper face portion and upper sides of the side portions of the exhaust duct 75, and a lower member 75f making up the lower sides of the side portions of the exhaust duct 75 and the lower face portion thereof, assembled together, by screws for example. The lower member 75f is fixed to the lower case 37 of the housing 3 with screws or the like. The inner louver 95 is formed integrally with the lower member 75f as a part thereof.

Note that the configuration method of the exhaust duct 75 and inner louver 95 is not restricted to that described above, and may be modified as appropriate. For example, a part of the exhaust duct 75 may be shared with another member, such as the lower face of the exhaust duct 75 being formed of the lower face portion 3b of the housing 3.

The third sirocco fan 77 is disposed below the control/driving block 47, as shown in FIGS. 4 through 7 (note however, that third sirocco fan 77 is hidden by the control/driving block 47 in FIG. 6). In other words, the control/driving block 47 and the third sirocco fan 77 are layered on the lower face portion 3b. The third sirocco fan 77 has, as shown in FIG. 7, a vane portion 97, and a fan case 99 for storing the vane portion 97. The vane portion 97 is axially supported by the fan case with the vertical direction as the direction of the rotational axis. The vane portion 97 intakes air from the rotational axis direction and discharges the air in the radial direction by rotating. The fan case 99 has the rotational axis direction side of the vane portion 97, more specifically, the side thereof toward the lower face portion 3b opened so as to be capable of air intake. The portion of the lower face portion 3b which faces the fan case 99 has a later-described air intake opened, covered with the aforementioned filter replacement access lid 15. The fan case 99 communicates with the second duct 79 at the perimeter portion thereof surrounding the rotational axis of the vane portion 97. The height of the third sirocco fan 77 (fan case 99) i.e., the thickness in the vertical direction, is around half the height of the interior space of the housing 3.

The second duct 79 is for guiding air from the third sirocco fan 77 to the optical members of the optical unit 43. This will now be described in detail.

One end of the second duct 79 is connected to the fan case 99 of the third sirocco fan 77. As shown in FIGS. 5 and 7, the second duct 79 branches into two from the one side thereof into a third branch duct 79a (almost not visible in FIG. 5 due to being hidden behind second axial flow fan 81) which extends from the one side thereof somewhat toward around the back face portion 3d side and then extends to the back face portion 3d side, and a fourth branch duct 79b which extends toward the second side face portion 3f side (left in the drawing in FIG. 5, right in the drawing in FIG. 7).

The third branch duct 79a has a height (thickness in the vertical direction) around that of the fan case 99 of the third sirocco fan 77, and extends along the base face side of the interior space of the housing 3. The end of the third branch duct 79a reaches the lower side of an end of the optical unit 43 at the light source unit 41 side thereof, as can be understood from FIGS. 6 and 7. As shown in FIGS. 5 and 7, an air outlet 101 is formed on the end of the third branch duct 79a which opens upwards, i.e., toward the optical unit 43 side. As shown in FIG. 7, the air outlet 101 has an air outlet 101IN at the incident side of light, and an air outlet 101OUT at the emission side of light. As can be understood from FIGS. 6 and 7, in plan view the air outlet 101 is situated between the optical unit case 57 and the lamp house 51 of the light source unit 41. Air blown out from the air outlet 101 is blown against the optical parts of the optical unit 43 that are situated between the optical unit case 57 and the lamp house 51.

The fourth branch duct 79b has a height (thickness in the vertical direction) around that of the fan case 99 of the third sirocco fan 77, and extends along the base face side of the interior space of the housing 3. The end of the fourth branch duct 79b reaches the lower side of an end of the optical unit 43 at the lens barrel 5 side thereof, as can be understood from FIGS. 6 and 7. As shown in FIGS. 5 and 7, three air outlets 103R (hidden from view in FIG. 5), 103G, and 103B are formed on the end of the fourth branch duct 79b which open upwards, i.e., toward the optical unit 43 side. As can be understood from FIGS. 6 and 7, in plan view the air outlets 103 are situated between the optical unit case 57 and the lens barrel 5. Air blown out from the air outlets 103 is blown against the optical parts of the optical unit 43 that are situated between the optical unit case 57 and the lens barrel 5.

The second axial flow fan 81 is for sending air to the control/driving block 47 is as to cool the control/driving block 47. As shown in FIGS. 4 and 6, the second axial flow fan 81 is disposed adjacent to the control/driving block 47. Specifically, the second axial flow fan 81 is disposed in a relatively narrow space between the control/driving block 47 and the lens barrel 5, adjacently facing the lens barrel 5 side of the control/driving block 47 and the control/driving block 47 side of the lens barrel 5.

The second axial flow fan 81 has a vane portion 105 (FIGS. 4 and 5 only show the portion of the shaft to which the vanes of the vane portion 105 are fixed) and a fan case 107 for storing the vane portion 105. In a plan view, the vane portion 105 is axially supported by the fan case 107 with a direction generally orthogonal to the projection direction as the direction of the rotational axis. By rotating, the vane portion 105 intakes air from one side of the rotational axis direction (the lens barrel 5 side) and vents this to the other side in the rotational axis direction (the control/driving block 47 side). The fan case 107 is opened in both of the rotational axis directions of the vane portion 105. The height of the second axial flow fan 81, or rather, the fan case 107 (the thickness in the vertical direction), is generally the same as the height of the interior space of the housing 3.

The control/driving block case 65 has formed therein an opening 65*a* (FIG. 6) at the face facing the second axial flow fan 81, and an opening 65*b* in the face facing the first side face portion 3*e* side (right in the drawing in FIG. 4, left in the drawing in FIG. 6). Air sent out from the second axial flow fan 81 is guided into the control/driving block case 65 via the opening 65*a*, and is vented from the control/driving block case 65 via the opening 65*b*.

The outer side of the opening 65*b* and the inner side of the housing 3 are formed so as to be capable of guiding the air vented from the opening 65*b* to the front face vent portion 27*a*. Specifically, of the inner face portion 75*d* of the second duct 79, an inner face tip portion 75*h* at the toward the outer side of the housing is positioned so as to be inclined as to the direction of exhaust from the opening 65*b*, thereby cutting off flow from the opening 65*b* to the side vent portion 27*b*, and also changing the flow of air from the opening 65*b* to flow toward the front face vent portion 27*a* side.

At the outer side of the opening 65*b* and inner side of the housing 3, the upper face of the channel is configured of the upper face portion 3*a* of the housing 3. As shown in FIG. 5, the lower face of the channel is formed of a lower face component 75*j* of the lower member 75*f* of the exhaust duct 75. The face of the channel immediately below the opening 65*b* is configured of a wall 75*g* of the lower member 75*f*. Note that the channel is not restricted to the above configuration method, and may be configured of the lower face portion 3*b* of the housing 3, or the wall 75*g* may be omitted with the fan case 99 of the third sirocco fan 77 configuring a part of the channel.

Figure 8:
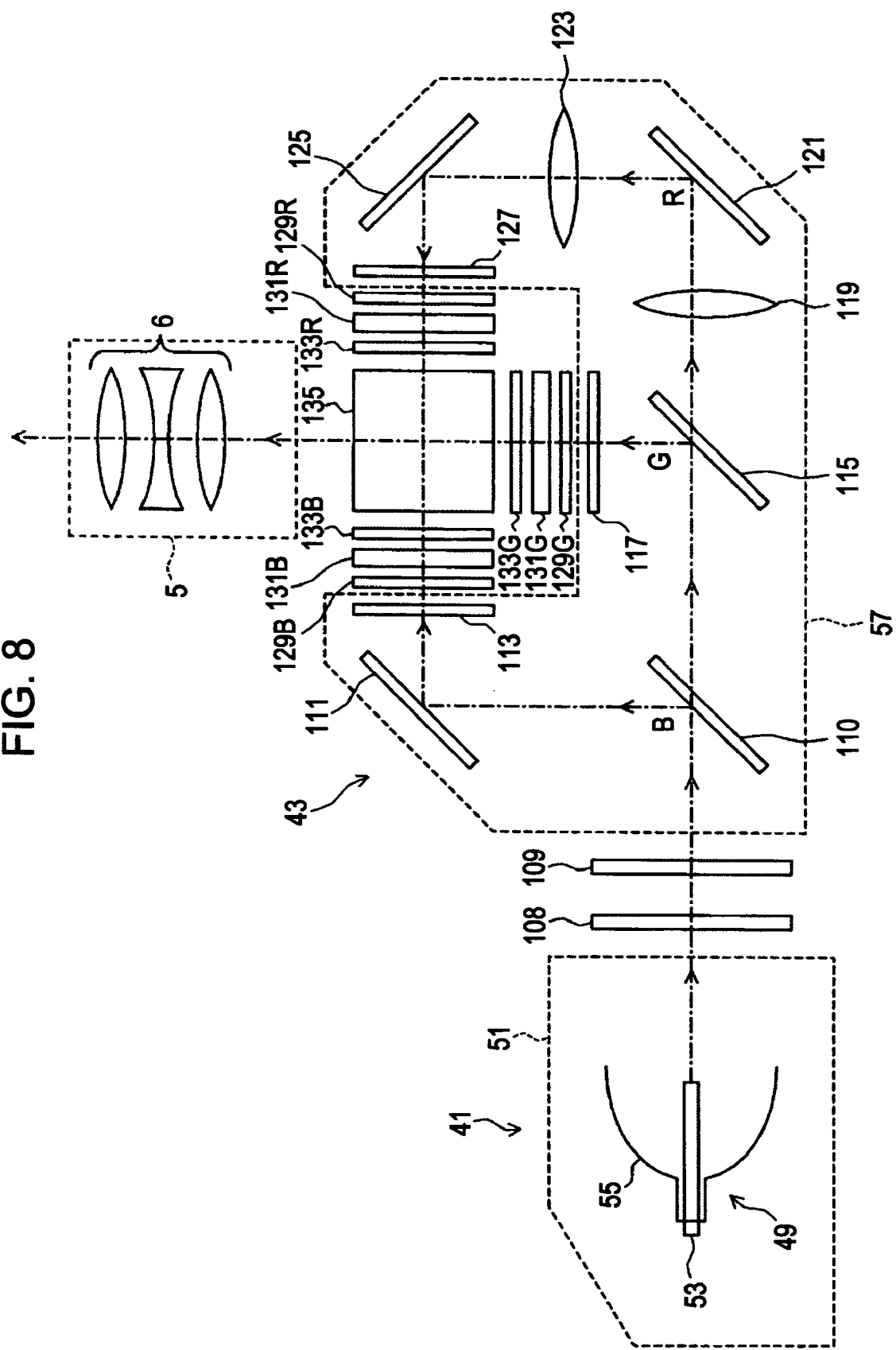
FIG. 8 is a plan view illustrating a schematic configuration of an optical system of the projection display device shown in FIG. 1.

FIG. 8 is a plan drawing schematically illustrating the configuration of the optical system of the projector 11. Note that in FIG. 8, optical parts of the optical unit 43 are illustrated with only representative parts being exemplarily illustrated in abstract. With the optical unit 43, appropriate optical parts other than those shown in FIG. 8 may be disposed, and optical parts shown in FIG. 8 may be modified or omitted as appropriate.

The optical unit 43 has a fly's eye lens 108 and a PS converter 109 between the lamp house 51 of the light source unit 41 and the optical unit case 57. Light from the lamp 49 is made uniform by the fly's eye lens 108, and the light which has become uniform has the polarization direction thereof aligned by the PS converter 109.

The optical unit 43 has multiple optical parts disposed within the optical unit case 57, for splitting light from the PS converter 109 into light of the colors R, G, and B, and for guiding to the end of the optical unit case 57 at the lens barrel 5 side thereof.

Specifically, light from the PS converter 109 has the B light thereof reflected off of a dichroic mirror 110, with the remaining light transmitting. The B light which has reflected and headed in the projection direction (upward in the drawing in FIG. 8) is reflected off of a reflecting mirror 111 and advances in a direction orthogonal to the projection directions, is collimated by a condenser lens 113, and is emitted from the optical unit case 57.

The light which has transmitted the dichroic mirror 110 has the G light thereof reflected by a dichroic mirror 115, and the R light is transmitted. The B light which is reflected and headed in the projection direction is collimated by a condenser lens 117, and is emitted from the optical unit case 57.

The R light which has transmitted the dichroic mirror 110 transmits a relay lens 119, is reflected off of a reflecting mirror 121 and heads in the projection direction, transmits a relay lens 123 and is reflected off of a reflecting mirror 125 and advances in a direction orthogonal to the projection directions, is collimated by a condenser lens 127, and is emitted from the optical unit case 57.

The optical light unit 43 has, between the optical unit case 57 and lens barrel 5, incident side polarization plates 129R, 129G, and 129B, liquid crystal panels 131R, 131G, and 131B serving as light valves, emission side polarization plates 133R, 133G, and 133B, and a cross prism 135.

Light emitted from the optical unit case 57 has light of a predetermined polarization direction transmitted by the incident side polarization plates 129, modulated by the liquid crystal panels 131, light of a predetermined polarization direction is transmitted by the emission side polarization plates 133, and input to the cross prism 135. The cross prism 135 synthesizes the light from the emission side polarization plates 133 corresponding to the respective colors, and emits the synthesized light to the lens barrel 5.

Note that the liquid crystal panels 131 have input of picture signals based on predetermined image data from electronic circuits configured on the circuit board 63 of the control/driving block 47. The liquid crystal panels 131 then modulate the light input thereto by changing the array orientation of the liquid crystal molecules in accordance with the picture signals.

The light cast into the lens barrel 5 is projected to an unshown screen by the projection lens 6. Thus, the image synthesized by the cross prism 135 is displayed on the screen in an enlarged manner. Note that FIG. 8 exemplarily illustrates a case wherein the projection lens 6 is configured of a lens unit having multiple lenses.

The flow of air in the projector 11 having the above-described schematic configuration will now be described.

Returning to FIG. 7, as indicated by arrow y1, upon the first sirocco fan 67 rotating, air is let into the housing 3 from outside the housing 3, via the multiple intake ducts 19. The air which has been let in flows in toward the first sirocco fan 67, in the rotational axis direction thereof. Also, as indicated by arrow y3, upon the second sirocco fan 69 rotating, air is let into the housing 3 from outside the housing 3, via the multiple intake ducts 21. The air which has been let in flows in toward the second sirocco fan 69, in the rotational axis direction thereof. The air which has flowed in to the first sirocco fan 67 and the second sirocco fan 69 is sent into the first duct 71 as indicated by arrows y5 and y7.

A part of the air sent into the first duct 71 flows into the first branch duct 71*a* as indicated by arrow y9, and blows out from the air outlet 71*c*. This air is then blown against the optical parts disposed between the lamp house 51 (FIG. 6, etc.) and optical unit case 57 (FIG. 6, etc.), such as the PS converter 109 (FIG. 8) and so forth, so as to cool these optical parts.

The rest of the sent into the first duct 71 flows into the second branch duct 71*b* as indicated by arrow y11. As indicated by arrow y13 in FIG. 6, part of the air sent into the second branch duct 71*b* blows out from the air outlet 71*d* (FIG. 5), and is guided into the lamp house 51 via the inlet 51*a*. The rest of the air sent into the second branch duct 71*b* is guided into the light source driving block case 61 as indicated by arrow y15.

As indicated by arrow y17, the air guided into the lamp house 51 flows through the lamp house 51 and cools the lamp 49, and then is vented from the lamp house 51 and sucked into the first axial flow fan 73. The air sucked into the first axial flow fan 73 is guided by the exhaust duct 75 to the corner portion where the front face portion 3*c* and first side face portion 3*e* of the housing 3 intersect, and pass through the inner louver 95 and the side face louver 29*b*. The air which has passed through the side face louver 29*b* is vented toward the projection direction side and at a direction away from the light axis LA of the projection lens 6 (e.g., a direction inclined by 45° as to the projection direction).

The air led into the light source driving block case 61 flows through the light source driving block case 61 and cools the circuit board 59. Following cooling the circuit board 59, the air is vented from the light source driving block case 61 via an unshown opening formed in the light source driving block case 61 at the first side face portion 3*e* side thereof, as indicated by arrow y19. This air is then vented externally from the housing 3 by the first axial flow fan 73 in the same way as with the air vented from the lamp house 51. Also, the air which has cooled the circuit board 59 is vented from the light source driving block case 61 via an unshown opening formed in the light source driving block case 61 at the lower face portion 3*b* side thereof, and is then vented externally from the housing 3 via the multiple vents 23.

Upon the third sirocco fan 77 (FIG. 7) rotating, air outside of the housing 3 is led into the housing 3 by a later-described intake duct formed at the lower face portion 3*b* of the housing 3. The air that has been taken in flows into the third sirocco fan 77 in the rotational axis direction thereof, and as indicated by arrow 23 in FIG. 7, is sent into the second duct 79 connected to the radial perimeter portion of the third sirocco fan 77.

A part of the air sent into the second duct 79 flows into the third branch duct 79*a* as indicated by the arrow y25, and is blown out from the air outlet 101. The air that is blown out is blown against the optical parts disposed between the lamp house 51 (FIG. 6, etc.) and optical unit case 57 (FIG. 6, etc.), such as the PS converter 109 (FIG. 8) and so forth, so as to cool these optical parts.

The rest of the air sent into the second duct 79 flows into the fourth branch duct 79*b* as indicated by the arrow y27, and is blown out from the air outlet 103. The air that has been blow out is blown against the optical parts disposed between the lens barrel 5 (FIG. 6, etc.) and optical unit case 57 (FIG. 6, etc.), such as the incident side polarization plates 129, liquid crystal panels 131, emission side polarization plates 133 (FIG. 8), and so forth, so as to cool these optical parts.

In FIG. 6, upon the second axial flow fan 81 rotating, as indicated by the arrow y29, the air around the lens barrel 5 and so forth flows into the second axial flow fan 81 in the rotational axial direction thereof. At this time, air outside of the housing 3 is led into the housing 3 by a later-described intake duct formed at the lower face portion 3*b* of the housing 3. The air which has flowed into the second axial flow fan 81 is then sent into the control/driving block case 65 by the second axial flow fan 81 via the opening 65*a* as indicated by arrow y31, so as to cool the circuit board 63. As indicated by arrow y33, the air which has cooled the circuit board 63 is vented from the control/driving block case 65 via the opening 35*b*. The vented air is guided to the front face louver 29*a* by the inner face tip portion 75*h* of the exhaust duct 75 and so forth, and passes through the front face louver 29*a*. The air which has passed through the front face louver 29*a* is vented toward the projection direction side and at a direction away from the light axis LA of the projection lens 6 (e.g., a direction inclined by 45° as to the projection direction).

The exhaust duct 75 forms a first airflow path AFR1 used for cooling parts, as shown in FIGS. 6 and 7. The starting point of the first airflow path AFR1 is the inlet 75*a*, and the end thereof is the side vent portion 27*b*. The side vent portion 27*b* is situated at the projection direction side and at a direction away from the light axis LA of the projection lens 6, as to the inlet 75*a*, so it can be said that while the first airflow path AFR1 is extended in the direction toward the projection direction side and also away from the light axis LA of the projection lens 6, the first airflow path AFR1 does extend at least toward the projection direction side. The first airflow path AFR1 extends at the side following the projection direction (the first side face portion 3*e*).

Also, the control/driving block case 65, and the various members on the first side face portion 3*e* side (left side in the drawing in FIG. 6) of the control/driving block case 65 (the inner face tip portion 75*h* of the exhaust duct 75, upper face portion 33*d* of the housing 3, the lower face portion 75*j* of the lower member 75*f* (FIG. 4), and the wall 75*g* of the lower member 75*f* (FIG. 4)), make up a second airflow path AFR2 used for cooling the parts. The starting point of the second airflow path AFR2 is the opening 65*a*, and the end thereof is the front vent portion 27*a*. The second airflow path AFR2 extends from the projection lens 6 side to the first side face portion 3*e* where the second airflow path AFR2 is disposed, at the front face portion 3*c* within the housing 3 (projection direction side).

The first airflow path AFR1 and second airflow path AFR2 extend in different directions from each other, and are adjacent at the downstream end. The air heated by the lamp 49 and circuit board 63 of the control/driving block 47 can be vented in a direction toward the projection direction side and also a direction away from the light axis LA of the projection lens 6, due to the operations of the inner face portion 75*d* of the exhaust duct 75 and the vent louvers 29.

Figure 9:
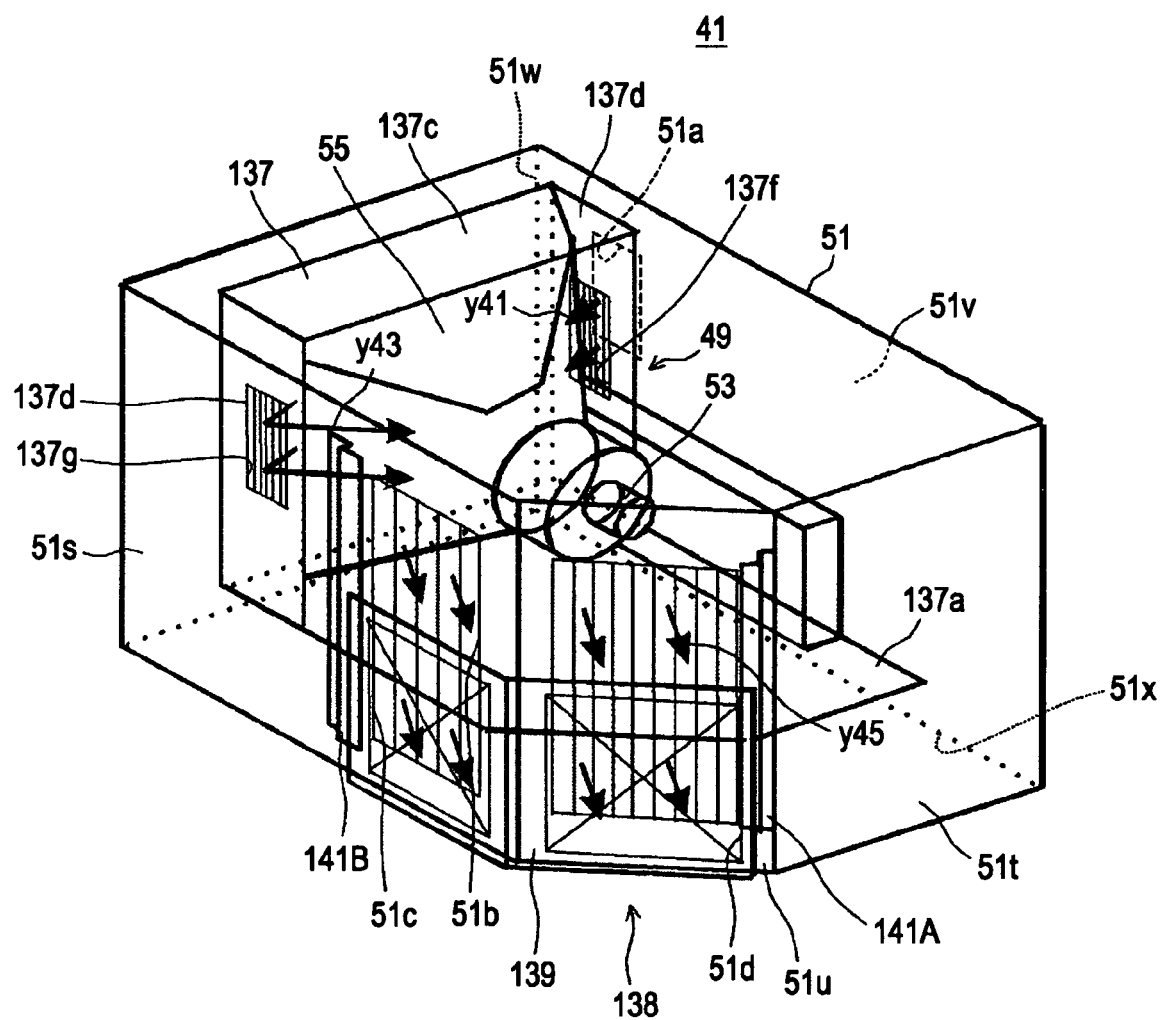
FIG. 9 is a transparent view of a light source unit of the optical system of the projection display device shown in FIG. 1.

The configuration of the light source unit 41 will be described with reference to FIGS. 9 through 11B, following which the flow of air within the light source unit 41 will be described. FIG. 9 is a transparent view of the light source unit 41, as seen from the first axial flow fan 73 side and the upper face portion 3*a* side of the housing 3.

The light source unit 41 has the above-described lamp 49 and lamp house 51, a holding member 137 for detachably mounting the lamp 49 to the lamp house 51, and an adjusting mechanism 138 for adjusting the opening area of the vent 51*b* of the lamp house 51.

The face of the lamp house at the lower face portion 3*b* side of the housing 3 (the lower side in the drawing in FIG. 9) is opened, with an open portion 51*x* formed thereat. The lamp house 51 is formed in a trapezoid shape in plan view. Note however, that the face which the lamp 49 faces is opened, with an open portion 51*w* formed thereat. The above-described inlet 51*a* is formed at a second lamp side face portion 51*v* of the lamp house 51 toward the back face portion 3*d* side of the housing 3, on the open portion 51*w* side.

The above-described vent 51*b* is formed spanning a first lamp side face portion 51*s* formed on the lamp house 51 toward the front face portion 3*c* of the housing 3 (left side in the drawing in FIG. 9) and the inclined face portion 51*u* continuing from the first lamp side face portion 51*s*, so the vent 51*b* has a side face vent 51*c* formed at the first lamp side face portion 51*s* and an inclined face vent 51*d* formed at the inclined face portion 51*u*. The side face vent 51*c* is formed at the inclined face portion 51*u* side of the first lamp side face portion 51*s*. The inclined face vent 51*d* is formed generally over the entire area of the inclined face portion 51*u*.

The diameter of the vent 51*b* in the vertical direction is set so as to span from above the center of the lamp 49 to below the center thereof. Specifically, the vent 51*b* has a size spanning generally the top of the lamp 49 to the bottom thereof. Note that the lamp house 51 is a size capable of storing the lamp 49 and is designed as small as absolutely necessary in light of various purposes, so the vent 51*b* is opened from around the top to around the bottom of the lamp house 51. The diameters of the side face vent 51*c* and the inclined face vent 51*d* in the vertical direction may differ, though the present embodiment exemplarily illustrates a case wherein these are the same.

The vent 51*b* may be formed as a single opening, or of multiple slits, or of multiple openings having a suitable size, such as multiple spaces in a gridwork or multiple spaces in a punched grill. FIG. 9 exemplarily illustrates a case wherein the vent 51*b* is configured of multiple slits formed of grill bars extending vertically, to facilitate illustrating of the range of the vent 51*b*.

The holding member 137 has a holding base portion 137*a* disposed at the lower face portion 3*b* side of the lamp 49 (lower side in the drawing in FIG. 9), a first holding side face portion 137*b* surrounding the perimeter of the reflector 55 of the lamp 49 along with the holding base portion 137*a*, a holding upper face portion 137*c*, a second holding side face portion 137*d*, and a holding front face portion 137*e* for closing off the opening of the reflector 55 (see FIG. 11).

The holding base portion 137*a* is configured of a plate-shaped member having a wider area than the lamp 49 in plan view. The holding upper face portion 137*c* covers above the reflector 55, at least at the opening side of the reflector 55.

The first holding side face portion 137*b* covers the second lamp side face portion 51*v* side of the reflector 55 at the opening side of the reflector 55 at least. Formed on the first holding side face portion 137*b* is an inlet 137*f* for guiding air from the inlet 51*a* into the reflector 55.

The second holding side face portion 137*d* covers the first lamp side face portion 51*s* side of the reflector 55 at the opening side of the reflector 55 at least. Formed on the second holding side face portion 137*d* is an inlet 137*g* for discharging air within the reflector 55.

The holding front face portion 137*e* has formed therein an opening 137*h* (see FIG. 11) for allowing light, which the arc tube 53 has generated within the reflector 55, to pass through. The opening 137*h* is closed off by a light-transmitting member 137*j* (see FIG. 11).

The lamp 49 is fixed to the holding member 137 in an appropriate way, such as by an engaging member or screws or the like. The holding member 137 holding the lamp 49 is stored within the lamp house 51 from the open portion 51*x* of the lamp house 51, and is fixed to the lamp house 51 in an appropriate way, such as by an engaging member or screws or the like.

As can be understood from FIGS. 6 and 7, a lamp replacement access opening 3*g* (FIG. 7), closed off by the lamp replacement access lid 17 (FIG. 7) is formed in the lower face portion 3*b* of the housing, directly below the light source unit 14 (FIG. 6). The lamp replacement access lid 17 is fixed to the lower face portion 3*b* of the housing 3 by an engaging member or screw or the like, and is detachable from the lower face portion 3*b*. At the time of replacing the lamp 49, the lamp replacement access lid 17 is detached from the lower face portion 3*b*. The holding member 137 holding the lamp 49 is detachably removed from the lamp house 51 within the housing 3 so as to be removed from the housing 3 though the lamp replacement access opening 3*g*, and also is returned thereto thereby.

The adjusting mechanism 138 is for adjusting the opening area of the vent 51*b* such that in a placed state of the projector 11, the opening area above the vent 51*b* is greater than the opening area below, and in a suspended state thereof, the opening area above the vent 51*b* (the lower side in the placed state) is greater than the opening area of the lower side (the upper side in a placed state).

The adjusting mechanism 138 has an adjusting member 139 for closing off a part of the side face vent 51*c*, and guide members 141A and 141B (hereinafter, A and B may be omitted) for holding the adjusting member 139 so as to be movable.

The adjusting member 139 has a side face adjusting member 139*a* for adjusting the opening area of the side face vent 51*c*, and an inclined face adjusting member 139*b* for adjusting the opening area of the inclined face vent 51*d*. The side face adjusting member 139*a* is formed in a plate shape following the first lamp side face portion 51*s*, and the inclined face adjusting member 139*b* is formed overall as a bent plate.

The width (horizontal direction) of the adjusting member 139 is set so as to span the vent 51*b*, that is to say, the width of the side face adjusting member 139*a* is of a width equal to or greater than the horizontal direction diameter of the side face vent 51*c*, and the width of the inclined face adjusting member 139*b* is of a width equal to or greater than the horizontal direction diameter of the inclined face vent 51*d*. The length of the adjusting member 139 in the vertical direction is smaller than the vent 51*b*. For example, the length of the adjusting member 139 in the vertical direction is around half the diameter of the vent 51*b* in the vertical direction, and/or is around half the diameter of the lamp house 51 in the vertical direction.

The guide members 141 hold the adjusting member 139 so as to be capable of moving vertically as to the lamp house 51. The guide members 141 are situated on both end portions of the adjusting member 139 in the horizontal direction, and extend vertically. The guide members 141 form a gap between as to the outer perimeter face of the lamp house 51 (specifically, the inclined face portion 51*u* and first lamp side face portion 51*s*) to which the adjusting member 139 can be inserted. The adjusting member 139 is inserted in the gap between the guide members 141 and the lamp house 51, and thus is attached so as to be vertically slidable as to the lamp house 51.

Figure 10:
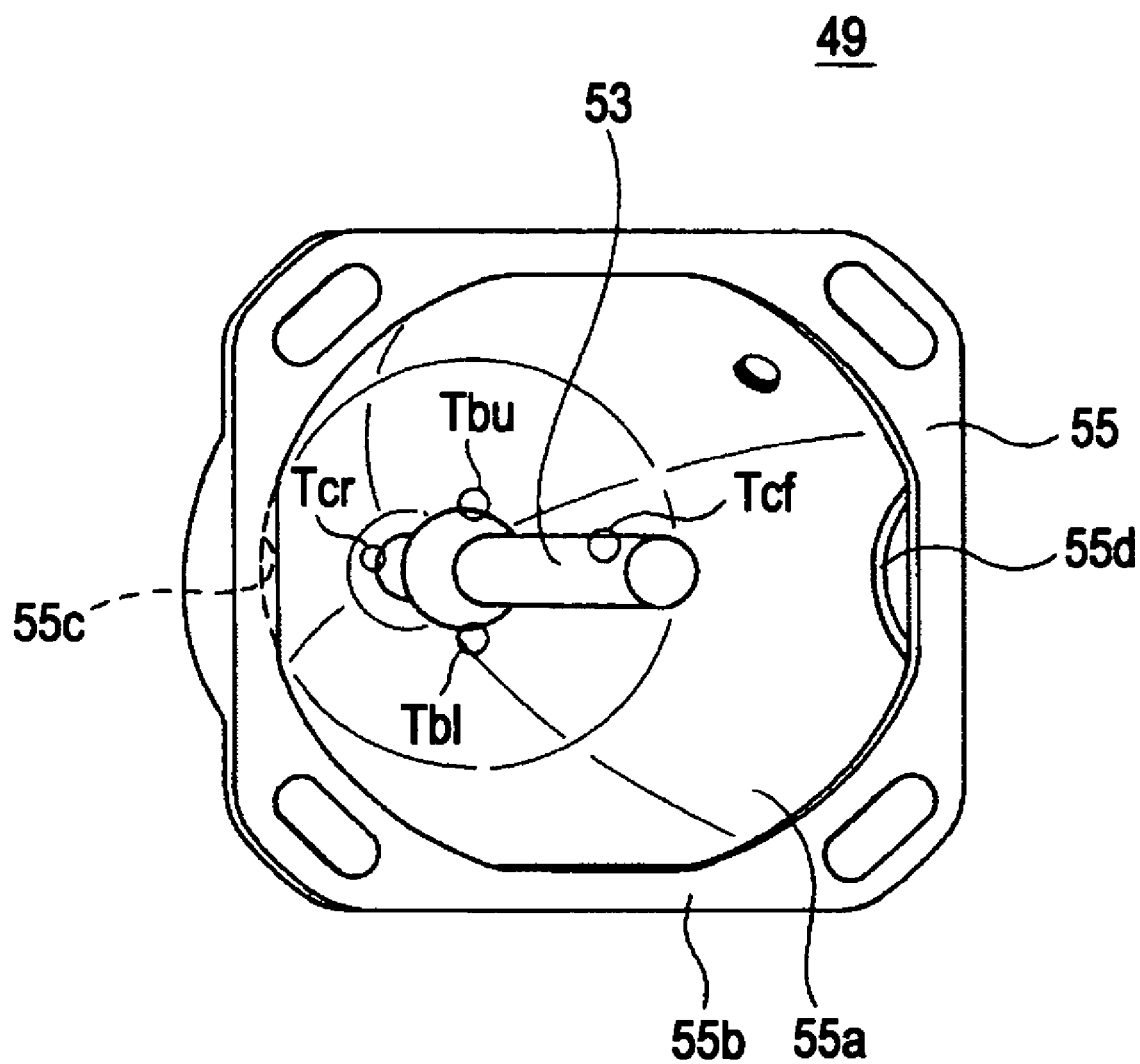
FIG. 10 is a perspective view of a lamp of the optical system of the projection display device shown in FIG. 1.

FIG. 10 is a perspective view of the lamp 49. The reflector 55 has a recess 55*a* for storing the arc tube 53, and a flange portion 55*b* formed on the edge of the opening of the recess 55*a*.

The inner face of the recess 55*a* is a reflecting face, and is formed so as to increase in diameter toward the opening. The flange portion 55b protrudes in the perimeter direction at all portions of the opening edge portion of the recess 55a. When the lamp 49 is attached to the holding member 137, the front side of the flange portion 55b (the near side in the drawing in FIG. 10) is either in contact or very close to contact with the holding front face portion 137e or the light-transmitting member 137j of the holding member 137. Accordingly, the opening of the recess 55a is basically closed off by the holding member 137.

Holes suitable for introducing and/or venting air are formed at the opening side of the recess 55a. For example, an inlet 55c for introducing air, which has flowed in through the inlet 51a of the lamp house 51 and inlet 137f of the holding member 137, to the inside of the recess 55a, is formed at the left side of the recess 55a as viewed in FIG. 10. Also, a vent 55d for discharging air within the recess 55a out from the recess 55a is formed at a position facing the inlet 51a (to the right in FIG. 10). At the outer side of the recess 55a, the inlet 55c of the recess 55a faces the inlet 137f of the holding member 137, and the vent 55d of the recess 55a faces the vent 137g of the holding member 137.

Figure 11A:
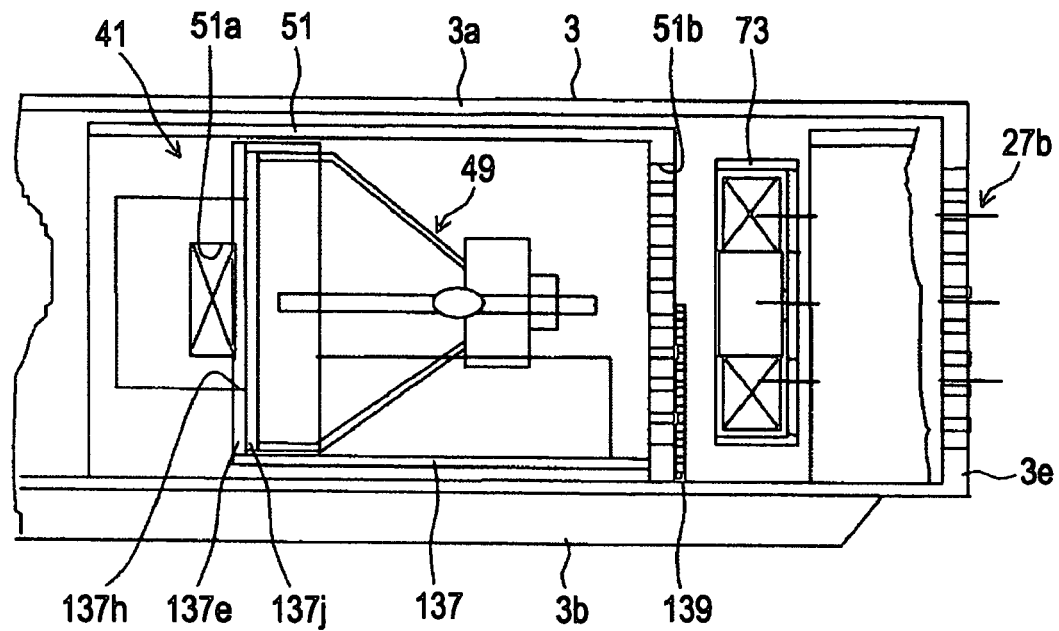
FIGS. 11A and 11B are conceptual views for describing change in the position of an adjusting member of the optical system of the projection display device shown in FIG. 1.
Figure 11B:
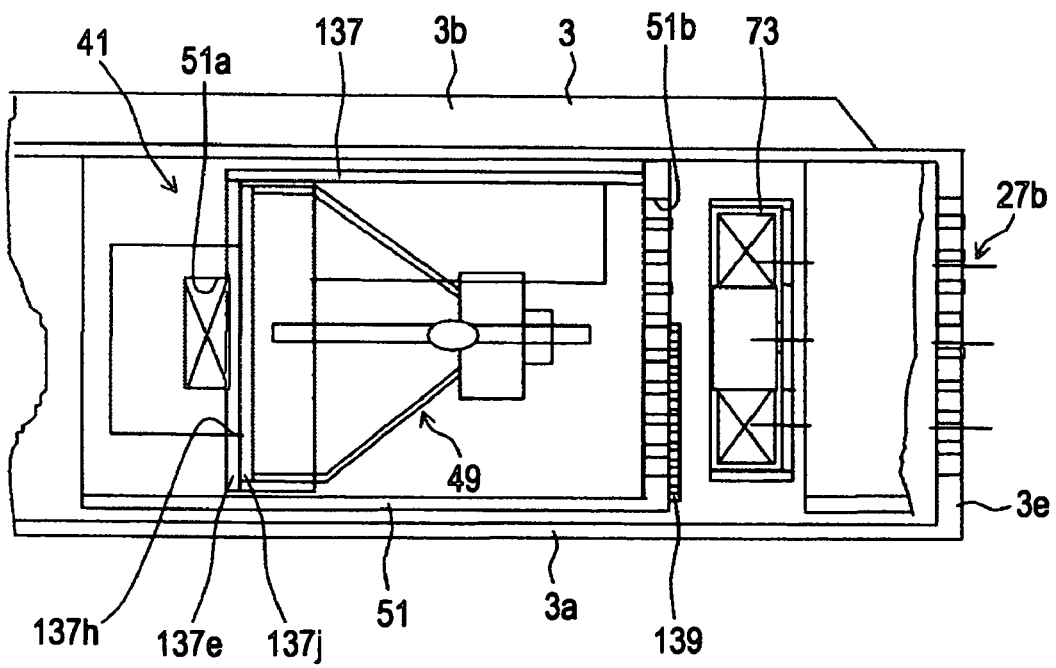

FIGS. 11A and 11B are conceptual drawings, for describing change in the position of the adjusting member 139. FIG. 11A is a cross-sectional diagram of around the light source unit 41 in a placed state. FIG. 11B is a cross-sectional diagram of around the light source unit 41 in a suspended state, which is vertically inverted from the placed state.

Note that FIGS. 11A and 11B are conceptual diagrams, with various changes being made as to other drawings such as omitting members as suitable or simplifying the shapes and positions of members, to facilitate understanding of the drawings. For example, the vent 51b is situated behind the lamp 49, and is sectioned off in the vertical direction by horizontal grill bars.

As shown in FIG. 11A, in the placed state, the adjusting member 139 is situated at the lower face portion 3b side as to the lamp house 51 due to its own weight. Accordingly, the adjusting member 139 adjusting member 139 closes off the portion of the vent 51b which is the lower side thereof in the placed state.

As shown in FIG. 11B, upon the projector 11 being vertically inverted, the adjusting member 139 moves to the upper face portion 3a side of the housing 3 as to the lamp house 51, due to its own weight. The adjusting member 139 closes off the lower side in the suspended state of the vent 51b.

Note that the adjusting member 139 is positioned in the placed state and in the suspended state, by coming into contact with an appropriate member. For example, the adjusting member 139 comes into contact with the lower face portion 3b of the housing 3 in the placed state, and comes into contact with the upper face portion 3a of the housing 3 in the suspended state. Alternatively, an arrangement may be made wherein appropriate positioning members for positioning the adjusting member 139 in the placed state and suspended state are appropriately provided.

Air flows through the light source unit 41 having the above-described configuration. As indicated by arrow y41 in FIG. 9, air let in from the inlet 51a of the lamp house 51 is led into the reflector 55 via the inlet 137g of the holding member 137 and inlet 55c of the reflector 55 (FIG. 10), and cools the arc tube 53 and reflector 55. The air which has cooled to the arc tube 53 and reflector 55 is vented to the outside of the reflector 55 via the vent 55d of the reflector 55 (FIG. 10) and vent 137g of the holding member 137, as indicated by arrow y43.

The air vented externally from the reflector 55 is externally vented from the lamp house 51 by way of the vent 51b, as indicated by the arrow y45. Note that the suction force of the first axial flow fan 73 contributes to venting of the air from the lamp house 51.

As shown in FIG. 11A, in the event that the projector 11 is being used in the placed state, the side of the vent 51b toward the lower face portion 3b side of the housing 3 (the lower side in the placed state) is closed off by the adjusting member 139, and accordingly, the air within the lamp house 51 is vented from the side of the vent 51b toward the upper face portion 3a side of the housing 3 (the upper side in the placed state).

On the other hand, as shown in FIG. 11B, in the event that the projector 11 is being used in the suspended state, the side of the vent 51b toward the upper face portion 3a side of the housing 3 (the lower side in the suspended state) is closed off by the adjusting member 139, and accordingly, the air within the lamp house 51 is vented from the side of the vent 51b toward the lower face portion 3b side of the housing 3 (the upper side in the suspended state).

The temperature in the lamp house 51 tends to be hotter the higher the position therein is, so arranging for air to be vented from the upper side thereof in both the placed state and the suspended state facilitates uniform balance in temperature at the upper and lower portions of the lamp house 51, and consequently, achieving uniform balance in temperature at the upper and lower portions is facilitated in both the placed state and the suspended state.

Note that a duct may be placed between the inlet 51a of the lamp house 51 and the inlet 137f of the holding member 137 so as to realize suitable airflow into the reflector 55. Also, the airflow at the light source unit 41 may be modified as appropriate, such as increasing the diameter of the inlet 137f of the holding member 137 so as to be somewhat larger than the inlet 55c of the reflector 55, or shifting the inlet 137f of the holding member 137 somewhat toward the back of the lamp 49, such that a part of the air led in from the inlet 137f flows behind the reflector 55, and so forth.

Figure 12A:
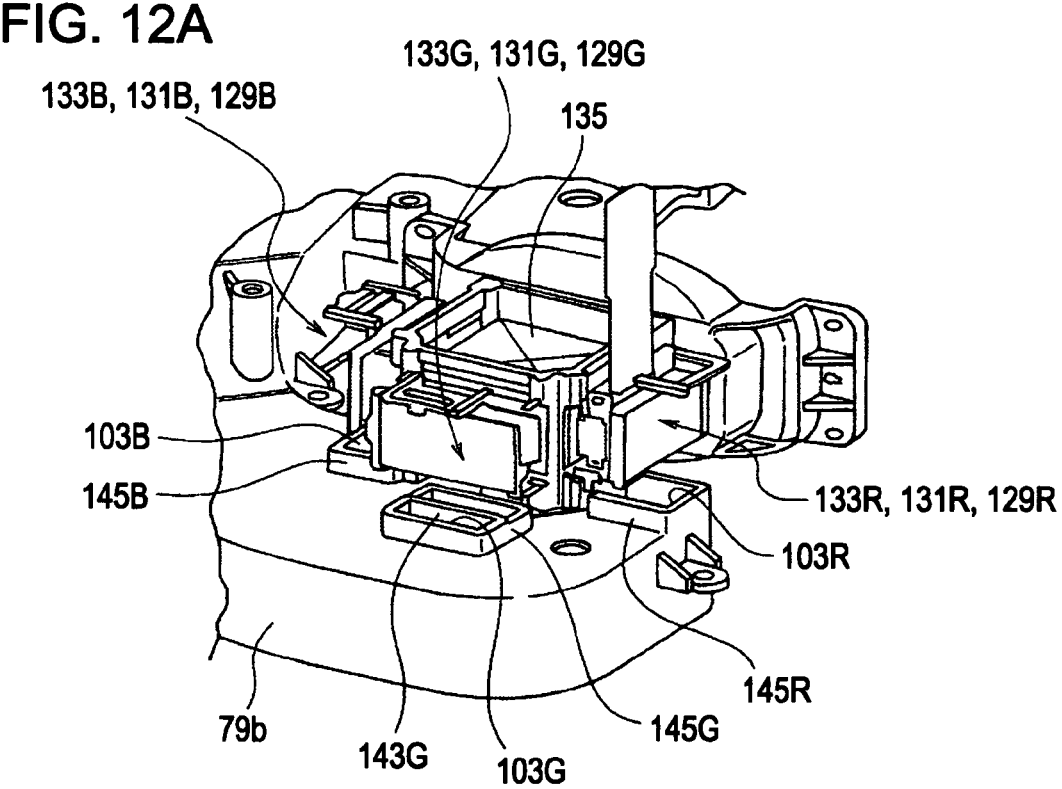
FIGS. 12A and 12B are enlarged drawings of around light valves and vents.

Blowing air from the outlets 103 onto the optical parts of the optical unit 43 will be described with reference to FIGS. 12A through 13C. FIG. 12A is an enlarged perspective view of around the outlets 103, and FIG. 12B is an enlarged plan view of the outlets 103.

The outlets 103 are formed with appropriate shapes and areas in accordance with the features of each color of the incident side polarization plates 129, liquid crystal panels 131, and emission side polarization plates 133, such as temperature increase rate and so forth among the colors. The following is a specific example.

The opening areas of the outlets 103 are set so as to be larger in the order or R, G, and B. The ratio of opening area is set so as to be generally the same as the temperature increase rate and so forth among the colors of the incident side polarization plates 129, liquid crystal panels 131, and emission side polarization plates 133, for example.

Figure 12B:
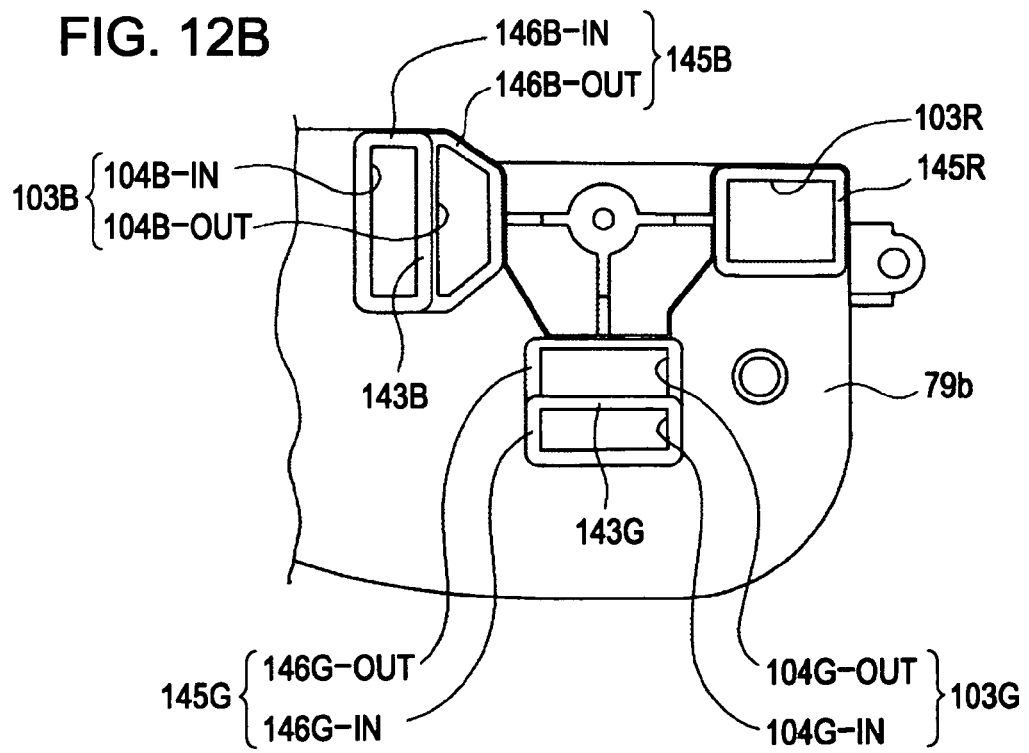

The outlet 103R is formed in a rectangular shape having sides orthogonal to and sides parallel to the direction of progression of the R light (the horizontal direction in the drawing in FIG. 12B).

The outlet 103G is formed overall in a rectangular shape having sides orthogonal to and sides parallel to the direction of progression of the G light (the vertical direction in the drawing in FIG. 12B). Also, the outlet 103G is partitioned by a partition 143G orthogonal to the direction of progression of the G light, having an incident side outlet 104G-IN and emission side outlet 104G-OUT (hereafter, the symbols IN and OUT indicating incident side and emission side may be omitted in this and other configurations). The partition 143G is situated beneath the liquid crystal panel 131G, for example. The outlet 104G is formed as a rectangle.

The outlet 103B is formed overall in a hexagonal shape, formed by a rectangular shape, with sides orthogonal to and sides parallel to the direction of progression of the B light (the horizontal direction in the drawing in FIG. 12B), having corners thereof chamfered at the emission side. Also, the outlet 103B is partitioned by a partition 143B orthogonal to the direction of progression of the B light, having an incident side outlet 104B-IN and emission side outlet 104B-OUT. The partition 143B is situated beneath the liquid crystal panel 131G, for example. The incident side outlet 104B-IN is formed in a rectangular shape having sides orthogonal to and sides parallel to the direction of progression of the B light. The emission side outlet 104B-OUT is formed in a rectangular shape having a long side and a short orthogonal to the direction of progression of the B light, formed in a trapezoid with the emission side being the short side.

The fourth branch duct 79b has nozzles 145R, 145G, and 145B, making up the outlets 103R, 103G, and 103B, respectively. Note that as shown in FIG. 12B, the nozzle 145G has a nozzle 146G-IN making up the outlet 104G-IN and a nozzle 146G-OUT making up the outlet 104G-OUT. The nozzle 145B has a nozzle 146B-IN making up the outlet 104B-IN and a nozzle 146B-OUT making up the outlet 104B-OUT. In other words, the nozzle 145G and nozzle 145B include the partitions 143 as a part thereof. No nozzles 145 are integrally formed with the fourth branch duct 79b, for example, and are configured of resin, for example.

Figure 13A:
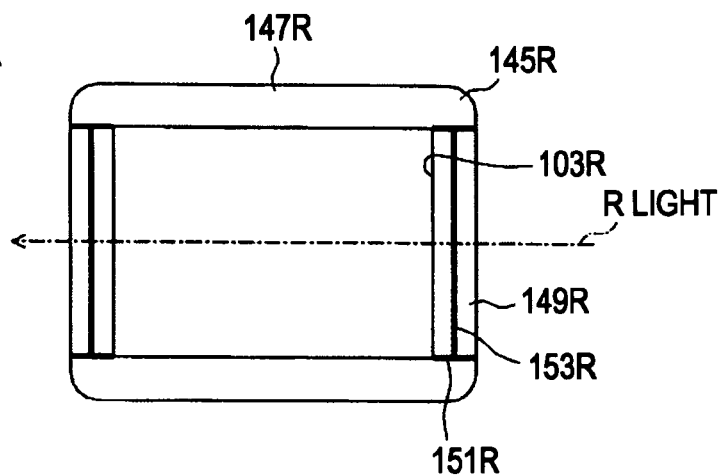
FIGS. 13A through 13C are plan view of the vent shown in FIGS. 12A and 12B.
Figure 13B:
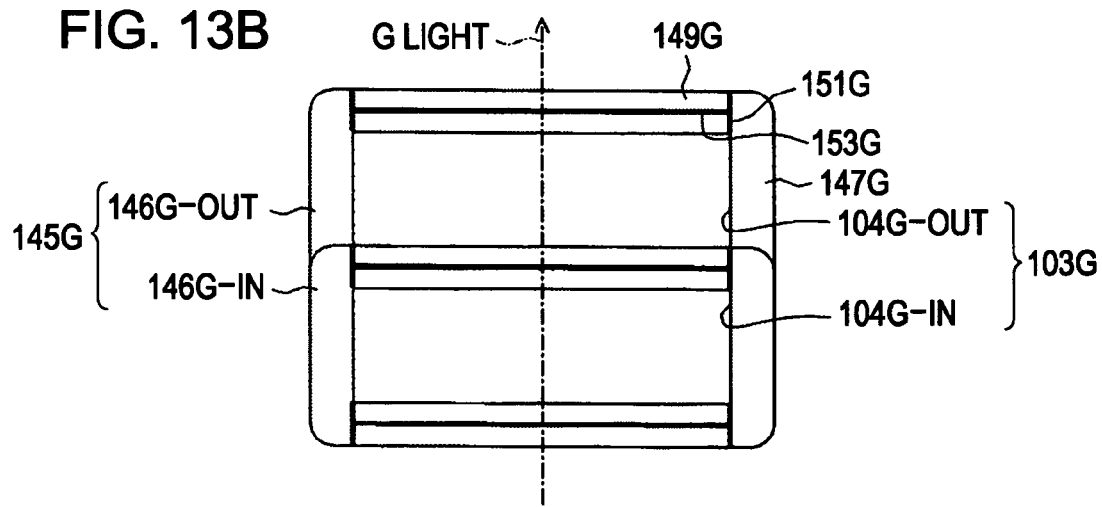
Figure 13C:
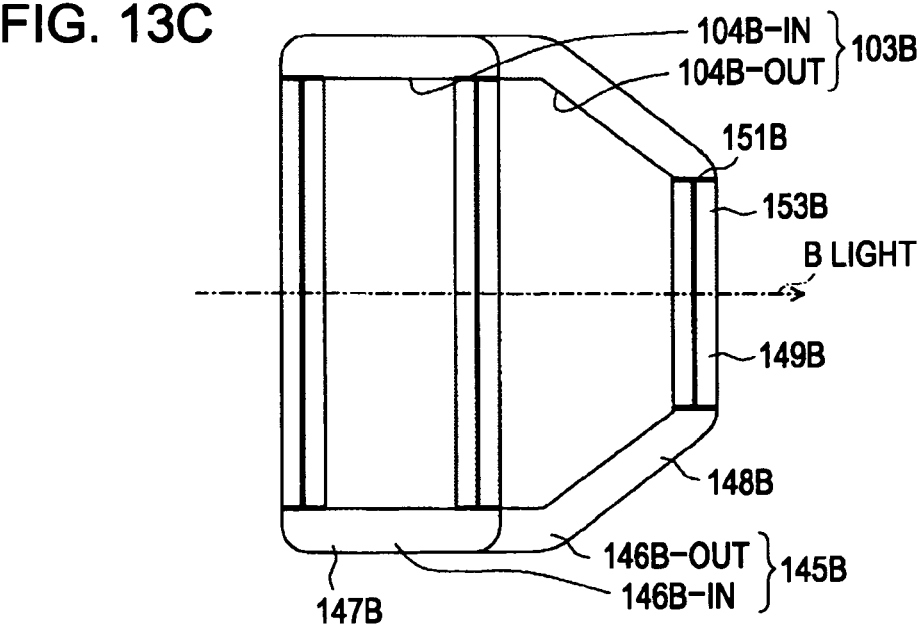

The nozzles 145 are provided with multiple cuts, not shown in FIGS. 13A through 13C, so as to facilitate vibration of the nozzles 145. Vibration of the nozzles 145 facilitates transition from laminar airflow to turbulence in the airflow blown out from the outlets 104. Transition from laminar airflow to turbulence in the airflow improves efficiency in thermal exchange between the air and optical parts. The cuts are specifically formed as illustrated exemplarily below.

FIG. 13A is a plan view of the outlet 103R. Note that the vertical and horizontal directions in the drawing in FIG. 13A are the same as the vertical and horizontal directions in the drawing in FIG. 12B.

The nozzle 145R is configured of two parallel walls 147R following the direction of progression of the R light, and two orthogonal walls 149R intersecting the direction of progression of the R light. The nozzle 145R has four cuts 151R formed so as to separate these four walls. Accordingly, these walls are capable of oscillating (vibrating) in directions orthogonal to the walls.

Particularly, the cuts 151R are formed along the direction of progression of the R light, so the orthogonal walls 149R are capable of oscillating in both the direction of progression of the R light and the opposite direction. The parallel walls 147R are capable of oscillating in the direction away from the optical path of the R light, but oscillation in the direction approaching the optical path of the R light is restricted by the orthogonal walls 149.

Further, the orthogonal walls 149R have formed therein cuts 153R orthogonal to the direction of progression of the R light, such that each orthogonal wall 149R is configured as a layered member of two walls. Accordingly, the stiffness of the orthogonal walls 149R in the direction orthogonal to the direction of progression of the R light is lowered, facilitating oscillation in the direction of progression of the R light.

FIG. 13B is a plan view of the outlet 103G. Note that the vertical and horizontal directions in the drawing in FIG. 13B are the same as the vertical and horizontal directions in the drawing in FIG. 12B.

The nozzle 145G is configured of two (or four, depending on the perception) parallel walls 147G following the direction of progression of the G light, and three orthogonal walls 149G intersecting the direction of progression of the R light. The nozzle 145G also has cuts in the same way as with the nozzle 145R. That is, cuts 151G are formed along the direction of progression of the G light, separating the parallel walls 147G and the orthogonal walls 149G. Further, the orthogonal walls 149G have formed therein cuts 151G orthogonal to the direction of progression of the G light, such that each orthogonal wall 149G is configured as a layered member of multiple layers.

FIG. 13C is a plan view of the outlet 103B. Note that the vertical and horizontal directions in the drawing in FIG. 13C are the same as the vertical and horizontal directions in the drawing in FIG. 12B.

The nozzle 146B is configured of two parallel walls 147B following the direction of progression of the B light, two inclined walls 148B inclined as to the direction of progression of the B light, and three orthogonal walls 149B intersecting the direction of progression of the B light. The nozzle 145B also has cuts in the same way as with the nozzle 145R. That is, cuts 151B are formed along the direction of progression of the R light, separating the orthogonal walls 149B form the other walls (the parallel walls 147B and the inclined walls 148B). Also, the orthogonal walls 149B have formed therein cuts 151B orthogonal to the direction of progression of the B light, such that each orthogonal wall 149B is configured as a layered member of multiple layers.

The perspective of what range of the nozzles 145 to perceive as one wall is optional. While the walls were sectioned in directions in plan view in the description given above, this may be perceived as, for example, one parallel wall 147 and one orthogonal wall 149 forming one wall portion, with a cut 151 being formed in this one wall portion, such that a part of the wall portion can easily oscillate. Further, an entire nozzle 145 can be perceived as being a single wall portion.

Figure 14A:
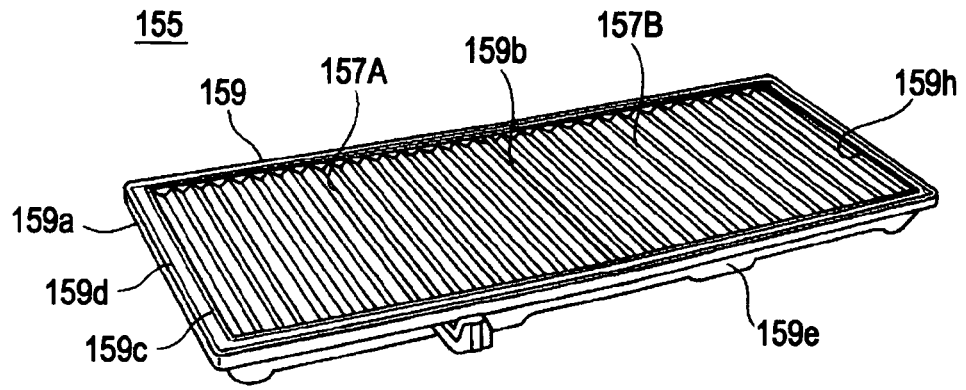
FIGS. 14A through 14C are diagrams for describing portions around a filter of the optical system of the projection display device shown in FIG. 1.

Next, the configuration around the filter replacement access lid 15 (FIG. 2) will be described with reference to FIGS. 14A and 14B, as well as other drawings. FIG. 14A is a perspective view of the filter replacement access lid 15 detachably attached to the housing 3.

A filter 155 includes filter main portions 157A and 157B (hereafter, A and B may be omitted), and a filter holder 159 for holding the filter main portions 157.

The filter main portions 157 are formed of electrets, i.e., the filter 155 is configured as a charge filter which carries out adsorption of dust in the air passing through by being charged. An electret is neutral overall, with positive charges and negative charges being permanently held. Suitable materials can be used for the electret, with one example being a nonwoven cloth electret using a polypropylene material. The shape of the filter main portions 157 is optional, an example thereof being a so-called accordion-fold shape, having a zig-zag cross-sectional form in the direction orthogonal to the direction of the folds. An example of a plan view shape of the filter main portions 157 is a rectangular shape.

The filter holder 159 is formed as a frame surrounding the perimeter of the filter main portions 157. The filter holder 159 has an opening 159h formed to which the filter main portions 157 are disposed. The opening 159h corresponds to the two filter main portions 157A and 157B, with the filter holder 159 having a large frame portion 159a surrounding the two filter main portions 157A and 157B, and a partition 159b for partitioning between the two filter main portions 157A and 157B. Note that the thickness of the large frame portion 159a is equal to or somewhat greater than the thickness of the filter main portions 157 formed in accordion folds.

A protruding portion protruding upwards in the drawing is formed all the way around the large frame portion 159a on the upper face of the large frame portion 159a in the drawing. Specifically, there is formed an inner protruding portion 159c formed along the inner edge portion of the large frame portion 159a, and an outer protruding portion 159d formed along the outer edge portion of the large frame portion 159a. Consequently, a groove is formed between the inner protruding portion 159c and the outer protruding portion 159d, so this could be perceived as the large frame portion 159a being formed thicker with a groove formed therein.

Protrusions 159e protruding downwards in the drawing are formed on the lower face of the large frame portion 159a in the drawing. Multiple such protrusions 159e are formed at suitable intervals. For example, the protrusions 159e may be formed at the four corners of the rectangular large frame portion 159a, or further one or two additionally formed between the four corners.

The filter holder 159 is formed of an elastic material, such as a styrene thermoplastic elastomer, for example. Other examples include elastic materials such as rubber or the like.

The filter main portions 157 and filter holder 159 are fixed in close contact with each other over the entire perimeter of the filter main portions 157. For example, the filter main portions 157 may be welded to the filter holder 159, or fixed thereto by an adhesive agent.

Various modifications may be made as appropriate to the filter, such as one filter main portion, or three or more filter main portions, being held by a single filter holder, and so forth.

Figure 14B:
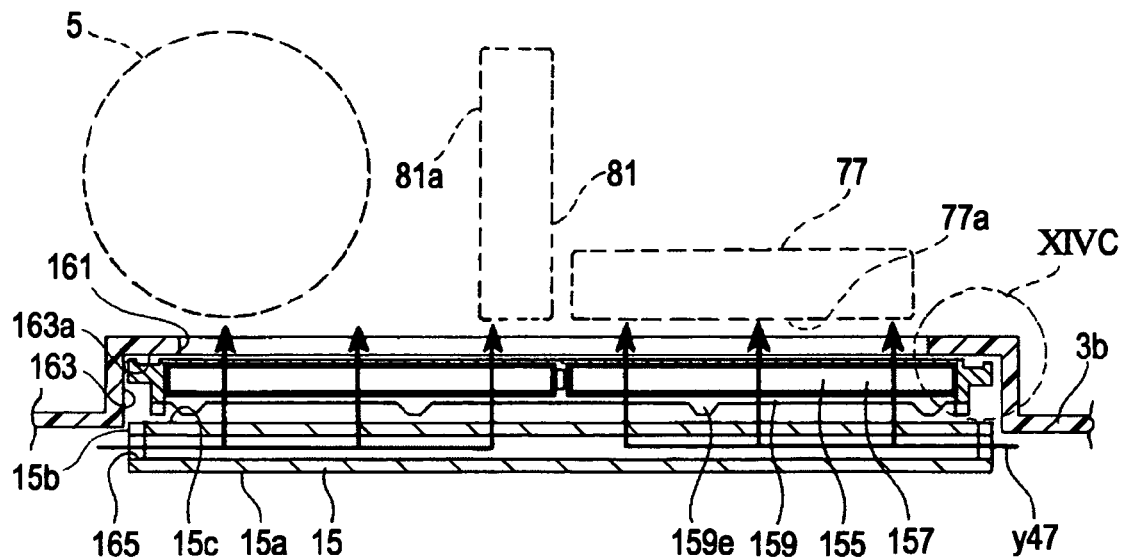

FIG. 14B is a cross-sectional view along line XIVB-XIVB in FIG. 2. An inlet 161 is formed at the lower face portion 3b of the housing 3. The filter 155 is disposed so as to cover the inlet 161, and is held between the lower face portion 3b and the filter replacement access lid 15. A specific arrangement is exemplarily illustrated below.

A recess 163 is formed on the lower face portion 3b of the housing 3, with the side facing the placing face (the lower side in the drawing in FIG. 14B) being recessed. The recess 163 has a shape and size allowing the filter 155 to be accommodated therein. Preferably, the recess 163 is of a shape and size into which the filter 155 fits. That is to say, with the present embodiment, the recess 163 is formed rectangular in shape with the same size as that of the filter 155. The depth of the recess 163 is generally the same as the thickness of the filter 155.

The intake 161 is formed on the upper side of the lower face 163a of the recess 163 (the face of the recess 163 toward the top in the drawing in FIG. 14B). The intake 161 is formed over the placement range of the third sirocco fan 77 and second axial flow fan 81 for example, so as to be capable of contributing to suction thereby. Also, the diameter of the intake 161 is smaller than the lower face 163a of the recess 163, with the lower face 163a being left in a ring shape (a rectangular ring shape in the case of the present embodiment) over the entire perimeter of the intake 161.

The filter 155 is stored in the recess 163 with the upper face in the drawing in FIG. 14A facing the lower face 163a of the recess 163 (i.e., facing upwards in FIG. 14B). More preferably, the filter 155 fits into the recess 163. The large frame portion 159a of the frame holder 159 faces the ring-shaped lower face 163a of the recess 163 over the entire perimeter of the intake 161.

The filter main portions 157 face the inlet 161. Of the two filter main portions 157, one faces a suction face 77a of the third sirocco fan 77 via the inlet 161. Of the two filter main portions 157, the other faces a suction face 81a of the second axial flow fan 81. That is to say, the second axial flow fan 81 is disposed at one end side of one of the filter main portions 157 with the suction face 81a facing the other end side of the one filter main portion 157. Note that the suction face 81a faces the side face of the lens barrel 5 which has a cross-sectional circular shape, and the lens barrel 5 is positioned so as to overlap the inlet 161.

As shown in FIGS. 2, 3, and 14B, the filter replacement access lid 15 is formed protruding from the lower face portion 3b of the housing 3. Note however, that the filter replacement access lid 15 is positioned separated from the placement face of the projector 11, by the supporting members 7. The filter replacement access lid 15 has a base portion 15a and a perimeter face portion 15b surrounding the base portion 15a.

The base portion 15a is formed in a plate shape, for example. The base portion 15a is generally parallel to the lower face portion 3b of the housing 3 when the filter replacement access lid 15 is attached to the housing 3, and faces the inlet 161 and filter 155. The base portion 15a is formed of a size and shape capable of covering the inlet 161 and filter main portions 157, for example. That is to say, with the present embodiment, the base portion 15a is formed as a rectangle having generally the same size as the area of the two filter main portions 157.

The perimeter face portion 15b is erected as to the base portion 15a. The perimeter face portion 15b intersects with the lower face portion 3b of the housing 3 when the filter replacement access lid 15 is attached to the housing 3. As shown in FIGS. 2 and 3, the perimeter face portion 15b is formed with a larger diameter the farther from the base portion 15a. That is to say, the perimeter face portion 15b is formed such that the outer face is directed toward the placement face in a state of being attached to the housing 3. Note that 14B illustrates the perimeter face portion 15b as being orthogonal to the base portion 15a, being a simplified illustration, and that the perimeter face portion 15b may indeed be arranged to be orthogonal to the base portion 15a as shown in FIG. 14B.

A top portion 15c of the perimeter face portion 15b (end toward the lower face portion 3b of the housing 3) is formed to a size and shape capable of pressing down the filter holder 159. That is to say, the top portion 15c has a size and shape the same as that of the large frame portion 159a of the filter holder 159. With the present embodiment, the top portion 15c has a rectangular shape in plan view.

As shown in FIGS. 2 and 3, the perimeter face portion 15b has multiple inlets 165 formed. For example, the multiple inlets 165 are arrayed at relatively narrow intervals following the perimeter of the base portion 15a. Accordingly, the perimeter face portion 15b is formed in a frame fashion.

The filter replacement access lid 15 is detachably fixed to the lower face portion 3b of the housing 3 by an appropriate method. For example, the filter replacement access lid 15 may be detachably fixed to the lower face portion 3b of the housing 3 by an engaging member provided to one of the filter replacement access lid 15 and the lower face portion 3b of the housing 3 engaging a receptacle provided to the other. Alternatively, the filter replacement access lid 15 may be detachably fixed to the lower face portion 3b of the housing 3 by a screw passed through the filter replacement access lid 15 being screwed to the lower face portion 3b of the housing 3.

At the perimeter portion of the filter 155 having such a configuration, the filter 155 is fit to the recess 163, and the filter replacement access lid 15 is detachably fixed to the lower face portion 3b of the housing 3, whereby the filter 155 is held between the lower face portion 3b of the housing 3 and the filter replacement access lid 15, thus being detachably fixed to the housing 3.

Specifically, the large frame portion 159a of the filter holder 159 is held between the ring-shaped lower face 163a of the recess 163 and the top portion 15c of the perimeter face portion 15b of the filter replacement access lid 15. At this time, the large frame portion 159a of the filter holder 159 is in close contact with the ring-shaped lower face 163a of the recess 163 over the entire perimeter of the inlet 161. The filter holder 159 is formed of an elastic material, and is fixed in close contact with the filter main portions 157 over the entire perimeters thereof, so the filter holder 159 also serves as packing.

Figure 14C:
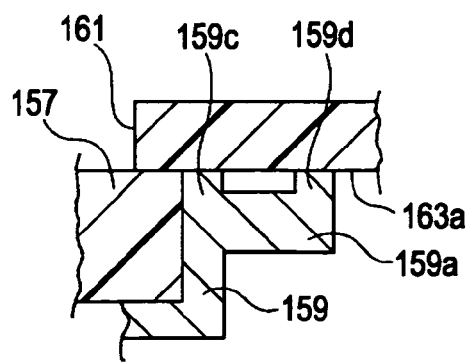

FIG. 14C is an enlarged view of the region XIVC in FIG. 14B. This drawing illustrates the way in which the large frame portion 159a of the filter holder 159 is in close contact with the ring-shaped lower face 163a of the recess 163. The inner protruding portion 159c and the outer protruding portion 159d formed on the side of the large frame portion 159a facing the ring-shaped lower face 163a of the recess 163 come into contact with the lower face 163a. The inner protruding portion 159c and the outer protruding portion 159d are elastically deformed by force from the ring-shaped lower face 163a, and are in tight contact with the lower face 163a due to suitable restoration force. Depending on the degree of the compression force, the groove between the inner protruding portion 159c and the outer protruding portion 159d also comes into contact with the lower face 163a.

Also, the protrusions 159e formed on the side of the filter holder 159 facing the filter replacement access lid 15 come into contact with the top portion 15c of the filter replacement access lid 15. The protrusions 159e are elastically deformed by force from the filter replacement access lid 15, and press the inner protruding portion 159c and the outer protruding portion 159d against the lower face portion 3b of the housing 3 due to suitable restoration force thereof.

Around the filter 155 having the configuration described above, upon the third sirocco fan 77 and the second axial flow fan 81 rotating, the air outside of the housing 3 is guided into the interior of the housing 3, passing through, in order, the inlets 165 of the filter replacement access lid 15, the filter 155, and the inlet 161 of the lower face portion 3b of the housing 3, as indicated by arrow y47 in FIG. 14B.

Figure 15A:
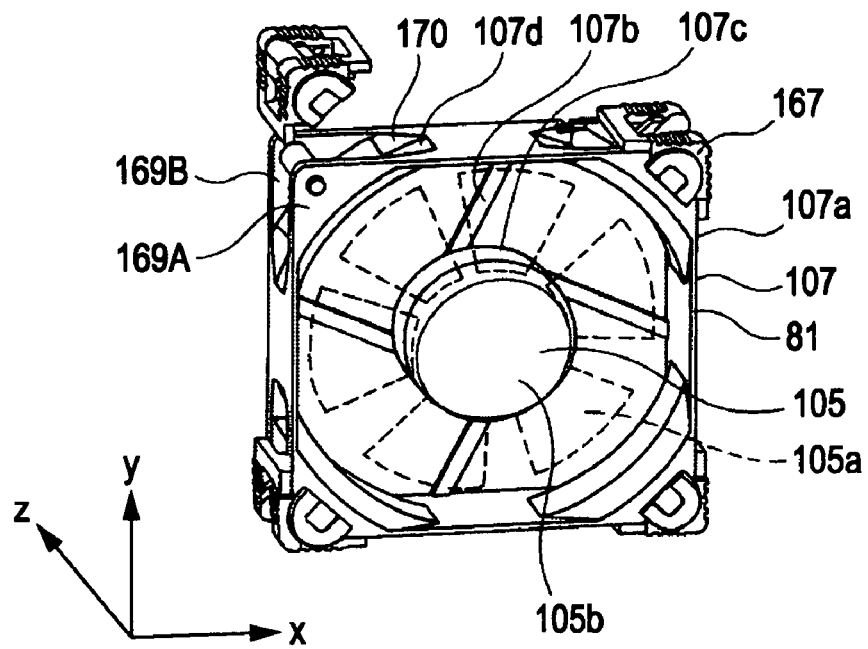
FIGS. 15A and 15B are perspective diagrams illustrating an axial-flow fan and vibration-proofing member of the projection display device shown in FIG. 1.

The vibration-proofing structure of the second axial fan 81 will be described with reference to FIGS. 15A through 17B. FIG. 15A is a perspective view illustrating the second axial fan 81 and a vibration-proofing member 167 for vibration-proofing of the second axial fan 81. The close side of FIG. 15A is the suction side of the second axial fan 81. Note however, that the far side in FIG. 15A may be made the suction side of the second axial fan 81. In FIG. 15A, the vanes 105a of the vane portion 105 are indicated by dotted lines to facilitate understanding of the drawing. The later-described FIGS. 15B through 17B omit the vanes 105a from the drawings for this purpose.

The fan case 107 of the second axial flow fan 81 has a perimeter face portion 107a surrounding the vane portion 105 around the rotational axis, multiple supporting portions 107b extending from the perimeter face portion 107a toward the center at the exhaust face side of the fan case 107, and an axial supporting portion 107c supported by the supporting portions 107b. The vane portion 105 has an axially supported portion 105b axially supported by the axial supporting portion 107c, and multiple vanes 105a provided on the perimeter of the axially supported portion 105b.

The perimeter face portion 107a of the fan case 107 has a protrusion protruding in the circumferential direction (the radial direction of the vane portion 105). Specifically, the fan case 107 has a suction side protrusion 169A provided on an edge at the suction side of the perimeter face portion 107a, and an exhaust side protrusion 169B provided on an edge at the exhaust side of the perimeter face portion 107a (hereafter, the phrases "suction side" and "exhaust side", and the symbols A and B may be omitted). Multiple protrusions 169 are provided along the circumferential direction of the vane portion 105. For example, the protrusions 169 may be provided on the four corners of the fan case 107.

The fan case 107 has the perimeter face thereof, including the protrusions 169, formed in a generally rectangular shape as viewed in the rotational axis direction of the vane portion 105, with the protrusions 169 forming the corners of the rectangle. The perimeter face portion 107a of the fan case 107 has a circular portion 107d, formed in a generally circular shape with the rotational axis of the vane portion 105 as the center thereof, formed at the corner portions of the rectangle. The protrusions 169 protrude from the circular portion 107d, and are formed in generally triangular shapes as viewed in the rotational axis direction. The protrusions 169 are also formed in the shape of plates.

Note that the portion between the suction side protrusion 169A and exhaust side protrusion 169B is recessed, which can also be perceived as recesses 170 being formed on the perimeter portion.

The vibration-proofing member 167 is for absorbing vibrations of the fan case 107, by being introduced between the fan case 107 and the housing 3. The vibration-proofing member 167 is configured of a material having at least one of elasticity and vicoelasticity, the vibration-proofing member 167 preferably having both elasticity and vicoelasticity. Note that in the present Specification, the term "elastic member" may refer not only to members having elasticity alone, but also to members having both elasticity and vicoelasticity. The vibration-proofing member 167 is configured of a styrene thermoplastic elastomer, for example. Also note that the vibration-proofing member 167 may be formed of rubber.

Multiple vibration-proofing members 167 are provided on the perimeter of the fan case 107, provided along the circumferential direction of the vane portion 105. For example, the vibration-proofing members 167 may be provided on the four corners of the fan case 107.

The vibration-proofing members 167 are configured so as to be capable of covering the perimeter face portion 107a of the fan case 107. Specifically, each of the vibration-proofing members 167 covers the corner portion of a perimeter face portion 107a of the fan case 107 on both of the suction side and exhaust side in the rotational axis direction of the vane portion 105 (z-axial direction), covers at one side in the vertical direction (y-axial direction, one direction orthogonal to the rotational axis direction of the vane portion 105), and covers at one side on the direction orthogonal to the rotational axis direction of the vane portion 105 and the vertical direction (x-axial direction). Accordingly, due to the vibration-proofing members 167 having been disposed at the four corners, vibration-proofing material has been disposed on both sides in the tri-axial directions of the fan case 107.

Figure 15B:
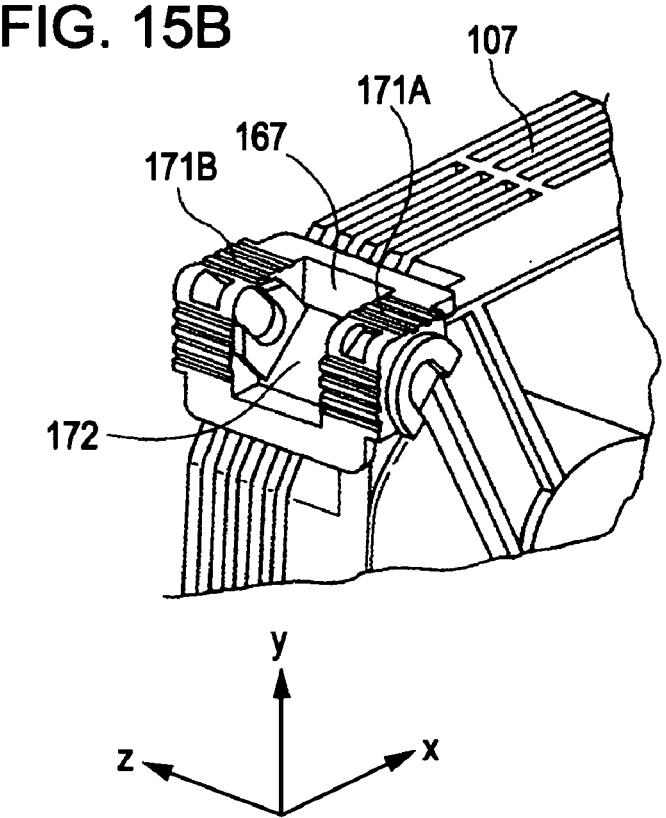

FIG. 15B is an enlarged perspective view of around a vibration-proofing member 167. The vibration-proofing member 167 has a protrusion which caps the protrusion 169A of the fan case 107. Specifically, the vibration-proofing member 167 has a suction side protrusion 171A to be capped on the suction side protrusion 169A of the fan case 107, and an exhaust side protrusion 171B to be capped on the exhaust side protrusion 169B of the fan case 107 (hereafter, the phrases "suction side" and "exhaust side", and the symbols A and B may be omitted).

Unshown recesses are formed on the protrusions 171 at the side opposite to the direction of protrusion, with the vibration-proofing members 167 being attached to the fan case 107 by the protrusions 169 of the fan case 107 being fit or pressed into the recesses of the protrusions 171. The faces of the protrusions 171 protrude further in the three axial directions than the other parts of the vibration-proofing members 167. That is to say, at least a part of the contact surface thereof as to the housing 3 in the three axial directions is configured of the protrusions 171 of the vibration-proofing members 167.

The portions between the suction side protrusions 171A and the exhaust side protrusions 171B are recesses, so the vibration-proofing members 167 can be perceived as having recesses 172 formed on the perimeter. Also, the vibration-proofing members 167 may be cut away at appropriate portions of the recesses 172 or the like such that a part of the fan case 107 is exposed.

Figure 16:
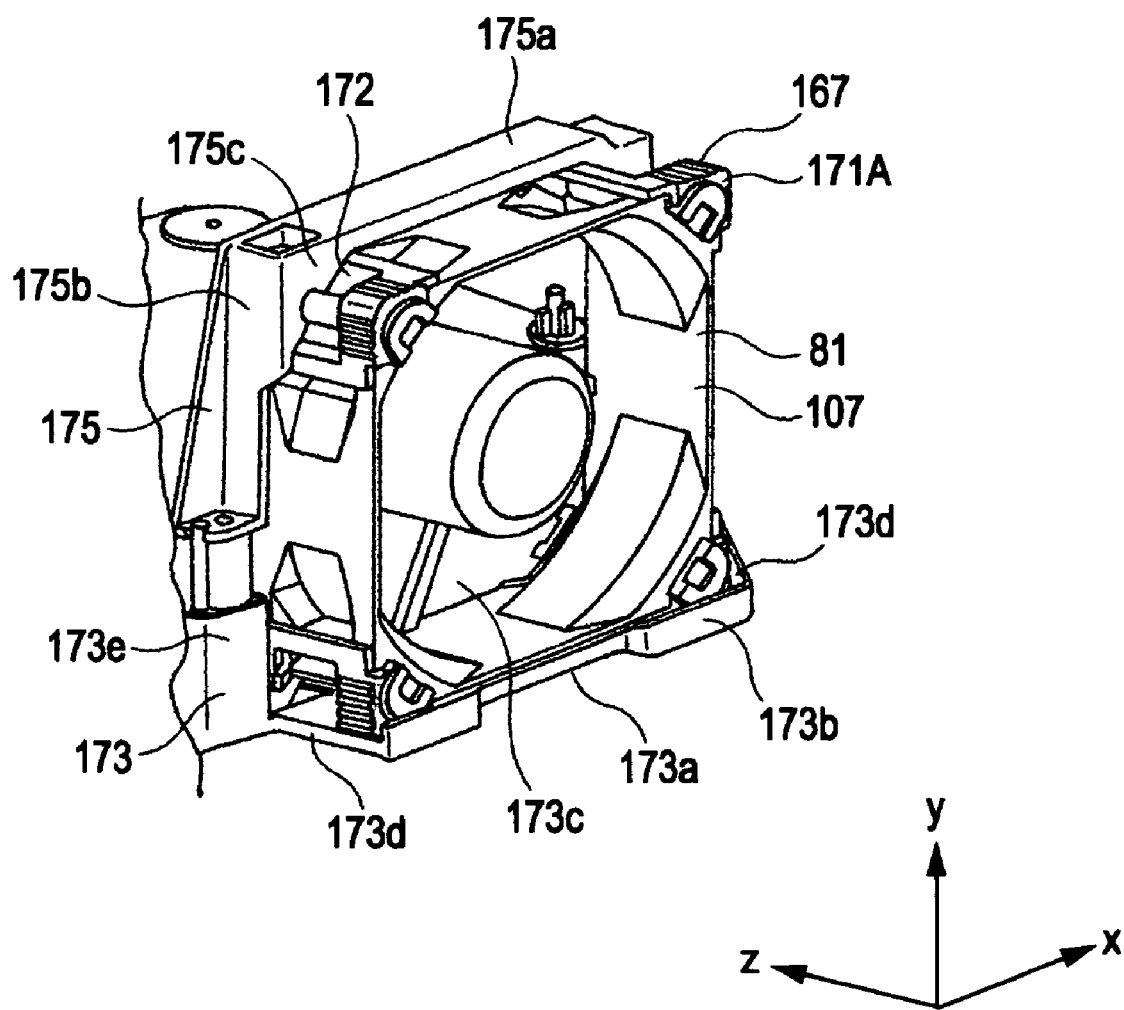
FIG. 16 is a perspective view illustrating the state of the axial-flow fan attached to the housing.
Figure 17A:
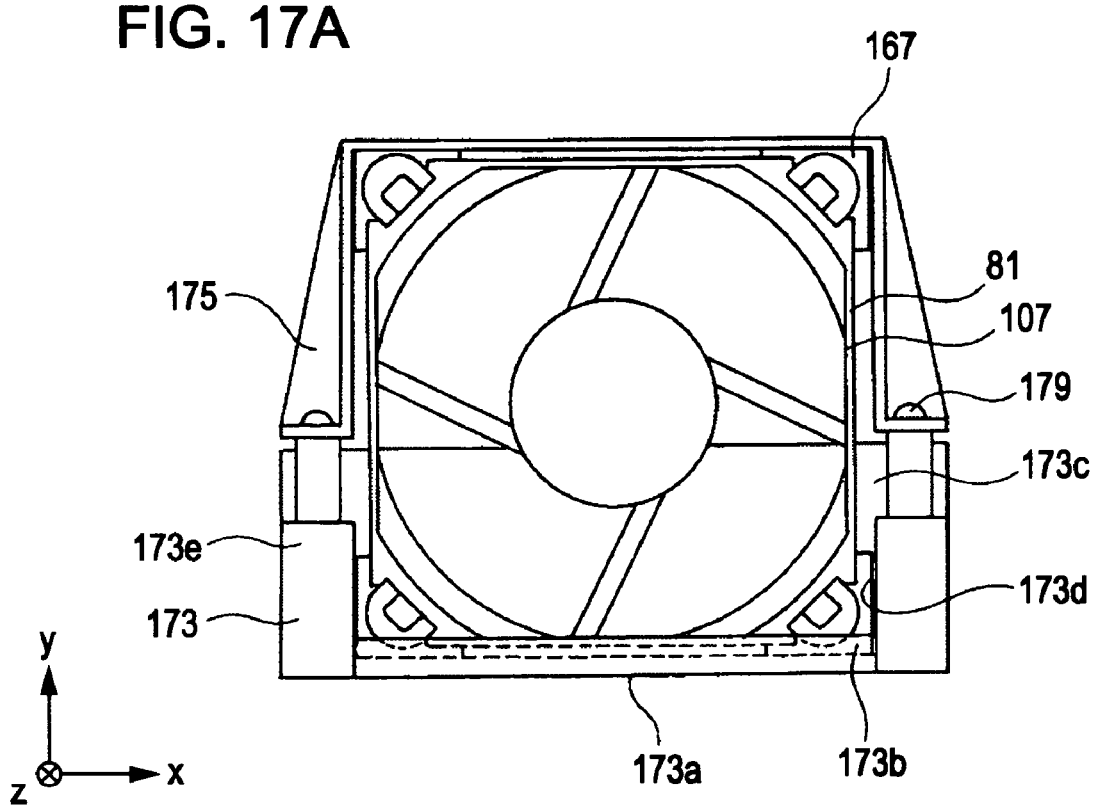
FIG. 17A is a front view corresponding to FIG. 16.
Figure 17B:
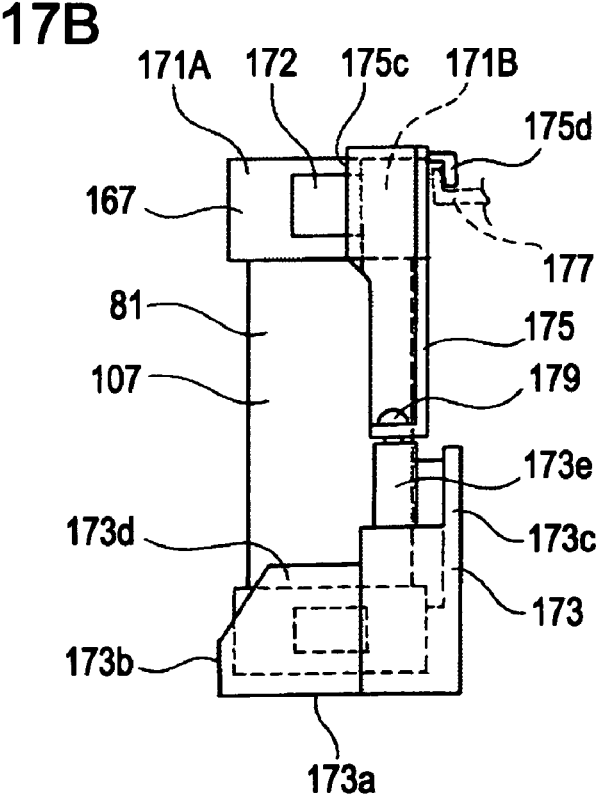
FIG. 17B is a side view corresponding to FIG. 16.

FIGS. 16 through 17A illustrate a state wherein the second axial flow fan 81 is attached to the housing 3. FIG. 16 is a perspective view, viewing the second axial flow fan 81 from above, from around where the lens barrel 5 and the optical unit 43 are connected. FIG. 17A is a frontal view viewing the second axial flow fan 81 from the lens barrel 5 side (right side in the drawing in FIG. 16, suction side in the rotational axis direction), and FIG. 17B is a side view viewing the second axial flow fan 81 from right side in FIG. 17A (from the front face portion 3c of the housing 3).

The fan case 107 of the second axial flow fan 81 is held between a supporting member 173 fixed to the housing 3 and a pressing member 175 fixed to the supporting member 173, so as to be fixed to the housing 3. The vibration-proofing members 167 are introduced between the fan case 107 and the supporting member 173, and between the fan case 107 and the pressing member 175. That is to say, the vibration-proofing members 167 are introduced between the fan case 107 and the housing 3.

The supporting member 173 is integrally formed with the fan case 99 of the third sirocco fan 77 (FIG. 5), and is fixed to the housing 3 along with the fan case 99. Note that the supporting member 173 may be formed individually or may be formed integrally with another member (e.g., the housing 3). Fixing of the supporting member 173 and the housing 3 can be performed by suitable methods, such as engaging members, screws, and so forth. For example, fixing of the supporting member 173 and the housing 3 may be realized by a screw, inserted through the supporting member 173, being screwed into the housing 3.

The supporting member 173 is configured so as to be capable of being in contact with the second axial flow fan 81, or more specifically the vibration-proofing members 167 disposed on the perimeter thereof, from the lower side in the vertical (y-axial) direction (from the side of the lower face portion 3b of the housing 3, the lower side in FIGS. 16 through 17B), and from both rotational axis (z-axial) directions, and from both directions integral to the rotational axis direction and vertical direction (x direction). That is to say, the supporting member 173 is capable of restricting movement of the second axial flow fan 81 in all directions except for upwards.

Specifically, the supporting member 173 has a base portion 173a for supporting the second axial flow fan 81 from the lower side (one side in the y-axial direction), a rib 173b formed at the suction side of the second axial flow fan 81 (one side in the z-axial direction, toward the front in the drawings in FIGS. 16 and 17A, toward the left side in the drawing in FIG. 17B, toward the side of the lens barrel 5), a wall 173c formed on the base portion 173a at the exhaust side of the second axial flow fan 81 (the other side in the z-axial direction, toward the back in the drawings in FIGS. 16 and 17A, toward the right side in the drawing in FIG. 17B, toward the side of the third sirocco fan 77), and ribs 173d formed on both edge portions of the base portion 173a in the direction orthogonal to the rotational axis direction and vertical direction (x-axial direction), but with different shapes for the ribs 173d on one side of the x-axial direction and on the other.

These parts form a recessed portion with the upper side thereof recessed, into which the second axial flow fan 81 to which the vibration-proofing members 167 have been attached is inserted. The second axial flow fan 81 to which the vibration-proofing members 167 have been attached is either fit or pressed into the recess formed in the supporting member 173.

Note that the wall 173c coming into contact with the second axial flow fan 81 at the exhaust side of the second axial flow fan 81 makes up a part of the perimeter portion surrounding the vane portion 97 of the fan case 99 of the third sirocco fan 77 around the rotational axis. The height thereof is around half that of the second axial flow fan 81 or less, as shown in FIG. 17A.

The supporting member 173 has a supporting portion 173e for supporting the pressing member 175. The supporting portion 173e is formed as a pillar protruding from the base portion 173a side to the pressing member 175 side, for example. Supporting portions 173e are disposed on both sides of the second axial flow fan 81, in the x-axial direction thereof. The two supporting portions 173e also contribute to restriction of the second axial flow fan 81 in the x-axial direction.

The pressing member 175 is configured to be capable of coming into contact with the second axial flow fan 81, or more specifically, the vibration-proofing members 167 positioned on the perimeter thereof, from the upper side in the vertical direction, i.e., y-axial direction (side of the upper face portion 3a of the housing 3, upper side in the drawings in FIGS. 16 through 17B), and from both sides of the suction side in the rotational axis direction, i.e., the z-axial direction (to the front in the drawings in FIGS. 16 through 17B, and the left in the drawing in FIGS. 18A through 18C), and from both sides in the direction orthogonal to the rotational direction and the vertical direction (x-axial direction). That is to say, the supporting member 173 is capable of restricting movement of the second axial flow fan 81 except for in the downward direction and toward the exhaust side.

Specifically, the pressing member 175 is a generally U-shaped member, having a slender base portion 175a, and supporting portions 175b for supporting the base portion 175a provided on both ends of the base portion 175a. The base portion 175a comes into contact with the vibration-proofing members 167 from above the second axial flow fan 81 (other side of the y-axial direction). The second axial flow fan 81 to which the vibration-proofing members 167 have been attached is either fit or pressed in between the two supporting portions 175b.

As shown in FIGS. 16 and 17B, the intersection portions of the base portion 175a and the supporting portions 175b have formed thereupon contact portions 175c for contact against the vibration-proofing members 167 from the suction side. The second axial flow fan 81 is subjected to force from the suction side due to wind. However, movement of the second axial flow fan 81 toward the suction side is restricted by the contact portions 175c.

Specifically, the contact portions 175c come into contact with the exhaust side protrusions 171B of the vibration-proofing members 167 (hidden and not shown in FIG. 16) from the suction side. The contact portions 175c are inserted into the recesses 172 of the vibration-proofing members 167. The contact portions 175c are formed in triangular shapes having hypotenuses facing the corners formed between the base portion 175a and the supporting portions 175b. The base portion 175a and the supporting portions 175b are disposed closer to the exhaust side from the center of the fan case 107 in the z-axial direction (rotational axis direction of the vane portion 105), and the contact portions 175c are formed on the edge of the base portion 175a and the supporting portions 175b on the suction side. The pressing member 175 itself is disposed on the closer to the exhaust side from the center of the fan case 107.

As shown in FIG. 17B, the pressing member 175 has formed thereupon an engaging portion 175d for restricting movement of the pressing member 175 toward the suction side. The engaging portion 175d restricts movement of the pressing member 175, which has received force toward the suction side from the second axial flow fan 81, toward the suction side. The engaging portion 175d in the shape of a hook, for example, protruding from the suction side face of the base potion 175a. The engaging portion 175d engages an engaged potion 177 provided to the housing 3 or a member fixed to the housing 3 (e.g., the control/driving block case 65), in generally the rotational axis direction.

The pressing member 175 and supporting member 173 are mutually fixed by an appropriate method. For example, the lower edge of the supporting member 175b of the pressing member 175 comes into contact with the upper edge of the supporting portion 173e of the supporting member 173, and a screw 179 (FIGS. 17A and 17B) passed through the supporting portion 175b is screwed into the supporting portion 173e, whereby the pressing member 175 and supporting member 173 are mutually fixed. At this time, the vibration-proofing members 167 are compressed with an appropriate pressure.

Note that arrangements may be made regarding directions in which the supporting member 173 and pressing member 175 suppress movement of the second axial flow fan 81 in a redundant manner, such that restriction is not performed by one or the other of the supporting member 173 and pressing member 175. For example, an arrangement may be made wherein only one of the supporting member 173 and pressing member 175 come into contact with the second axial flow fan 81 (more specifically, the vibration-proofing members 167) in the x-axial direction.

According to the embodiment described above as described with reference to FIGS. 1 through 7, the projector 11 primarily includes a housing 3, a projection lens 6 provided to the housing 3 for projecting light externally from the housing 3, a lamp 49 serving as an example of a first part provided within the housing 3, and a circuit board 63 of the control/driving block 47 serving as an example of a second part provided within the housing 3, with a first airflow path AFR1 for cooling the lamp 49 and a second airflow path AFR2 for cooling the circuit board 63 formed within the housing 3, with the first airflow path AFR1 and second airflow path AFR2 extending in mutually different directions but are adjacent at the downstream end so as to enable air heated by the lamp 49 and the circuit board 63 to be vented in a direction toward the projection direction side and also a direction away from the light axis LA of the projection lens 6. That is to say, the first airflow path AFR1 and second airflow path AFR2 are consolidated only at the downstream end, and air is vented in a suitable direction, is the degree of freedom in design of placement of the lamp 49 and the control/driving block 47 which are to be cooled, and the first axial flow fan 73 and second axial flow fan 81, within the housing 3, is high. Also, effects of heat on the projection image such as wavering, and effects of hot exhaust on users and walls on the side or behind the projector 11 can be reduced.

The first airflow path AFR1 and second airflow path AFR2 have mutually different exhaust temperatures, and are partitioned at the downstream end, so a situation where air from the airflow path with high exhaust temperature flows into the airflow path with low exhaust temperature can be prevented. Specifically, the exhaust heat from the light source unit 41 is hotter than the exhaust heat from the control/driving block 47. On the other hand, as described above, the first airflow path AFR1 and second airflow path AFR2 are consolidated only at the downstream end so as to vent both airflows of the airflow paths with different directions in a suitable direction. Accordingly, there is the possibility that the air from the first airflow path AFR1 might enter the second airflow path AFR2 and reduce the cooling efficiency of the control/driving block 47. However, partitioning the first airflow path AFR1 and second airflow path AFR2 at the downstream end reduces such concern.

The circuit board 63 of the control/driving block 47 is disposed at the projection direction side of the lamp 49, with the first airflow path AFR1 extending at least in the projection direction at the first side face portion 3e following the projection direction, and the second airflow path AFR2 extending from the projection lens 6 side to the first side face portion 3e side where the first airflow path AFR1 has been disposed at the projection direction side of the housing 3, such that the downstream end is adjacent to the projection lens side of the downstream end of the first airflow path AFR1, whereby the flow of the first airflow path AFR1 toward the projection direction and the flow of the second airflow path AFR2 in the direction away from the light axis LA of the projection lens 6 merge, thereby more readily forming the flow in the projection direction and away from the light axis LA of the projection lens 6 on the outside of the housing 3. Accordingly, a suitable airflow can be formed as compared with a case in which an airflow in the projection direction and away from the light axis LA of the projection lens 6 is formed only with the vent louvers 29.

With the above configuration where the first airflow path AFR1 extends toward the projection direction and the flow of the second airflow path AFR2 extends in the direction away from the light axis LA of the projection lens 6, in the event that the exhaust temperature of the first airflow path AFR1 is hotter than the exhaust temperature of the second airflow path AFR2, the second airflow path AFR2 is positioned further to the side where there is a greater probability of a user or a wall being situated as compared to the projection direction side (front side), whereby effects of the projector 11 on the surroundings can be reduced even further.

A vent portion 27 for venting air from the first airflow path AFR1 and the flow of the second airflow path AFR2 to the outside of the housing 3 is formed to the housing 3, and the vent portion 27 opens from the front face portion 3c facing the projection direction of the housing 3 to the first side face portion 3e following the projection direction, so the area of the vent in the projection direction and the direction away from the light axis LA of the projection lens 6 is maximized while reducing effects of the projector 11 on the projected image and the surroundings thereof.

A vent portion 27 for venting air from the first airflow path AFR1 and the flow of the second airflow path AFR2 to the outside of the housing 3 is formed to the housing 3, and the vent portion 27 is provided with multiple side face blades 29d of vent louvers 29 forming gaps (slits 31b) opening to the projection direction and in the direction away from the light axis of the projection lens, with inner side blades 95a of an inner louver 95 intersecting the slits 31b in the opening direction are provided on the inner side of the housing, thereby an airflow can be formed in the projection direction and in the direction away from the light axis of the projection lens by the vent louvers 29, and further leakage of light from the slits 31b of the vent louvers 29 can be prevented by the inner louver 95.

Also, according to the present embodiment, as described with reference primarily to FIGS. 9 through 11B, the projector 11 is capable of being used in a placed state which is an example of a first usage state, and a suspended state which is an example of a second usage state wherein the vertical direction thereof has been inverted as to that of the first usage state, and the projector 11 has a lamp 49 serving as a light source, a lamp house 51 storing the lamp 49 and having a vent 51b for venting air heated by the lamp 49, and an adjusting mechanism 138 which acts to adjust the opening area of the vent 51b such that the opening area above the vent 51b is greater than the opening area at the lower side in the placed state, and the opening area above the vent 51b is greater than the opening area at the lower side in the suspended state, whereby the higher areas where hot air tends to collect is more readily vented. Accordingly, the venting balance between the top and bottom is made uniform, thereby making the venting balance between the top and bottom in the placed and suspended states uniform. This prevents cases wherein the temperature within the lamp house locally exceeds or is below the guaranteed temperature of the light source, thereby preventing trouble such as breaking of the lamp, blackening of the quartz tube, deterioration in brightness due to devitrification, and so forth.

The adjusting mechanism 138 has an adjusting member 139 capable of traveling between a first position for closing off the position of the vent 51b which is the lower side in the placed state, and a second position for closing off the position of the vent 51b which is the lower side in the suspended state, so the opening area of the vent 51b can be adjusted with a simple configuration. Also, the adjusting member 139 reflects infrared light, whereby the lower side, which tends to be cooler, is readily heated.

The projector 11 has guide members 141 capable of guiding the adjusting member 139 is as to slide vertically between the placed state and the suspended state, whereby movement of the adjusting member 139 can be realized with a simple structure, and space necessary for the adjusting member 139 to move can be reduced as compared with a case of the adjusting member 139 rotating (although this arrangement may also be included in the present invention), leading to reduction in size of the housing 3.

The adjusting member 139 is configured to be capable of moving under its own weight when moving from a second position (the position for closing off the portion which is the lower side in the suspended state) to a first position (the position for closing off the portion which is the lower side in the placed state) in conjunction with transition from the suspended state to the placed state of the projector 11, and capable of moving under its own weight when moving from the first position to the second position in conjunction with transition from the placed state to the suspended state of the projector 11, so vertically inverting the projector 11 automatically switches over the position of the adjusting member 139, which is handy, and also there is no need to provide a driving mechanism such as a motor (although this arrangement may also be included in the present invention).

Also, according to the present embodiment, as described primarily with reference to FIGS. 12A through 13C, the projector 11 has the optical parts of the incident side polarization plates 129, liquid crystal panels 131, and emission side polarization plates 133, and also has provided, in order to cool these optical parts, the third sirocco fan 77, and the second duct 79 (fourth branch duct 79b) which is a duct for guiding wind from the third sirocco fan 77 to the optical parts, the second duct 79 having been formed with outlets 103 for blowing air onto the optical parts. The second duct 79 is provided with nozzles 145 (orthogonal walls 149) serving as turbulence promotion units for causing transition from laminar airflow to turbulence in the airflow from the outlets 103, which improves efficiency in thermal exchange between the air and optical parts. This leads to reduced electric power consumption and suppressed noise of the fan.

The turbulence promotion units for promoting transition from laminar airflow to turbulence are nozzles 145 (orthogonal walls 149) provided around the outlets 103, protruding toward the optical part side and having cuts 151 and 153 formed therein, so promotion of transition from laminar airflow to turbulence can be made with a simple configuration, without disposing special members or the like.

For example, the cuts 151 are formed following the transmission direction of light at the optical parts, separating the nozzle 145 into the orthogonal walls 149 orthogonal in the transmission direction and other wall parts, thereby forming the orthogonal walls 149 which readily oscillate in the light transmission direction (direction orthogonal to the optical parts), so turbulence in the direction orthogonal to the optical parts is readily formed, and efficiency in thermal exchange between the air and optical parts can be improved.

Also, the cuts 153 are formed along the orthogonal walls 149, and divide the orthogonal walls 149 into multiple layers, so the orthogonal walls 149 can oscillate in the direction orthogonal tot the optical parts even more readily.

Also, with the present embodiment, as described primarily with reference to FIGS. 14A through 14C, the projector 11 has a housing 3 which can be placed on a predetermined placing face in a state wherein the lower face portion 3b is separated form the placing face, a third sirocco fan and a second axial flow ran 81 disposed within the housing 3, a filter 155 which is detachably attached to the lower face portion 3b of the housing 3 so as to close off the inlet 161 formed in the lower face portion 3b of the housing 3, and a filter replacement access lid 15 which is detachably attached to the housing 3 so as to cover the filter 155 which closes off the inlet 161 and has formed therein an inlet 165, wherein the filter replacement access lid 15 is formed so as to protrude to the placing face side from the lower face portion 3b of the housing 3 and the inlet 165 is formed on the face of the filter replacement access lid 15 intersecting the lower face portion 3b (i.e., the perimeter face portion 15b of the filter replacement access lid 15), so even in the event that paper is placed on the placing face, there is no concern of the paper being suctioned to the lower face portion 3b and interfering with the suction. Moreover, the inlet 165 is formed in the filter replacement access lid 15, so an inlet inclined or orthogonal to the placing face is formed adjacent to the filter 155 with a simple and small configuration, and also the related art can be used for the shape of the housing 3, meaning that versatility is high.

The filter replacement access lid 15 has a base portion 15a facing the inlet 161 and filter 155, and a perimeter face portion 15b serving as a face intersecting the lower face portion 3b, wherein the inlet 165 is formed only in the perimeter face portion 15b, so paper placed on the placing face being suctioned to the filter 155 is prevented even further, and also, even in the event that dust and the like suctioned to the filter 155 falls off of the filter 155 due to vibrations and so forth, the dust is collected in the base portion 15a, thereby preventing the placing face from being soiled.

The filter 155 has filter main portions 157 through which air is passed, and a filter holder 159 fixed in close contact to the perimeter of the filter main portions 157 and shaped in a frame shape out of an elastic member, wherein when the filter replacement access lid 15 is fixed to the housing 3, the filter holder 159 is held between the lower face portion 3b of the housing 3 and the filter replacement access lid 15 so as to be in close contact with the lower face portion 3b of the housing 3 such that the perimeter of the inlet 161 is surrounded, so the filter holder 159 serves as both a member for mounting the filter main portions 157 to the housing 3 and packing whereby air that has not passed through the filter main portions 157 is prevented from being let into the inlet 161, and accordingly, around the filter 155 can be reduced in size, replacement of the filter 155 is facilitated, costs can be reduced, and so forth.

The filter holder 159 has protrusions (inner protruding portion 159c and/or outer protruding portion 159d) in close contact with the lower face portion 3b of the housing 3 extending so as to surround the inlet 161, that have been formed on the face thereof toward the lower face portion 3b of the housing 3, so even if here is error in manufacturing dimensions or the like, the filter holder 159 can be pressed into contact in a sure manner with the lower face portion 3b of the housing 3, over the entire perimeter of the inlet 161, with a suitable contact pressure.

The filter holder 159 has protrusions 159e protruding toward the filter replacement access lid 15 side and coming into contact with the filter replacement access lid 15, so pressing force can be received from the filter replacement access lid 15 in a sure manner, and deformation of the protrusions 159e allows the contact pressure between the filter holder 159 and the lower face portion 3b of the housing 3 to be adjusted to a suitable pressure.

The filter 155 has filter main portions 157 having an accordion fold shape, for passing through air. On the other hand, the air outside of the housing flows into the inlet 165 of the filter replacement access lid 15 following the placing face, so components of the flow following the placing face are included in the flow of air passing through the filter main portions 157 (note that the arrow y47 in FIG. 14B schematically illustrates the flow of air, so all flows passing through the filter main portions 157 are orthogonal to the placing face). Accordingly, air passing through the filter main portions 157 passes through the accordion folds of the filter main portions 157 following the direction of the placing face, and accordingly can pass through the filter main portions 157 multiple times. This further cleanses the air.

The projector 11 has a projection lens 6 for projecting light in a predetermined projection direction generally following the lower face portion 3b of the housing 3, with the inlet 161, filter 155, and filter replacement access lid 15 being situated at the projection direction side of the lower face portion 3b of the housing 3, and the inlet 165 is opened at least toward the projection direction side, so air can be suctioned from the projection direction where there will be not obstacles to suction such as users or walls, meaning that suction at the lower face portion 3b can be performed in an even more sure manner.

The projector 11 has a lamp 49 serving as a light source provided within the housing 3, an optical unit 43 provided within the housing 3 for guiding light from the lamp 49 to the projection lens 6, and a second duct 79 for guiding wind from a third sirocco fan 77 provided within the housing 3 to the optical unit 43, with the projection lens 6 and the third sirocco fan 77 being disposed in parallel as to the projection direction and above the filter replacement access lid 15, and with the lamp 49 and optical unit 43 being disposed in parallel in the projection direction such that the lamp 49 is situated on the opposite side of the projection direction of the third sirocco fan 77 and the optical unit 43 is situated on the opposite side of the projection direction of the projection lens, and with a lamp replacement access opening 3g whereby the lamp 49 can be inserted and extracted being formed at a position of the lower face portion 3b of the housing 3 opposite in the projection direction of the inlet 161, and with a lamp replacement access lid 17 which closes off the lamp replacement access opening 3g being detachably attached at a position the opposite side in the projection direction of the filter replacement access lid 15, so the filter replacement access lid 15 can be situated in the projection direction side where there are not obstacles to suction such as users or walls or the like, and the lamp replacement access opening 3g can be situated adjacent to the filter replacement access lid 15 on the opposite side in the projection direction, thereby efficiently using the lower face portion 3b of the housing 3 unit and facilitating reduction in size.

Also, according to the present embodiment, as described primarily with reference to FIGS. 15A through 17B, the projector 11 has a housing 3; a second axial flow ran 81 having a vane portion 105 and a fan case 107 for rotatably storing the vane portion, situated within the housing 3; and vibration-proofing members 167 disposed in multiple positions of a perimeter face portion 107a surrounding the vane portion 105 in around the rotational axis of the vane portion 105 so as to be introduced between the housing 3 and the fan case 107, and having at least one of elasticity and viscosity; accordingly, the vibration-proofing members can be reduced in size as compared to the related art which covers the entire fan case. Consequently, the material and working costs can be reduced, and ease of handling also increases. Fans of various sizes need to be used depending on the type of the projection display device, position where the fan is installed, and so forth, but the vibration-proofing members 167 are arranged to be disposed at multiple positions on the fan, and accordingly can be used with fans of various sizes, which is highly versatile. Further, vibration-proofing members in the related art which cover the entire fan case have small dimensional tolerance to realize a close fit to the fan case, but the vibration-proofing members 167 do not need such small dimensional tolerance.

The projector 11 has a supporting member 173 fixed to the housing 3, and a pressing member 175 fixed to the supporting member 173, so as to hold the fan case 107 between the supporting member 173 and the pressing member 175 in the radial direction of the vane portion 105, with a part of multiple vibration-proofing members 167 being held between the fan case 107 and the supporting member 173, and a part of multiple vibration-proofing members 167 being held between the fan case 107 and the pressing member 175, so vibration of the fan case in the radial direction of the vane portion 105 is suppressed in a sure manner.

The second axial flow fan 81 sends air to one side on the rotational axis direction, the pressing member 175 having a contact portion 175c which comes into contact with the vibration-proofing members 167 from the other side of the fan case 107 in the rotational direction, so as to restrict movement of the second axial flow fan 81 in the other side in the rotational axis direction (suction side) due to the force received from the wind, whereby movement of the second axial flow fan 81 due to the wind can be restricted, and vibrations of the second axial flow fan 81 can be suppressed in a sure manner.

The pressing member 175 has an engaging portion 175d for restricting movement of the pressing member 175 toward the other side in the rotational axis direction (suction side) by engaging the housing 3 or a member fixed to the housing 3 in the rotational axis direction, thereby restricting movement due to wind even further.

The pressing member 175 has supporting portions 175b serving as a pair of holding orthogonal direction contact members which face each other across the fan case in the holding orthogonal direction (x-axial direction in FIG. 16) orthogonal to the holding direction (y-axial direction in FIG. 16) which is the radial direction of the vane portion 105, with the fan case 107 having multiple vibration-proofing members 167 situated between the fan case 107 and the pair of supporting portions 175b respectively, and the fan case pressed in between the pair of supporting portions 175b, so ultimately the pressing member 175 is fixed to the supporting member 173, and the fan case 107 is fixed by the vibration-proofing members 167 in three axial directions, whereby vibrations from all directions are absorbed by the vibration-proofing members 167. Consequently, fan noise is reduced.

The fan case 107 has protrusions 169 protruding in the radial direction, and the vibration-proofing members 167 have protrusions 171 to be capped on the protrusions 169, and the supporting member 173 and pressing member 175 are in contact with the protrusions 171, so the second axial flow fan 81 can be handled in a state of the vibration-proofing members 167 being attached to the fan case 107, thereby facilitating attachment of the second axial flow fan 81 to the housing 3, while the protrusions 171 serve as both an attaching portion for attaching the vibration-proofing members 167 to the fan case 107 and a contact portion for the supporting member 173 and pressing member 175, whereby the configuration is simplified and reduced in size.

The opposite side of the second axial flow fan 81 to the exhaust direction thereof is the suction direction thereof, with the fan case 107 having exhaust side protrusions 169B protruding in the radial direction provided on the edge of the exhaust direction side of the perimeter face portion 107a, the vibration-proofing members 167 having exhaust side protrusions 171B to be capped onto the exhaust side protrusions 169B, and the contact portion 175c coming into contact with the exhaust side protrusions 169B from the suction direction side toward the exhaust direction side, so the pressing member does not need to be situated on the suction side of the second axial flow fan 81 side even though pressing the second axial flow fan 81 from the suction side. Accordingly, the size of the pressing member 175 in the axial direction can be reduced.

For example, the pressing member 175 can be configured such that the pressing member 175 is situated only on the exhaust direction side of the suction direction side edge of the fan case 107. In this case, other parts can be placed adjacent to the suction side of the second axial fan 81, thereby reducing the size of the second axial flow fan 81.

The suction direction side of the second axial fan 81 faces the side of the lens barrel 5 of a circular cross-dimensional shape having the projection lens 6. Normally, having another member on the suction side of the axial flow fan reduces the suction amount of the axial flow fan, but the lens barrel 5 is of a circular cross-dimensional shape, so sufficiently great space is formed at the top and bottom of the lens barrel 5 for suction of the second axial flow fan 81, and accordingly around the second axial flow fan 81 can be reduced in size while suppressing reduction in suction amount.

The present invention is not restricted to the above embodiment, rather, various modifications may be made.

The projection display device is not restricted to the light valve type, and may be a CRT type, for example. Also, in the case of a light valve type, the projection display device is not restricted to a liquid crystal projector, and may be, for example, and DMD projector.

The shape of the housing is to restricted to a rectangular box which is thin in the vertical direction. For example, this may be formed such that the plan view or side view thereof is circular as a whole or in part. Note that even in the case of having such a shape, the faces following the projection direction, the face toward the projection direction, the face facing the placing face, and so forth, can be identified. The placement of the parts without the housing may also be changed as appropriate.

An example has been illustrated with the present embodiment wherein the first airflow path AFR1 and second airflow path AFR2 (FIG. 6) are adjacent at the downstream end, that is to say, wherein the first airflow path AFR1 and second airflow path AFR2 are partitioned by the inner face tip portion 75h. However, the first airflow path and second airflow path may merge at the downstream end. for example, the inner face tip portion 75h may be omitted from an embodiment.

Also, the first airflow path and second airflow path is not restricted to extending in the directions exemplarily illustrated in the embodiment, and may be changed as appropriate so as to suite various purposes, such as part placement suitable for reduction in the size of the housing, and so forth. Also, the first airflow path and second airflow path are not restricted to cooling the light source and circuit board, and may cool optical parts as well.

With the embodiment, the adjusting mechanism 138 (FIG. 9) has been described as having an adjusting member 139 which vertically moves as to the vent 51b. However, the adjusting mechanism 138 is not restricted to this, i.e., the adjusting member is neither restricted to moving to a position above of below the vent, nor restricted to sliding vertically.

For example, the adjusting mechanism may be configured of a movable louver placed at the vent. Specifically, an arrangement may be made wherein multiple blades each of which can turn on a horizontal rotating axis are arrayed in the vertical direction at the vent, with the angle of the multiple blades differing at the top side and the bottom side, and further with the angles thereof changing at the time of vertically inverting the housing, such that the opening area of the top side is greater than that at the bottom side.

In the case of an adjusting mechanism being configured such that the opening area of the vent is changed due to the own weight of the adjusting member, the adjusting member is not restricted to sliding vertically. For example, and adjusting mechanism may be configured such that the adjusting member is axially supported at a position eccentric as to the center of gravity thereof, so that the adjusting member rotates under its own weight so as to change the opening area of the vent.

Also, moving of the adjusting member is not restricted to the own weight of the adjusting member, and may be performed by various methods, such as manually, or driven by a motor or the like, etc.

Figure 18A:
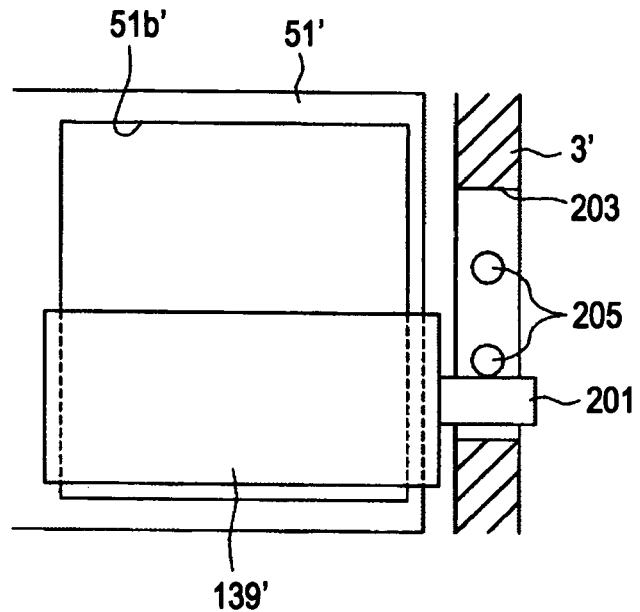
FIGS. 18A through 18C are schematic diagrams for describing a modification of an adjusting mechanism.
Figure 18B:
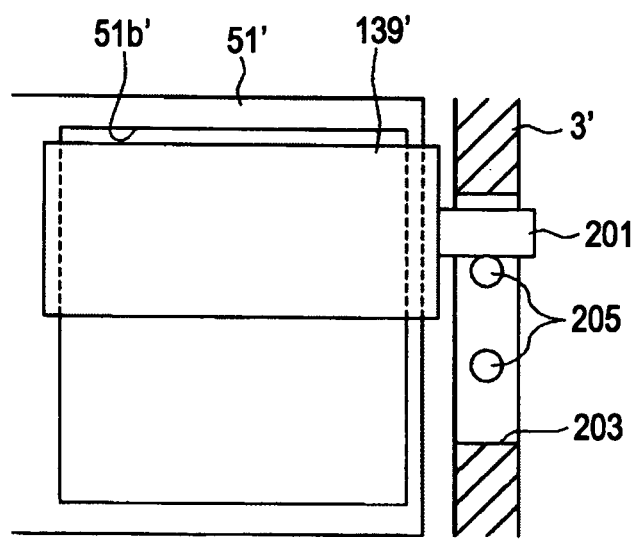
Figure 18C:
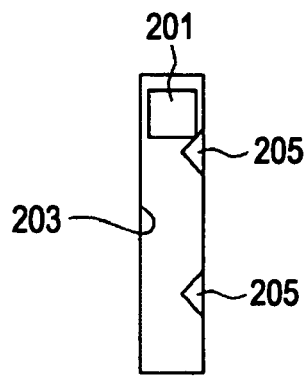

FIGS. 18A through 18C are schematic diagrams illustrating a modification of the adjusting mechanism. An adjusting member 139' which closes off a part of a vent 15b' of the a lamp house 51' is capable of moving between a position closing off one side of the vent 15b, as shown in FIG. 18A, and a position closing off the other side of the vent 15b' as shown in FIG. 18B.

An operating member 201 is linked to the adjusting member 139'. The operating member is exposed from the housing 3' via a slit 203 formed in the housing 3'. Accordingly, the user can change the position of the adjusting member 139' by operating the operating member 201.

The adjusting member 139' is positioned at the position indicated in FIG. 18A and the position indicated in FIG. 18B. For example, the slit 203 is provided with engaging portions 205 formed of an elastic material such as leaf springs or the like being provided at positions corresponding to the position indicated in FIG. 18A and the position indicated in FIG. 18B (also see FIG. 18C, showing the slit 203 from the right side in the drawing in FIGS. 18A and 18B). Retaining the operating member 201 at the engaging portions 205 positions the adjusting member 139' at the position indicated in FIG. 18A and the position indicated in FIG. 18B.

While the embodiment and FIGS. 18A through 18c exemplarily describe cases wherein the adjusting member is positioned at one of two positions, the adjusting member may be configured to be positioned at three or more positions, or may be configured to be positioned at an arbitrary position. The shape of the adjusting member may be determined as appropriate, and is not restricted to plate-shaped or rectangular articles.

Figure 19A:
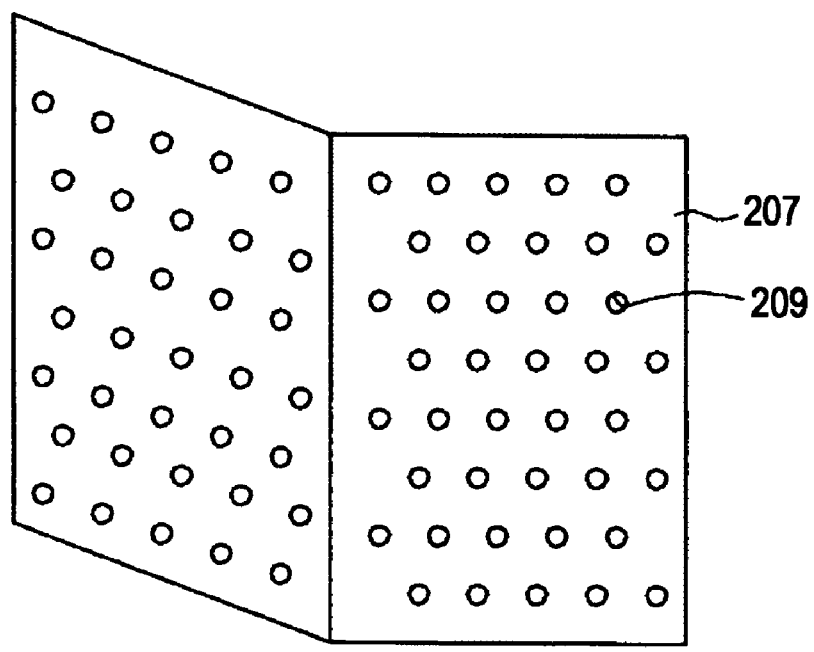
FIGS. 19A through 19B are schematic diagrams for describing a modification of the adjusting member.
Figure 19B:
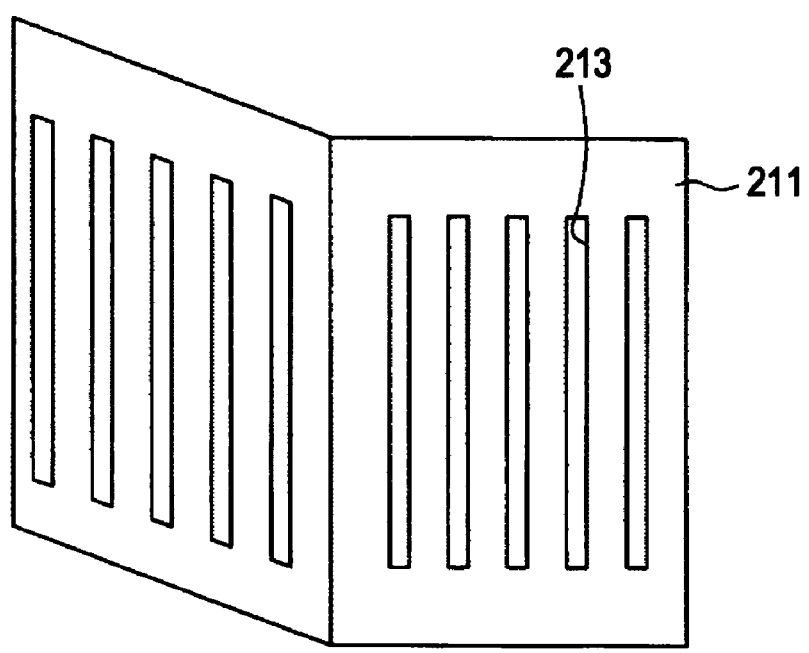

FIGS. 19A and 19B are perspective views illustrating modifications of the adjusting member. The adjusting member 207 shown in FIG. 19A has multiple generally-circular holes 209 formed therein. The adjusting member 207 may be formed of a punched grill, for example. Also, the adjusting member 211 shown in FIG. 19B has multiple slits 213 formed therein.

The adjusting member may be provided with holes through which air can pass, in this way. In such a case, the temperature can be balanced throughout the entire lamp house, such that there is no sudden temperature difference between positions where the adjusting member is situated and positions where the adjusting member is not situated. Also, delicate adjustment of exhaust can be performed by increasing or decreasing the opening area at suitable positions of the adjusting member, since there are portions within the positioning range of the adjusting member where temperature readily rises and portions within the positioning range of the adjusting member where temperature does not readily rise.

Also, the embodiment has been described with reference to an example wherein a turbulence promoting portion for promotion of transition from laminar airflow to turbulence for the air blown out from the ducts is formed of nozzles 145 (FIG. 13) with cuts formed therein, but the turbulence promoting portion is not restricted to this.

Figure 20A:
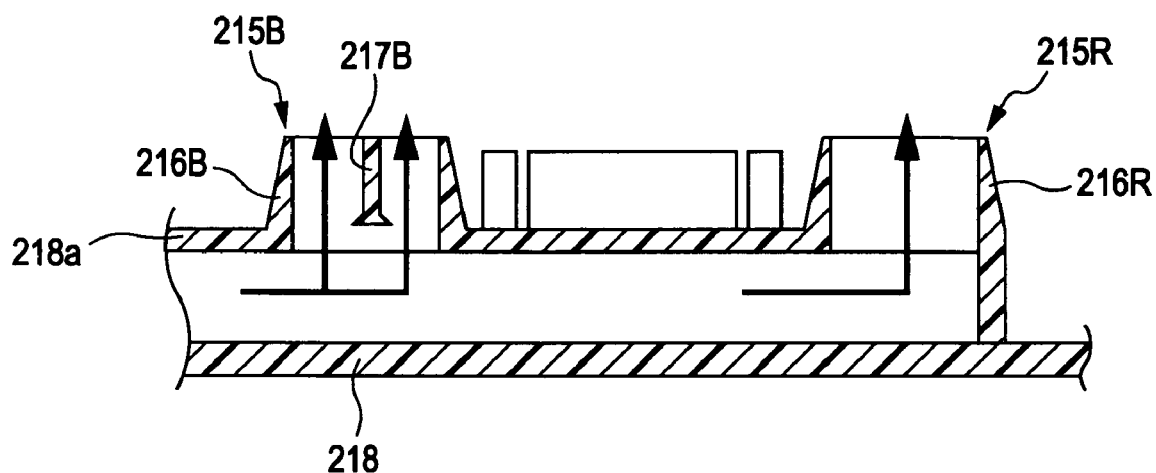
FIGS. 20A and 20B are cross-sectional diagrams illustrating a modification of a turbulence enhancement unit.

FIG. 20A is a cross-sectional diagram illustrating a modification of the turbulence promoting portion. Nozzles 215R and 215B are formed including orthogonal walls 216R and 216B which have tips that are thinner than the base portions thereof. Specifically, the orthogonal walls 216 are formed so as to be gradually thinner toward the tip side. The tip is formed to around 0.5 mm, which is a size that can be formed of resin. Note that the orthogonal walls 216 are formed thinner than the perimeter face portions of the duct main units 218a of the duct 218 guiding air from the fan to the outlet, at least at the tip side thereof.

According to this modification, the bending stiffness of the orthogonal walls 216 at the tip is low, and accordingly the orthogonal walls 216 oscillate easily, so the orthogonal walls 216 easily vibrate under pressure of the wind so as to realize transition from laminar airflow to turbulence.

While the portion making up the partition 217B of the nozzle 215B is not formed thin at the tip thereof in FIG. 20A, this portion may be formed thin as well. Further, the tips of not only walls orthogonal to the direction of light transmission but other walls also may be formed thin.

Figure 20B:
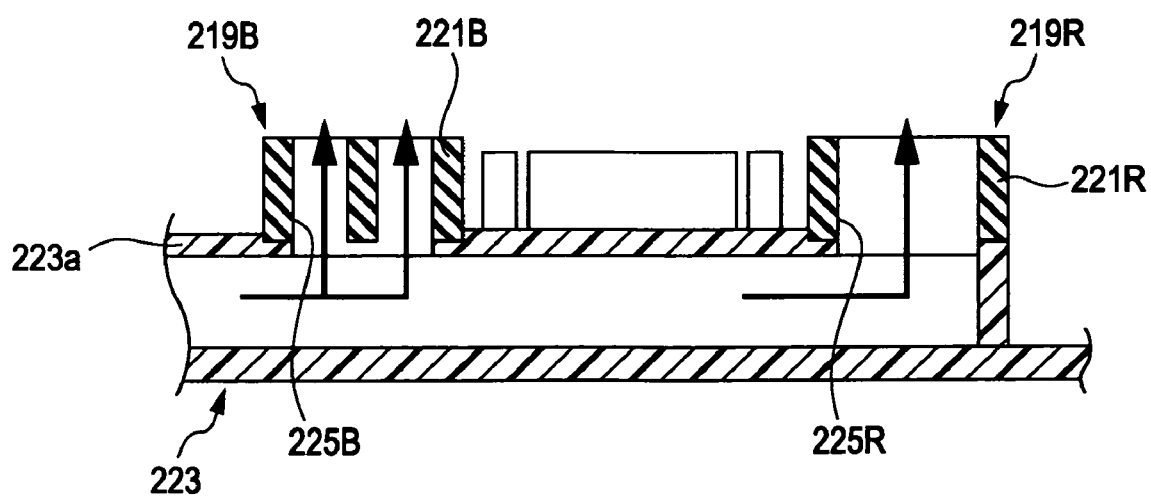

FIG. 20B is a cross-sectional diagram illustrating another modification of the turbulence promoting portion. Nozzles 219R and 219B (orthogonal walls 216R and 216B) are configured of members having flexibility. The members having flexibility are members having elasticity, for example, the nozzles 219 are formed of rubber, a styrene elastomer, or the like. Note that in the event that the duct main unit 223a for guiding air from the fan to the outlets 225R and 225B is configured of a hard resin or the like, the nozzles 219 are formed of a material having lower bending stiffness than the duct main unit 223a.

According to this modification, the nozzles 219 have lower bending stiffness and oscillate easily, and accordingly readily vibrate under pressure of the wind so as to realize transition from laminar airflow to turbulence. Particularly, in the event that the nozzles 219 are formed of an elastic material, vibration easily occurs due to the restoration force thereof, further promoting transition from laminar airflow to turbulence.

Note that while FIG. 20b illustrates an example of an arrangement wherein the entire nozzles 219 are formed of a flexible material and/or a material with lower stiffness than that of the duct main potion 223a, and arrangement may be made wherein only a part of the nozzles 219 is configured of a flexible material or the like. For example, an arrangement may be made wherein, of the nozzles 219, only the orthogonal wall portions 221 orthogonal the direction of transmission of light are formed of flexible material, or wherein only the tips of the nozzles 219 are formed of flexible material.

Figure 21:
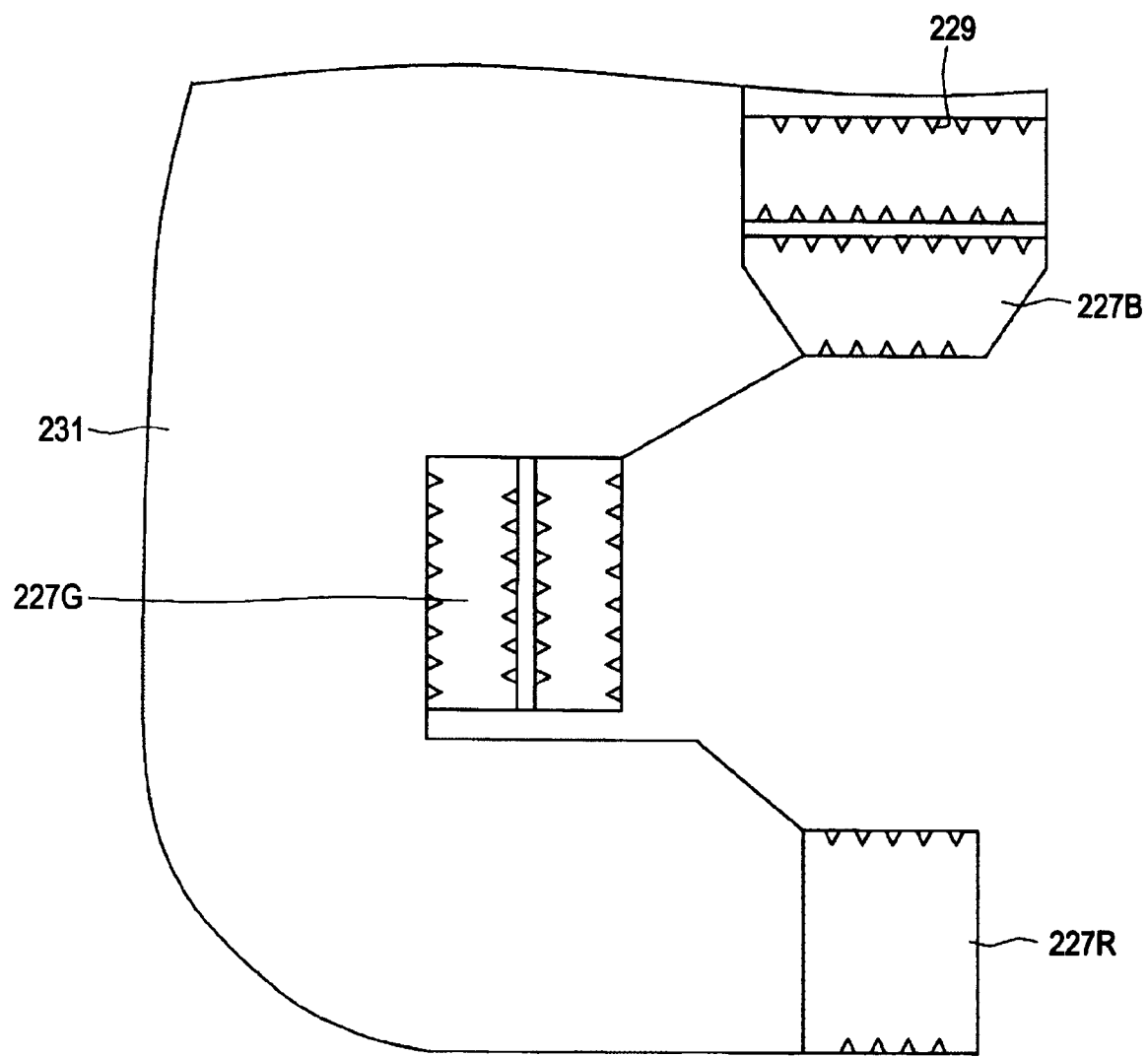
FIG. 21 is a plan view illustrating yet another modification of the turbulence enhancement unit.

FIG. 21 is a plan view illustrating another modification of the turbulence promoting portion. Outlets 227R, 227G, and 227B each have formed multiple protrusions 229 on the inner circumference thereof, protruding toward the middle thereof. The multiple protrusions 229 are formed on the faces of the outlets 227 which are faces orthogonal to the direction of light transmission, arrayed along the edges of the outlets 227. Note that in the event that the outlets 227 are configured as with the various above-described forms, or configured of nozzles or wall portions, the multiple protrusions 229 are formed on the inner circumference of the nozzles or wall portions.

According to this modification, air blow out from the outlets 227 is agitated by the multiple protrusions, and readily makes transition from laminar airflow to turbulence, so efficiency in thermal exchange between the air and optical parts can be improved.

Note that the multiple protrusions may be formed not only on the wall portions orthogonal to the direction of light transmission but also on other wall portions. The shapes of the multiple protrusions 229 are optional. Also, the protrusions 229 may be arrayed in the depth-wise direction following the openings 227 (the near-far direction in the drawing in FIG. 21). The multiple protrusions 229 may be formed integrally with the duct 231, or may be formed on a separate member to be fixed to the duct 231.

In the event that the turbulence promoting portion is configured of nozzles and wall portions with cuts formed therein, it is sufficient for the cuts to be formed at least at the tips of the nozzles or wall portions. Also, cuts 153 for dividing the wall portions into multiple layers are not restricted to one per wall, and multiple cuts 153 may be formed for each wall. Further, cuts 153 for dividing the wall portions into multiple layers are not restricted to wall portions orthogonal to the direction of light transmission and may also be formed on other wall portions. For example, the cuts 153 maybe formed in wall portions following the direction of light transmission, inclined wall portions, and so forth.

The turbulence promoting portion may be formed of a combination of multiple arrangements described above. For example, cuts may be provided to walls formed thin at the tip, with such walls formed of a flexible material, and further, with protrusions formed on the inner circumference of such walls. Walls making up the turbulence promoting portion preferably are very thin overall, for example, 0.5 mm in thickness.

The outlet where the turbulence promoting portion is situated is not restricted to one for blowing air to around the light valves. The object of cooling may be other optical parts (e.g., PS converter), or electronic parts such as a circuit board or the like, for example. The walls making up the turbulence promoting portion are preferably provided at the edge of the air outlets (i.e., making up the air outlets), but the position thereof may be a potion somewhat away from the air outlet.

While an example has been described in the embodiment above wherein the filter replacement access lid 15 has a base portion 15a and a perimeter face portion 15b, with an inlet 16b being formed only on the perimeter face portion 15b, the shape of the filter replacement access lid 15 is not restricted to this. For example, an arrangement may be made wherein the entire filter replacement access lid is curved so as to protrude toward the placing face side, with an inlet formed on the entire face thereof. In this case, suctioning of paper thereto is suppressed as compared with a case wherein the inlet of the lower face portion of the housing faces the placing face as with the related art, and also, this arrangement is advantageous in that all that is necessary is to change the design of the filter replacement access lid.

While an example has been described in the embodiment above wherein the axial flow fan is held by multiple vibration-proofing members 167, the objects to be held by multiple vibration-proofing members are not restricted to axial flow fans, and may be sirocco fans, for example. The positions at which the vibration-proofing members are disposed, and the shapes thereof, may be changed as appropriate.

Now, simulation results and experiment results with the projector 1 according to embodiments of the present invention will be described with reference to FIGS. 22 through 24B, and other drawings.

Figure 22:
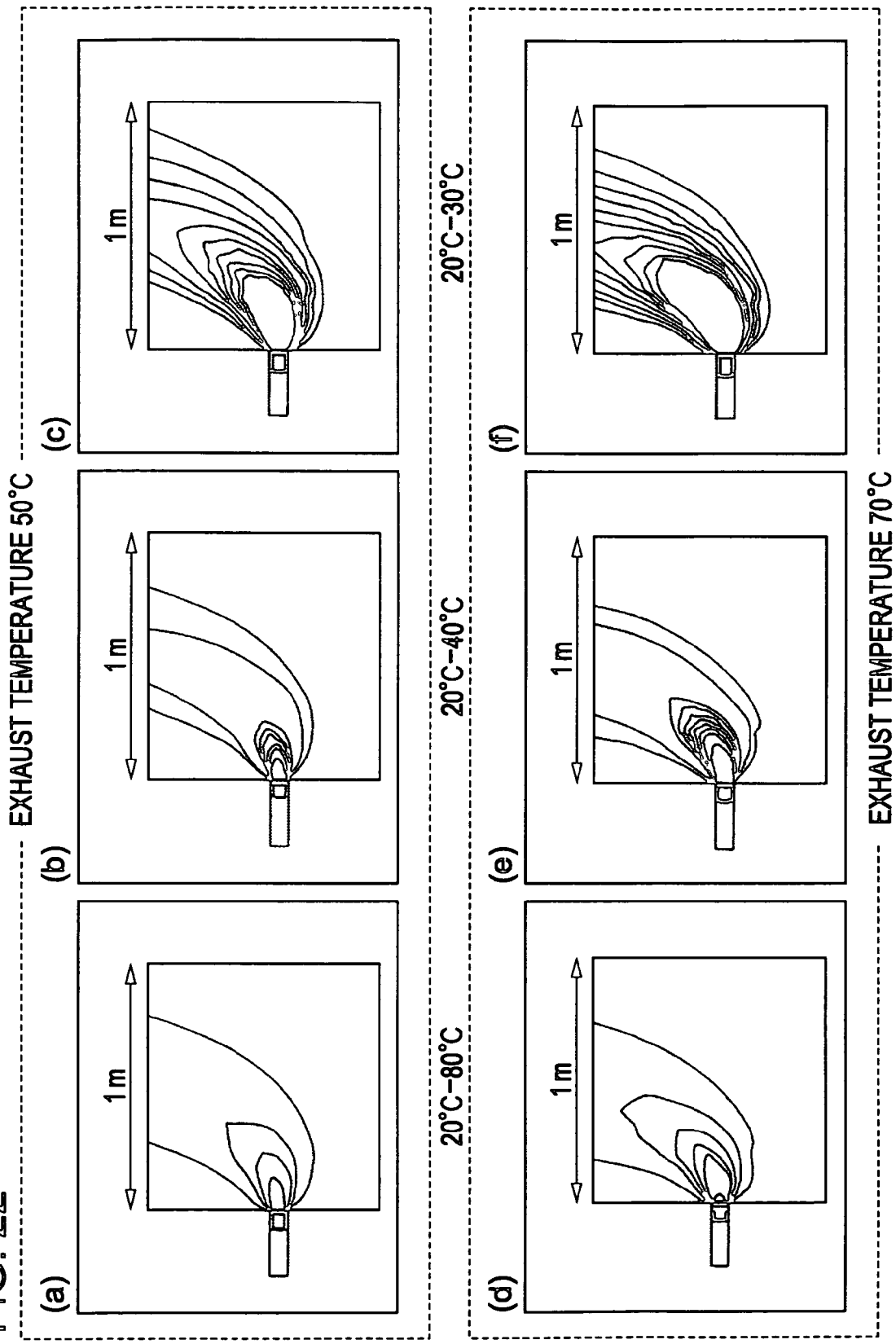
FIG. 22 is a diagram illustrating simulation results of calculating the range over which hot air reaches.

FIG. 22 shows simulation results of calculation of the range over which hot air reaches, in a case of venting hot air in a direction inclined as to the projection direction by 45°, as described primarily with reference to FIGS. 1 through 7. The drawings (a) through (c) in FIG. 22 show simulation results in the event that the temperature of the hot air is 50° C., and the drawings (d) through (f) in FIG. 22 show simulation results in the event that the temperature of the hot air is 70° C.

The drawings (a) through (f) in FIG. 22 illustrate the temperature of the hot air by a set number N of isotherms. Specifically, in (a) and (d) in FIG. 22, N isotherms are appropriated to the range of 20° C. to 80° C. In (b) and (e) in FIG. 22, N isotherms are appropriated to the range of 20° C. to 40° C. In (c) and (f) in FIG. 22, N isotherms are appropriated to the range of 20° C. to 30° C.

In the drawings (a) through (f) in FIG. 22, the right side of the diagram is the projection direction, and it can be seen that the hot air is vented in a 45° direction toward the top of the diagram. In all of the drawings, the isotherms extend in the same direction in the venting direction, with little difference at all in form. Accordingly, it can be understood that the range which the hot air reaches has little dependence on exhaust temperature, and that effects of heat around the projector 1 can be suppressed by suitably setting the exhaust direction.

As can be understood from these drawings, the hot air flows in a direction inclined as to the projection direction by 45°, over a distance of √2 thereof, so as to flow in the direction of projection or the direction orthogonal to the direction of projection, over a distance of 1. Accordingly, in the event that the hot air is vented at an angle of 45° as to the projection direction, the effects of hot air exhausted from the projector 1 on the surroundings is 1/√2.

Next, experiment results illustrating the advantages of the features described with reference to FIGS. 9 through 11B will be described. The following is an example of the temperature surrounding the art tube in a comparative example, i.e., in a case wherein the opening area of the vent of the lamp house was not adjusted. The measurement positions of Tbu, Tbl, Tcf, and Tcr, are shown in FIG. 10. Note that all temperatures are give in centigrade (° C.).

Normal projection–ceiling suspension projection, (High mode)–(Low mode)

Temperature at upper portion of arc tube (Tbu): 981–821, (997)–(783)

Temperature at lower portion of arc tube (Tbl): 809–945, (779)–(929)

Absolute value of difference in upper and lower temperatures (Tbu–Tbl): 172–124, (217)–(145)

Temperature front of molybdenum foil weld point (Tcf): 350

Temperature rear of molybdenum foil weld point (Tcr): 387

In this example, a tendency is indicated that the upper and lower temperature difference (Tbu–Tbl): narrows in the event of changing the orientation and in the event of changing lamp output. When the lamp is turned on, the inner wall is non-uniformly heated by convection within the arc tube, and the upper temperature (Tbu) is higher than the lower (Tbl). This temperature non-uniformity leads to insufficient evaporation of the luminous material sealed in the arc tube such as metal compound or the like, which may lead to trouble such as adhering to the inner wall of the quartz tube. The present embodiment is effective in preventing such phenomena and reducing the width in difference of upper and lower temperature.

FIG. 23 shows simulation results of a case wherein multiple protrusions are provided to the outlets, such as with the arrangement shown in FIG. 21. The items R, G-IN, G-OUT, B-IN, B-OUT, IRS-IN, and IRS-OUT, at the left column correspond to the outlets 104R, 104G-IN, 104G-OUT, 104B-IN, 104B-OUT, 102IN, and 102OUT (see FIGS. 12A, 12B, and 7).

The second column represents the wind speed in a comparative example, i.e., a case wherein no protrusions are formed at the outlets. The third column represents the wind speed in the embodiment, i.e., a case wherein multiple protrusions are formed at the outlets. The comparative example and the embodiment are under the same conditions except for the formation of the protrusions. The column a the right illustrates the increase in wind speed in the embodiment as compared to the comparative example.

As shown in FIG. 23, providing protrusions to the outlets increases the wind speed by around 1%. Note that increase in wind speed means increase in Reynolds number, indicating that it is easier to make transition to turbulence.

The following is an example of difference in wind speed in a case of changing the driving voltage of a sirocco fan.

|  | 7 V (R/G/B) | 8 V (R/G/B) |
| --- | --- | --- |
| Wind speed (m/s) | 1.21/3.18/1.89 | 1.38/4.24/2.35 |
| Wind flow (m³/min) | 0.003/0.038/0.027 | 0.0037/0.051/0.033 |
| Noise value (dbA) | 35.2 | 37.3 |

-continued

|  | 7 V (R/G/B) | 8 V (R/G/B) |
| --- | --- | --- |
| Panel surface temperature (° C.) | 59.9 (G) | 57.8 (G) |
| Polarization plate surface temperature (° C.) | 49.5 (G) | 47.6 (G) |

As can be seen from this example, raising the fan driving voltage 1 V to reduce the surface temperature by 2° C. leads to the noise value deteriorating by around 2 dbA, for example (see the later-described FIG. 25A). It can be understood from this at even if the effect due to generating turbulence is around 1 to 2 percent, improvement in cooling effects will lead to improved noise-reduction capabilities of the entire device, and improved reliability and lifespan.

Figure 24A:
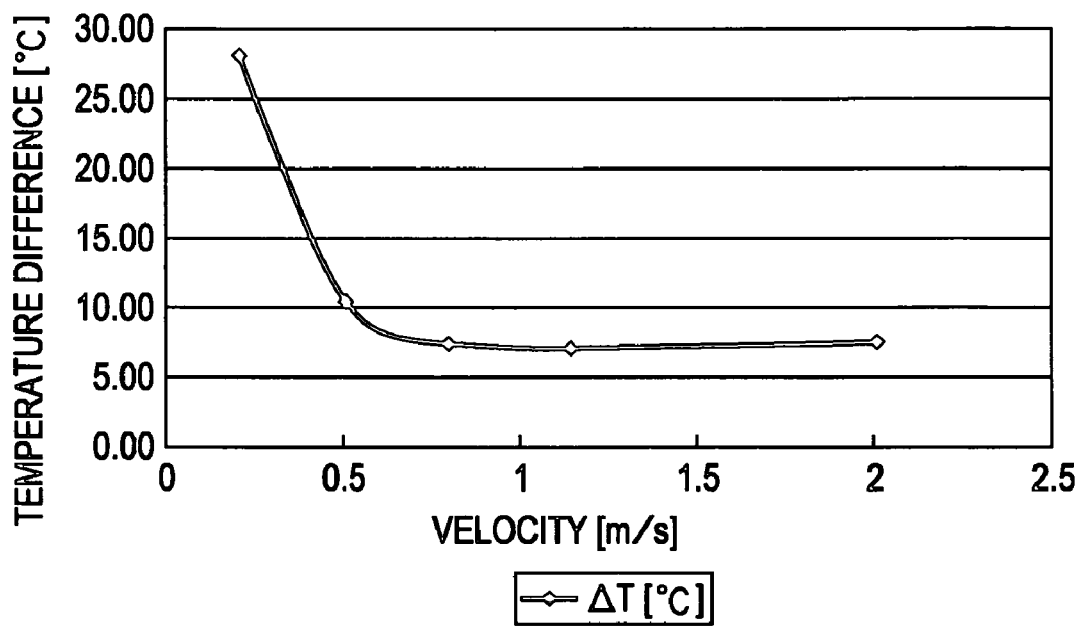
FIGS. 24A and 24B are diagrams illustrating simulation results of calculating the relation between air velocity, cooling effects, and diameter of the vent.

FIG. 24A illustrates simulation results of calculating the relation between the wind speed of the air blown against the optical parts, and the difference between temperature of around the optical parts and the temperature outside of the housing. The optical parts are the optical parts in the area where optical parts are densely disposed, such as around the cross prism.

As shown in the drawing, in the event that the wind speed is lower than a predetermined value (0.7 m/s) in FIG. 24A, the cooling effects deteriorate markedly. Accordingly, the cooling effects may be markedly improved by raising the wind speed by making transition to turbulence.

Figure 24B:
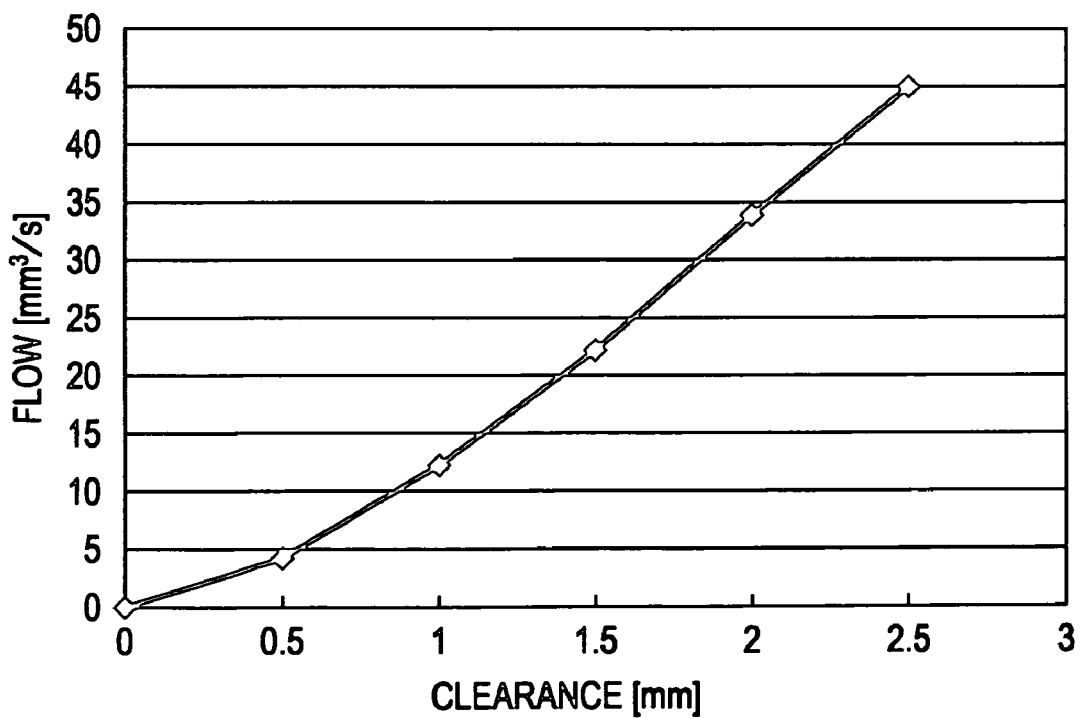

FIG. 24B illustrates the simulation results of calculation of the relation between the diameter of an outlet and the wind flow. As shown in this drawing, the clearance and wind flow are in an almost linearly proportionate relation. Accordingly, setting the air flow of turbulent air blown out form the outlet so as to be around the certain value (0.7 m/s) indicated in FIG. 24A allows the diameter of the outlet to be minimized and accordingly blow air against the optical parts in an efficient manner. That is to say, the turbulence promoting unit has a windfall advantage in that the diameter of the outlet can be reduced.

Figures 25A, 25B:
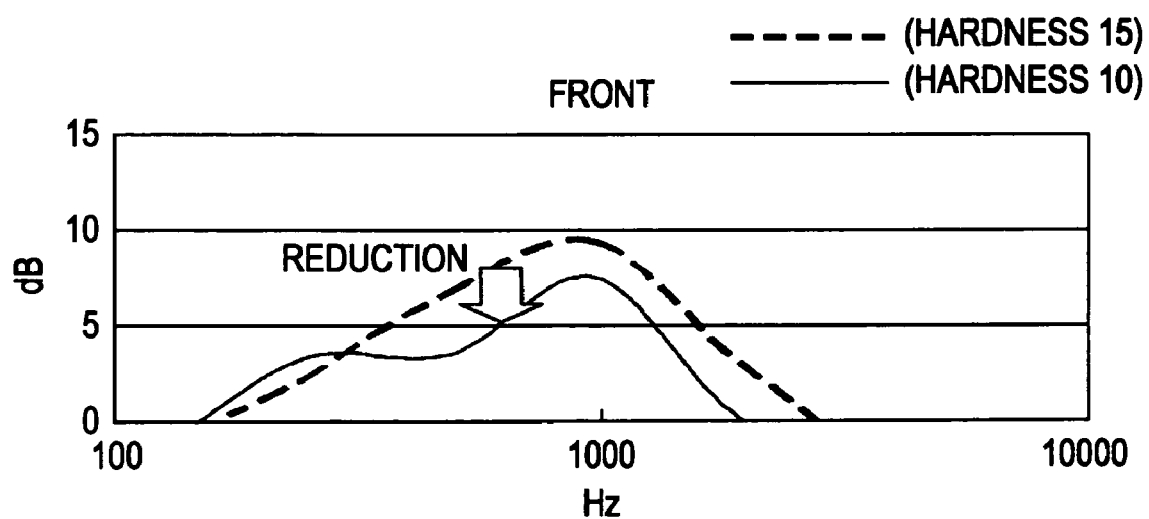
FIGS. 25A and 25B are diagrams illustrating simulation results of calculating noise.

FIG. 25A illustrates the simulation results of calculation of noise in a case of holding the fan with the vibration-proofing members as described primarily with reference to FIGS. 15A through 17B.

The column to the left represents the voltage of the power supplied to the fan. The second column illustrates the noise value in a case of forming the vibration-proofing members with a styrene thermoplastic elastomer having hardness of 15. The third column illustrates the noise value in a case of forming the vibration-proofing members with a styrene thermoplastic elastomer having hardness of 10. The fourth column illustrates the difference between the second column and the third column. Note that the diameter of the fan used for the simulation is 80 mm, with the noise value being the average at the four directions around the fan.

As shown in the drawing, the higher the voltage is, the greater the noise is. Specifically, for each increase in voltage applied to the fan of 1 V, the noise value increases 2 dbA. Also, the lower the hardness is, the lower the noise value is. Specifically, comparing the case of hardness 15 and hardness 10 of the vibration-proofing members, the noise value is lower by 2 dbA for the case of the hardness 10.

FIG. 25B illustrates the noise values shown in FIG. 25A according to frequency. Now, noise level can be represented by an NC value as a level of conversation interference of an audience, by obtaining the noise level (dbA) for each frequency band from 31.5 to around 8 KHz. NC 20 to 30 indicates a very quiet level where a telephone call can be made with no problem and a large meeting can be held. NC 30 to 35 indicates a quiet level where a meeting can be held at a 15-foot table and normal conversion can be made at a distance to 10 to 30 feet, and NC of 25 to 30 is a level of noise at which a projector 1 can be used in a bedroom, music room, movie theater, and so forth. Even in projection display devices with noise value of 30 dbA (around NC 25), the noise is overall divided into vibration/resonance noise and wind noise and so forth. Of these, human ears perceive wind noise as being irritating, so suppressing noise of the 500 to 1000 Hz frequency band is of great importance from the perspective of quietness.

FIG. 25B shows that the noise in the 500 to 1000 Hz frequency band is markedly reduced in the case of configuring the vibration-proofing members with a hardness of 10 as compared to the case of having a hardness of 15, so in the event of configuring the vibration-proofing members of a styrene thermoplastic elastomer, the hardness is preferably 10 or less.

It should be understood by those skilled in the art that various modifications, combinations, sub-combinations and alterations may occur depending on design requirements and other factors insofar as they are within the scope of the appended claims or the equivalents thereof.

What is claimed is:

1. A projection display device comprising:
   a housing;
   a fan disposed within said housing, said fan having
     a vane portion, and
     a fan case accommodating said vane portion so as to be rotatable; and
   multiple vibration-proofing members having at least one of elasticity and viscosity, said vibration-proofing members being disposed at multiple positions in the circumferential direction of the perimeter face portion of said fan case surrounding said vane portion around the rotational axis of said vane portion, such that said vibration-proofing members are introduced between said housing and said fan case,
   in which at least one of the multiple vibration-proofing members includes a suction side protrusion, an exhaust side protrusion, and a recess portion arranged between the suction side protrusion and the exhaust side protrusion, said suction side protrusion extending in a first direction parallel to a rotational axis direction of the vane portion and said exhaust side protrusion extending in a direction opposite to the first direction.

2. The projection display device according to claim 1, wherein said vibration-proofing members are configured of a styrene thermoplastic elastomer having a hardness of 10 or lower.

3. A projection display device comprising:
   a housing;
   a fan disposed within said housing, said fan having
     a vane portion, and
     a fan case accommodating said vane portion so as to be rotatable;
   multiple vibration-proofing members having at least one of elasticity and viscosity, said vibration-proofing members being disposed at multiple positions in the circumferential direction of the perimeter face portion of said fan case surrounding said vane portion around the rotational axis of said vane portion, such that said vibration-proofing members are introduced between said housing and said fan case;
   a supporting member fixed to said housing; and a pressing member fixed to said supporting member in the radial direction of said vane portion, so as to hold said fan case between said pressing member and said supporting member;

wherein a part of said plurality of vibration-proofing members is held between said fan case and said supporting member; and wherein the other part of said plurality of vibration-proofing members is held between said fan case and said pressing member.

4. The projection display device according to claim 3, said pressing member further comprising:

an axial direction contact portion which comes into contact with said vibration-proofing members from the opposite side of an axial rotation direction as to the side to which said fan blows air, thereby restricting movement of said fan toward said opposite side in said axial rotation direction due to wind force.

5. The projection display device according to claim 4, said pressing member further comprising:

an engaging portion configured to engage said housing or a member fixed to said housing in said axial rotation direction, so as to restrict movement of said pressing member in said opposite side in said axial rotation direction.

6. The projection display device according to claim 4, said pressing member further comprising:

a pair of holding orthogonal direction contact members which face each other across said fan case in a holding orthogonal direction orthogonal to a holding direction which is the radial direction of said vane portion;

wherein said fan case has said plurality of vibration-proofing members situated between said fan case and said pair of holding orthogonal direction contact members respectively, with said fan case pressed in between said pair of holding orthogonal direction contact members.

7. The projection display device according to claim 3, said fan case further having a first protrusion provided on said perimeter face portion, protruding in said radial direction; and at least one of said plurality of vibration-proofing members having a second protrusion to be capped in said first protrusion;

wherein at least one side of said supporting member and said pressing member comes into contact with said second protrusion.

8. The projection display device according to claim 4, said fan case further having a first protrusion provided on the edge of said perimeter face portion at an exhaust direction side, protruding in said radial direction; and at least one of said plurality of vibration-proofing members having a second protrusion to be capped in said first protrusion;

wherein said axial direction contact portion comes into contact with said second protrusion from a suction direction side which is opposite direction to said exhaust direction side.

9. The projection display device according to claim 8, wherein said pressing member is disposed only further at said exhaust direction side from the edge of said suction direction side of said fan case.

10. The projection display device according to claim 9, wherein said fan is disposed with said suction direction side facing a side face of a lens barrel with a circular cross-section having a projection lens.

* * * * *